(12) United States Patent
Lee et al.

(10) Patent No.: US 12,526,741 B2
(45) Date of Patent: Jan. 13, 2026

(54) METHOD AND APPARATUS FOR INDICATING ENERGY SAVING MODE OF BASE STATION IN WIRELESS COMMUNICATION SYSTEM

(71) Applicant: Samsung Electronics Co., Ltd., Gyeonggi-do (KR)

(72) Inventors: Jaewon Lee, Gyeonggi-do (KR); Youngbum Kim, Gyeonggi-do (KR); Junyung Yi, Gyeonggi-do (KR); Kyoungmin Park, Gyeonggi-do (KR); Sungjin Park, Gyeonggi-do (KR); Seunghoon Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 210 days.

(21) Appl. No.: 18/363,925

(22) Filed: Aug. 2, 2023

(65) Prior Publication Data

US 2024/0049130 A1 Feb. 8, 2024

(30) Foreign Application Priority Data

Aug. 2, 2022 (KR) .................. 10-2022-0096329
Aug. 19, 2022 (KR) .................. 10-2022-0104313

(51) Int. Cl.
*H04W 52/02* (2009.01)
(52) U.S. Cl.
CPC .............................. *H04W 52/0206* (2013.01)
(58) Field of Classification Search
CPC ............... H04W 52/0206; H04W 52/0235
See application file for complete search history.

(56) References Cited

U.S. PATENT DOCUMENTS

| 12,127,117 B2 * | 10/2024 | Kadiri ............... H04W 52/0216 |
| 2021/0136689 A1 | 5/2021 | Kim et al. |
| 2022/0150946 A1 * | 5/2022 | Tsai ................ H04W 76/28 |
| 2023/0388930 A1 * | 11/2023 | Chen ............... H04W 52/0251 |

FOREIGN PATENT DOCUMENTS

| WO | WO 2014/036692 | 3/2014 |
| WO | WO 2020/060890 | 3/2020 |

OTHER PUBLICATIONS

CATT, "Network Energy Saving Techniques in Time, Frequency, and Spatial Domain", R1-2203482, 3GPP TSG RAN WG1 #109e, May 9-20, 2022, 7 pages.
Samsung, "Network Energy Saving Techniques", R1-2203920, 3GPP TSG RAN WG1 #109e, May 9-20, 2022, 8 pages.
NEC, "Discussion on Network Energy Saving Techniques", R1-2203936, 3GPP TSG RAN WG1 #109e, May 9-20, 2022, 5 pages.
China Telecom, "NR Network Energy Saving for Rel-18", RP-211958, 3GPP TSG RAN #93e, Sep. 13-17, 2021, 15 pages.
International Search Report dated Nov. 1, 2023 issued in counterpart application No. PCT/KR2023/010983, 10 pages.
European Search Report dated Oct. 14, 2025 issued in counterpart application No. 23850349.4-1206, 9 pages.

* cited by examiner

*Primary Examiner* — Gbemileke J Onamuti
(74) *Attorney, Agent, or Firm* — The Farrell Law Firm, P.C.

(57) ABSTRACT

A method, performed by a BS, in a wireless communication system is provided. The method includes transmitting, to a UE, information of an energy saving mode, identifying an operation start point of the energy saving mode, and converting to the energy saving mode, based on the operation start point of the energy saving mode.

20 Claims, 20 Drawing Sheets

METHOD AND APPARATUS FOR INDICATING ENERGY SAVING MODE OF BASE STATION IN WIRELESS COMMUNICATION SYSTEM

CROSS-REFERENCE TO RELATED APPLICATION

This application is based on and claims priority under 35 U.S.C. § 119 to Korean Patent Application Nos. 10-2022-0096329 and 10-2022-0104313, which were filed in the Korean Intellectual Property Office on Aug. 2, 2022, and on Aug. 19, 2022, respectively, the entire disclosure of each of which is incorporated herein by reference.

BACKGROUND

1. Field

The disclosure relates generally to a wireless communication system, and more particularly, to a method and apparatus for indicating an energy saving mode of a base station (BS) in a wireless communication system.

2. Description of the Related Art $5^{th}$ generation (5G) mobile communication technology defines a broad frequency band to enable a high date rate and new services, and may be implemented in a 'sub 6 GHz' band including 3.5 GHz and also in an ultra high frequency band ('above 6 GHz'), which may be referred to as millimeter wave (mmWave), including 28 GHz, 39 GHz, etc.

For $6^{th}$ generation (6G) mobile communication technology, which may referred to as a beyond 5G communication system (beyond 5G), in order to achieve data rates of fifty times faster than the 5G mobile communication technology and ultra-low latency one-tenth of the 5G mobile communication technology, implementation of the 6G mobile communication technology in the terahertz band (e.g., the 95 GHz to 3 THz band) is being considered.

Since the early phase of the development of the 5G mobile communication technology, in order to support services and satisfy performance requirements of enhanced mobile broadband (eMBB), ultra reliable low latency communications (URLLC), and massive machine-type communications (mMTC), there has been ongoing standardization relating to beamforming and massive multiple input multiple output (MIMO) for mitigating pathloss of radio waves and increasing transmission distances of radio wave in a mmWave band, supporting numerologies (e.g., operation of multiple subcarrier spacings) for efficiently utilizing mmWave resources and dynamic operation of slot formats, initial access technologies for supporting multi-beam transmission and broadband, definition and operation of bandwidth part (BWP), new channel coding methods such as a low density parity check (LDPC) code for a large amount of data transmission and a polar code for highly reliable transmission of control information, layer 2 (L2) pre-processing, and network slicing for providing a dedicated network specialized to a specific service.

Currently, there are ongoing discussions about improvements to and performance enhancements of initial 5G mobile communication technologies in consideration of services to be supported by the newer 5G mobile communication technology, and there has been physical layer standardization of technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) that is UE-satellite direct communication for providing coverage in an area in which communication with terrestrial networks is unavailable, and positioning.

There has also been ongoing standardization of air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR), and standardization of system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

When the 5G mobile communication systems are commercialized, as an increasing number of devices are expected to be connected to communication networks, it is predicted that enhancement of functions and performance of the 5G mobile communication system and integrated operations of the connected devices will be required. To this end, new research is being conducting for extended reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, drone communication, etc.

Also, such development of 5G mobile communication systems will serve as a basis for developing new waveforms for providing coverage in THz bands of 6G mobile communication technologies, multi-antenna transmission technologies such as full dimensional MIMO (FD-MIMO), array antennas and large-scale antennas, metamaterial-based lenses and antennas for improving coverage of THz band signals, high-dimensional space multiplexing technology using orbital angular momentum (OAM), and reconfigurable intelligent surface (RIS), as well as full-duplex technology for increasing frequency efficiency of the 6G mobile communication technologies and improving system networks, AI-based communication technology for implementing system optimization by utilizing satellites and AI from a design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure is provided to address at least the above-mentioned problems and/or disadvantages and to provide at least the advantages described below.

Accordingly, an aspect of the disclosure is to provide a method and apparatus for indicating an energy saving mode of a BS in a wireless communication system.

In accordance with an aspect of the disclosure, a method, performed by a BS, in a wireless communication system is provided. The method includes transmitting, to a UE, information of an energy saving mode, identifying an operation start point of the energy saving mode, and converting to the energy saving mode, based on the operation start point of the energy saving mode.

In accordance with another aspect of the disclosure, a BS is provided for use in a wireless communication system. The BS includes a transceiver, and at least one processor configured to control the transceiver to transmit, to a UE, information of an energy saving mode, identify an operation start point of the energy saving mode, and convert to the energy saving mode, based on the operation start point of the energy saving mode.

In accordance with another aspect of the disclosure, a UE is provided for use in a wireless communication system. The UE includes a transceiver, and at least one processor configured to control the transceiver to receive, from a BS, information of an energy saving mode, and identify an operation start point of the energy saving mode.

Additional aspects will be set forth in part in the description which follows and, in part, will be apparent from the description, or may be learned by practice of the presented embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
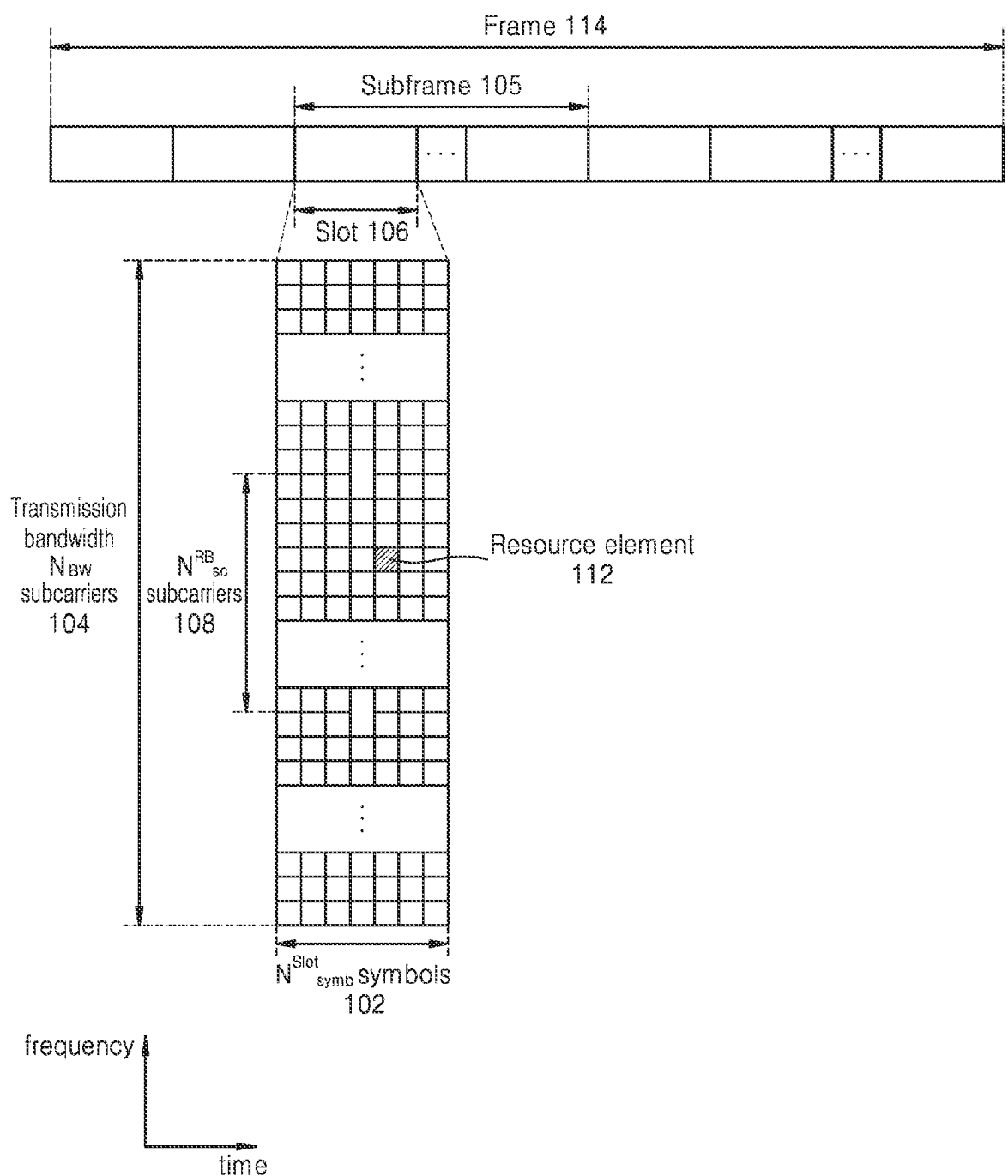
FIG. 1 illustrates a basic structure of a time-frequency resource domain of a 5G system according to an embodiment.

Hereinafter, various embodiments of the disclosure will now be described more fully with reference to the accompanying drawings. In the descriptions of the disclosure, detailed explanations of the related art are omitted when it is deemed that they may unnecessarily obscure the essence of the disclosure. The terms used in the specification are defined in consideration of functions used in the disclosure, and can be changed according to the intent or commonly used methods of users or operators. Accordingly, definitions of the terms are understood based on the entire descriptions of the present disclosure.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein. Rather, these embodiments are provided so that the disclosure will be thorough and complete and will fully convey the concept of the disclosure to one of ordinary skill in the art, and the disclosure will only be defined by the appended claims.

Throughout the specification, like reference numerals denote like elements.

Each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

The term " . . . unit" as used in the disclosure may refer to a software or hardware component, such as field-programmable gate array (FPGA) or application-specific integrated circuit (ASIC), which performs certain tasks. However, the term " . . . unit" is not necessarily limited to software or hardware. A " . . . unit" may be configured to be in an addressable storage medium or configured to operate one or more processors. Thus, a " . . . unit" may include, e.g., components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the elements and " . . . units" may be combined into fewer elements and " . . . units" or further separated into additional elements and " . . . units". Further, the elements and " . . . units" may be implemented to operate one or more central processing units (CPUs) in a device or a secure multimedia card. Also, a " . . . unit" may include one or more processors.

Throughout the disclosure, the expression "at least one of a, b or c" may indicate only a, only b, only c, both a and b, both a and c, both b and c, all of a, b, and c, or variations thereof.

Throughout the specification, a layer may also be referred to as an entity.

Hereinafter, terms identifying an access node, terms indicating network entities, terms indicating messages, terms indicating an interface between network entities, and terms indicating various pieces of identification information, as used in the following description, are exemplified for convenience of descriptions. Accordingly, the disclosure is not limited to terms to be described below, and other terms indicating objects having equal technical meanings may be used.

In the descriptions below, the terms "physical channel" and "signal" may be interchangeably used with "data" or "control signal." For example, a physical DL shared channel (PDSCH) may indicate a physical channel on which data is transmitted or may indicate data. That is, in the disclosure, the expression "transmit a physical channel" may have the same meaning as the expression "transmit data or a signal via a physical channel".

Hereinafter, in the disclosure, higher layer signaling may refer to a method of transferring a signal to a UE from a BS on a DL data channel of a physical layer or to the BS from the UE on an uplink (UL) data channel of the physical layer. The higher layer signaling may be understood as radio resource control (RRC) signaling or a MAC CE.

For convenience of description, the disclosure uses terms and names defined in the 3 rd Generation Partnership Project (3GPP) NR: 5G mobile communication standards. However, the disclosure is not limited to these terms and names, and may be equally applied to communication systems conforming to other standards. Also, the term "terminal" or "UE" may refer a mobile phone, a smartphone, an Internet of things (IoT) device, a sensor, or another wireless communication device.

Hereinafter, a BS is an entity that allocates resources to a UE, and may include a next-generation node B (gNode B/gNB), an evolved node B (eNode B/eNB), a Node B, a radio access unit, a BS controller, or a node on a network. In the disclosure, a terminal may include a UE, a mobile station (MS), a cellular phone, a smartphone, a computer, or a multimedia system capable of performing a communication function. However, the disclosure is not limited to the above examples.

In order to satisfy exponentially increasing demand with respect wireless data traffic, initial standards of the 5G system or the NR access technology, which is a next-generation communication system after long term evolution (LTE) or evolved universal terrestrial radio access (E-UTRA) and LTE-advanced (LTE-A) or E-UTRA evolution are completed. Compared to a legacy mobile communication system focusing on general voice/data communications, a 5G system aims to satisfy various services and requirements, such as eMBB services for improving the existing voice/data communication, URLLC services, mMTC services for supporting communication between a massive number of devices, etc.

Compared to legacy LTE and LTE-A, in which a maximum system transmission bandwidth for a single carrier is limited to 20 MHz, a 5G system aims to provide a high-speed data service at several Gbps by using a very large ultra-wide bandwidth. Accordingly, for the 5G system, an ultra-high frequency band from several GHz up to 100 GHz, in which frequencies having ultrawide bandwidths are easily made available, is being considered as a candidate frequency. In addition, wide-bandwidth frequencies for the 5G system may be obtained by reassigning or allocating frequencies among frequency bands included in a range of several hundreds of MHz to several GHz used by the legacy mobile communication systems.

A radio wave in the ultra-high frequency band has a wavelength of several millimeters (mm) and is also referred to as a millimeter wave (mmWave). However, in the ultra-high frequency band, a pathloss of radio waves increases with an increase in frequency, and thus, a coverage range of a mobile communication system is reduced.

In order to overcome the reduction in coverage in the ultra-high frequency band, a beamforming technology is applied to increase reach of radio waves by focusing a radiation energy of radio waves to a certain target point using a plurality of antennas. That is, a signal to which the beamforming technology is applied has a relatively narrow beamwidth, and radiation energy is concentrated within the narrow beam width, so that the radio wave arrival distance is increased. The beamforming technology may be applied at both a transmitter and a receiver. In addition to increasing the coverage range, the beamforming technology also has an effect of reducing interference in a region other than a beamforming direction. In order to appropriately implement the beamforming technology, an accurate transmit/receive beam measurement and feedback method is required. The beamforming technology may be applied to a control channel or a data channel having a one-to-one correspondence between a certain UE and a BS. Also, in order to increase coverage, the beamforming technology may be applied for control channels and data channels via which the BS transmits, to multiple UEs in a system, common signals such as an SS, a physical broadcast channel (PBCH), and system information (SI). When the beamforming technology is applied to the common signals, a beam sweeping technique of transmitting a signal by changing a beam direction is additionally applied to allow the common signals to reach a UE located at any position within a cell.

As another requirement for 5G systems, an ultra-low latency service with a transmission delay of about 1 ms between a transmitter and a receiver is required.

To reduce transmission delay, a frame structure based on a short transmission time interval (TTI) compared to that in LTE and LTE-A should be designed. A TTI is a basic time unit for performing scheduling, and a TTI in the legacy LTE and LTE-A systems corresponds to one subframe with a length of 1 ms. For example, as a short TTI for satisfying the requirement for the ultra-low latency service in the 5G systems, TT's of 0.5 ms, 0.25 ms, 0.125 ms, etc. that are shorter than the TTI in the legacy LTE and LTE-A systems may be supported.

FIG. 1 illustrates a basic structure of a time-frequency resource domain of a 5G system. That is, FIG. 1 illustrates a basic structure of a time-frequency resource domain that is a radio resource domain in which data or a control channel is transmitted in the 5G system.

Referring to FIG. 1, a horizontal axis represents a time domain and a vertical axis represents a frequency domain. A minimum transmission unit in the time domain of the 5G system is an orthogonal frequency division multiplexing (OFDM) symbol, and $N_{symb}^{slot}$ symbols 102 may be gathered to constitute one slot 106, and $N_{slot}^{subframe}$ slots may be gathered to constitute one subframe 105. A length of the subframe 105 may be 1.0 ms, and 10 subframes may be included in one frame 114 of 10 ms. A minimum transmission unit in the frequency domain is a subcarrier, and NBW subcarriers 104 may be gathered to constitute a full system transmission bandwidth.

A basic unit of a resource in the time-frequency domain is a resource element (RE) 112 and may be defined as an OFDM symbol index and a subcarrier index. A resource block (RB) or a physical RB (PRB) may be defined as $N_{sc}^{RB}$ consecutive subcarriers 110 in the frequency domain. In the 5G system, $N_{sc}^{RB}=12$, and a data rate may increase in proportion to the number of RBs scheduled to a UE.

In a 5G system, a BS maps data in units pf RBs, and in general, scheduling of RBs constituting one slot may be performed for a certain UE. That is, in a 5G system, a basic time unit for performing scheduling may be a slot, and a basic frequency unit for performing scheduling may be an RB.

$N_{symb}^{slot}$ that is the number of OFDM symbols is determined according to a length of a cyclic prefix (CP) added to each symbol so as to prevent interference between symbols, and for example, when a normal CP is applied, $N_{symb}^{slot}=14$, and when an extended CP is applied, $N_{symb}^{slot}=12$. Because the extended CP is applied to a system having a relatively greater radio transmission distance than the normal CP, orthogonality between symbols may be maintained. In a case of the normal CP, a ratio of a CP length to a symbol length is maintained at a constant value, and thus, overhead due to the CP may be constantly maintained, regardless of subcarrier spacings. That is, when subcarrier spacing is small, a symbol length may increase, so that the CP length may also increase. However, when subcarrier spacing is large, the symbol length may decrease, so that the CP length may also decrease. The symbol length and the CP length may be inversely proportional to subcarrier spacing.

In a 5G system, various frame structures may be supported by adjusting subcarrier spacing so as to satisfy various services and requirements.

For example, in terms of an operating frequency band, as the subcarrier spacing is greater, it is more advantageous to recover phase noise in a high frequency band.

in terms of a transmission time, as the subcarrier spacing is greater, a symbol length of the time domain is shorter and thus a slot length is shorter, such that it is more advantageous to support a ultra-low latency service, such as URLLC.

in terms of a cell size, as the CP length is longer, it is possible to support a large cell, and thus, as the subcarrier spacing is smaller, it is possible to support a relatively large cell. A cell indicates an area covered by one BS in mobile communication.

The subcarrier spacing, the CP length, etc., are information for OFDM transmission and reception, and seamless transmission and reception may be performed when the BS and the UE recognize the subcarrier spacing, the CP length, etc., as common values.

Table 1 shows a relationship between subcarrier spacing configuration (µ), subcarrier spacing (Δf), and CP length.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 2 shows the number of symbols ($N_{symb}^{slot}$) per one slot, the number of slots ($N_{slot}^{frame,\mu}$) per one frame, and the number of slots ($N_{slot}^{subframe,\mu}$) per one subframe, for each subcarrier spacing (µ) in the case of the normal CP.

TABLE 2

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 shows the number of symbols ($N_{symb}^{slot}$) per one slot, the number of slots ($N_{slot}^{frame,\mu}$) per one frame, and the number of slots ($N_{slot}^{subframe,\mu}$) per one subframe, for each subcarrier spacing (µ) in the case of the extended CP.

TABLE 3

| µ | $N_{symb}^{slot}$ | $N_{slot}^{frame,\mu}$ | $N_{slot}^{subframe,\mu}$ |
|---|---|---|---|
| 2 | 12 | 40 | 4 |

At the introduction of a 5G system, at least coexistence or dual mode operation with a legacy LTE and/or LTE-A system (hereinafter, the LTE/LTE-A system) is expected. In this manner, the legacy LTE/LTE-A may provide a stable system operation to a UE, and the 5G system may provide improved services to the UE. Therefore, a frame structure of the 5G system should include at least the LTE/LTE-A frame structure or the essential parameter set (subcarrier spacing=15 kHz).

For example, comparing a frame structure where subcarrier spacing configuration µ=0 (hereinafter, frame structure A) with a frame structure where subcarrier spacing configuration μ=1 (hereinafter, frame structure B), subcarrier spacing and an RB size in frame structure B are increased twice and a slot length and a symbol length are reduced twice, compared with frame structure A. In frame structure B, 2 slots may constitute 1 subframe, and 20 subframes may constitute 1 frame.

When the frame structures of the 5G system are generalized, high expandability may be provided by making parameter sets such as the subcarrier spacing, the CP length, the slot length, etc., have an integer multiple relation for each frame structure. Also, a subframe having a fixed length of 1 ms may be defined to indicate a reference time unit irrelevant to the frame structure.

The frame structures may correspond to various scenarios. In terms of the cell size, as the CP length is longer, a larger cell may be supported, and thus, frame structure A may support relatively large cells, compared with frame structure B. In terms of the operating frequency band, as the subcarrier spacing is greater, it may be more advantageous to recover phase noise in a high frequency band, and thus, frame structure B may support a relatively high operating frequency, compared with frame structure A. In terms of the service, as the slot length that is a basic time unit of scheduling is shorter, it may be more advantageous to support an ultra-low latency service such as URLLC, and thus, frame structure B may be relatively appropriate for URLLC services compared with frame structure A.

Hereinafter, in the description of the disclosure, a UL may refer to a radio link for transmitting data or a control signal from a UE to a BS, and a DL may refer to a radio link for transmitting data or a control signal from the BS to the UE.

In an initial access operation in which a UE initially accesses a system, the UE may synchronize DL time and frequency from an SS transmitted from a BS and may obtain cell identifier (ID), via cell search. Then, the UE may receive a PBCH by using the obtained cell ID, and may obtain, from the PBCH, a master information block (MIB) that is essential SI. In addition, the UE may receive an SI block (SIB) transmitted from the BS, and thus, may obtain cell-common transmission and reception control information. The cell-common transmission and reception control information may include random access-associated control information, paging-associated control information, common control information with respect to various physical channels.

An SS is a signal that is a reference of a cell search, and subcarrier spacing may be adapted to a channel environment such as a phase noise, for each frequency band. In order for a data channel or a control channel to support various services as described above, subcarrier spacing may be differently applied according to service types.

Figure 2:
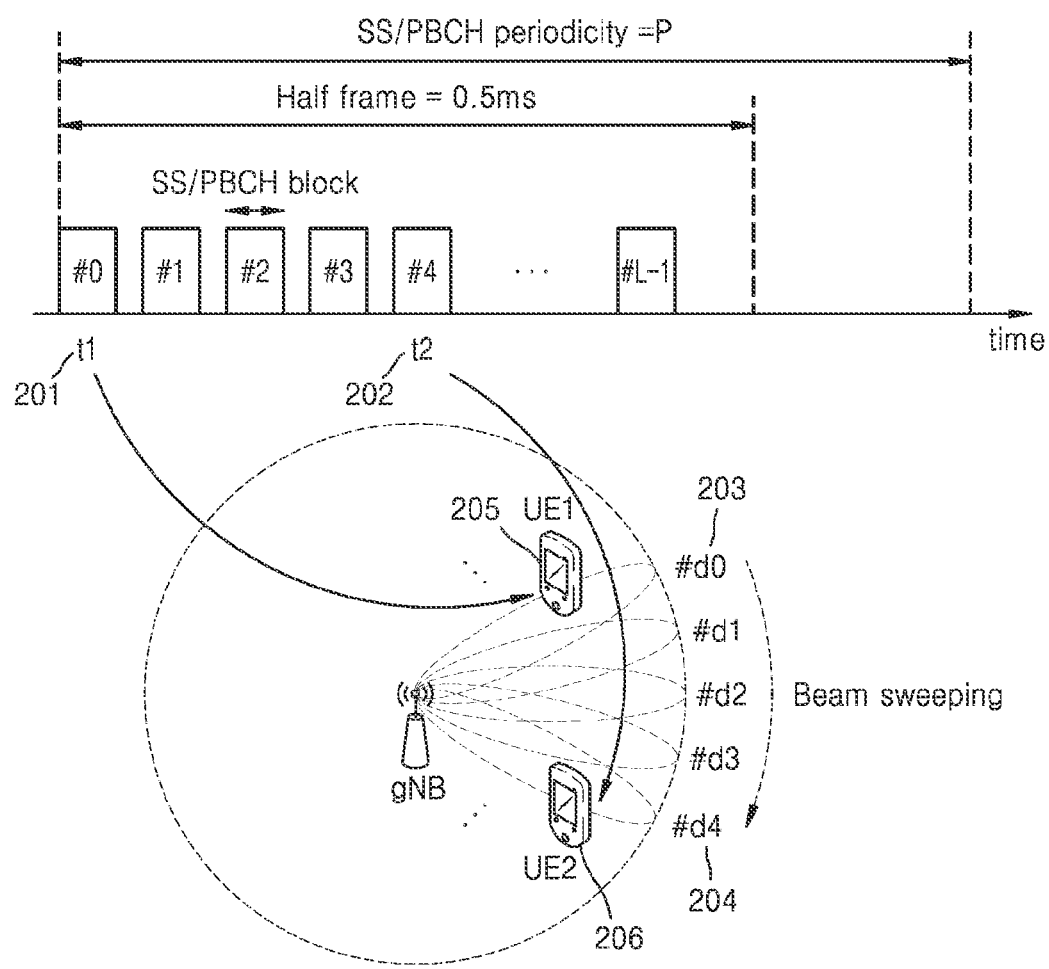
FIG. 2 illustrates a time domain mapping structure and a beam sweeping operation for a synchronization signal (SS) according to an embodiment.

FIG. 2 illustrates a time domain mapping structure and a beam sweeping operation for an SS.

The following elements may be defined for description.
Primary SS (PSS): A signal used as a reference for DL time/frequency synchronization, which provides partial information of a cell ID.
Secondary SS (SSS): A reference for DL time/frequency synchronization, which provides other partial information of the cell ID. The SSS may also serve as a reference signal for demodulation of a PBCH.
PBCH: A PBCH may provide an MIB that is SI for the UE to transmit and receive a data channel and a control channel. The SI may include search space-associated control information indicating radio resource mapping information of a control channel, scheduling control information of a separate data channel for transmitting SI, and information such as a system frame number (SFN) that is an index in a frame level that is timing reference.
SS/PBCH block (SSB): The SSB includes N OFDM symbols and is a combination of the PSS, the SSS, and the PBCH. For a system using a beam sweeping technique, an SSB is the smallest unit for applying beam sweeping. In the 5G system, N=4. The BS may transmit a maximum of L SSBs, and the L SSBs are mapped within a half frame (0.5 ms). In addition, the L SSBs are periodically repeated with a periodicity P. The BS may inform the UE of the periodicity P by signaling. If there is no separate signaling for the periodicity P, the UE applies a predetermined default value.

FIG. 2 illustrates beam sweeping being applied in a unit of an SSB over time.

Referring to FIG. 2, a first UE (UE1) 205 receives an SSB via a beam radiated in direction #d0 203 due to beamforming applied to SSB #0 at a time point t1 201. A second UE (UE2) 206 receives an SSB via a beam radiated in direction #d4 204 due to beamforming applied to SSB #4 at a time point t2 202. A UE may obtain an optimal SS via a beam radiated from the BS in a direction toward a location of the UE. For example, it may be difficult for the UE1 205 to obtain time/frequency synchronization and essential SI from a SSB via the beam radiated in the direction #d4 204 that is remote from the UE1 205.

In addition to reception for the initial access procedure, a UE may receive an SSB to determine whether a radio link quality of a current cell is maintained above a certain level. In a handover procedure in which the UE moves from a current cell to a neighboring cell, the UE may receive an SSB from the neighboring cell so as to determine a radio link quality of the neighboring cell and obtain time/frequency synchronization of the neighboring cell.

After the UE obtains an MIB and SI from the BS via the initial access procedure, the UE may perform a random access procedure to switch a link with the BS to a connected state (or RRC_CONNECTED state). Upon completion of the random access procedure, the UE transitions to a connected state, and one-to-one communication is enabled between the BS and the UE.

Figure 3:
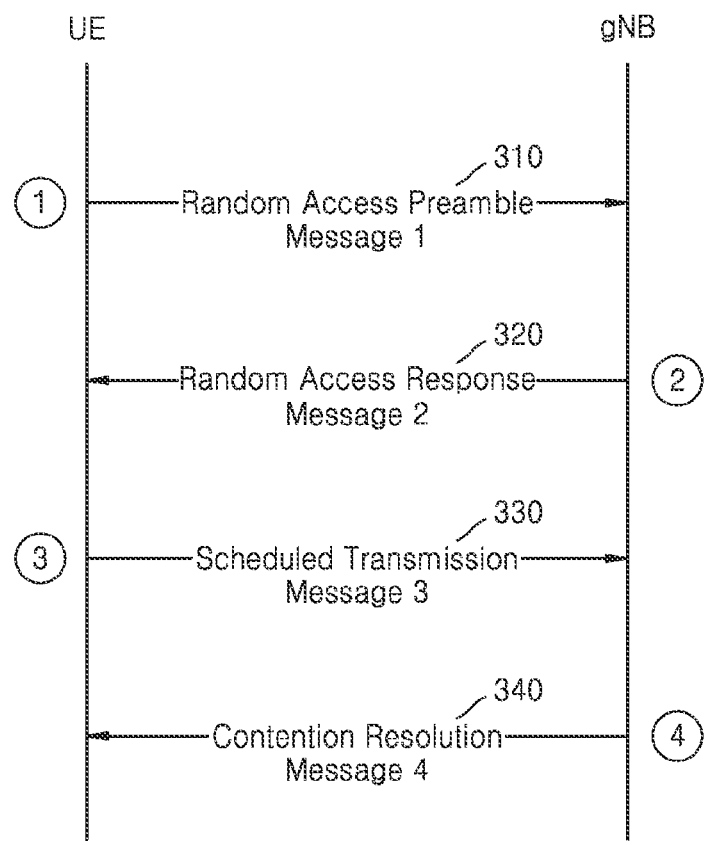
FIG. 3 illustrates a random access procedure according to an embodiment.

FIG. 3 illustrates a random access procedure.

Referring to FIG. 3, in step 310 of the random access procedure, a UE transmits a random access preamble to a gNB (or BS). In the random access procedure, the random access preamble, which is a first message transmitted by the UE, may be referred to as Message 1. The BS may measure a transmission delay value between the UE and the BS from the random access preamble and perform UL synchronization. The UE may randomly select a random access preamble to use from a set of random access preambles given by SI in advance. In addition, an initial transmission power for the random access preamble may be determined according to a pathloss between the BS and the UE, which is measured by the UE. The UE may also transmit the random access preamble by determining a direction of a transmit beam for the random access preamble, based on an SS received from the BS.

In step 320, the BS transmits, to the UE, a random access response (RAR) (or Message 2) that is scheduling information for a Message 3. The RAR includes a UL transmission timing control command for the UE, based on the transmission delay value measured from the random access preamble received in step 310. The BS may also transmit, to the UE, a UL resource to be used by the UE and a power control command as scheduling information. Control information regarding a UL transmit beam of the UE may be included in the scheduling information.

If the UE does not successfully receive the RAR from the gNB within a certain time period in step 2 320, the UE may perform step 310 again. If the UE performs step 310 again, the UE may transmit the random access preamble with transmission power increased by a certain step (power ramping step), thereby increasing the probability of reception of the random access preamble at the BS.

In step 330, the UE transmits UL data (Message 3) including its UE ID to the BS via a UL data channel (e.g., a physical UL shared channel (PUSCH)) by using the UL resource allocated in step 320. A transmission timing of the UL data channel for transmitting Message 3 may be controlled according to the timing control command received from the BS in step 320. In addition, a transmission power for the UL data channel for transmitting Message 3 may be determined by considering the power control command received from the BS in step 320 and a power ramping value applied to the random access preamble. The UL data channel for transmitting Message 3 may include a first UL data signal transmitted by the UE to the BS after the UE transmits the random access preamble.

In step 340, when the BS determines that the UE has performed the random access procedure without colliding with another UE, the BS may transmit data (Message 4) including an ID of the UE that has transmitted the UL data in step 330 to the corresponding UE. When the UE receives Message 4 transmitted by the BS in step 340, the UE may determine that the random access procedure is successful. In addition, the UE may transmit, to the BS via a UL control channel (e.g., a physical UL control channel (PUCCH)), hybrid automatic repeat request acknowledgement (HARQ-ACK) information indicating whether the Message 4 has been successfully received.

If the data transmitted by the UE in step 330 collides with data transmitted by another UE and thus, the BS fails to receive a data signal from the UE, the BS may no longer transmit data to the UE. Accordingly, if the UE fails to receive the data transmitted by the BS in step 340 within a certain time period, the UE may determine that the random access procedure has failed and may restart the random access procedure from step 310.

Upon successfully completing the random access procedure, the UE may transition to a connected state, and one-to-one communication between the BS and UE may be performed. The BS may receive UE capability information from the UE in the connected state and may adjust scheduling based on the UE capability information of the corresponding UE. The UE may inform, via the UE capability information, the BS of whether the UE itself supports a certain function, a maximum allowable value of the function supported by the UE, etc. Accordingly, the UE capability information reported by each UE to the BS may have a different value for each UE.

For example, the UE may report, to the BS, UE capability information including at least some of the following control information as the UE capability information.

Control information associated with a frequency band supported by the UE.
Control information associated with a channel bandwidth supported by the UE.
Control information associated with a highest modulation scheme supported by the UE.
Control information associated with a maximum number of beams supported by the UE.
Control information associated with a maximum number of layers supported by the UE.
Control information associated with CSI reporting supported by the UE.
Control information about whether the UE supports frequency hopping.
Control information associated with a bandwidth when carrier aggregation (CA) is supported.
Control information about whether cross-carrier scheduling is supported when CA is supported.

Figure 4:
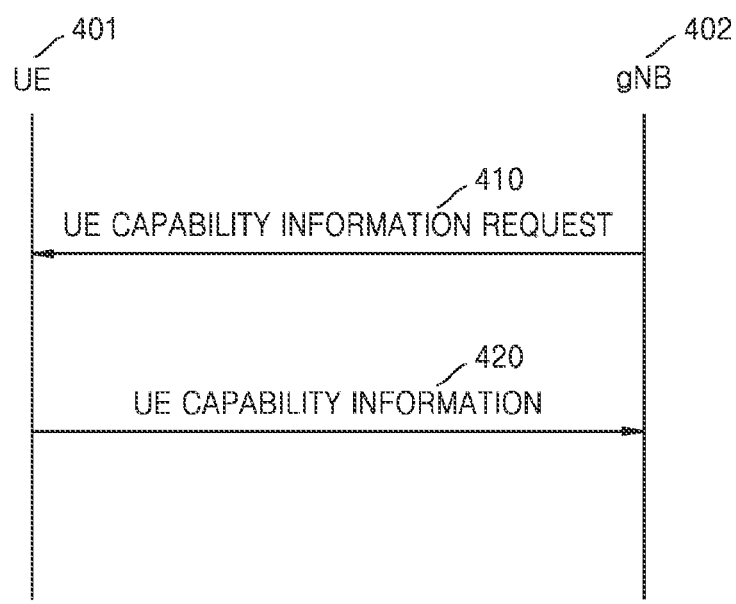
FIG. 4 illustrates a procedure in which a UE reports UE capability information to a BS according to an embodiment.

FIG. 4 illustrates a procedure in which a UE reports UE capability information to a BS.

Referring to FIG. 4, in step 410, a gNB 402 transmits a message of UE capability information request to a UE 401. In response, the UE 401 transmits UE capability information to the BS 402 in step 420.

A UE connected to a BS is a UE in an RRC_CONNECTED. The UE connected to the BS may perform one-to-one communication with the BS. On the other hand, a UE not connected to the BS is in an RRC_IDLE state, and operations of the UE in the RRC_IDLE state are identified as below.

Operation of UE-specific DRX cycle configured by a higher layer
Operation of receiving a paging message from a core network
Obtainment of SI
Measurement operation associated with neighboring cell and cell reselection A UE in an RRC_INACTIVE is defined to decrease an energy and time consumed in an initial access by the UE. The UE in an RRC_INACTIVE state may perform operations below, in addition to operations performed by in an RRC_IDLE.

To store access stratum (AS) information requested for cell access
To perform an operation of UE-specific DRX cycle configured by an RRC layer
To perform radio access network (RAN)-based notification area (RNA) configuration usable in handover by an RRC layer and periodic update
To monitor a RAN-based paging message transmitted via inactive (I)-radio network temporary identifier (RNTI)

Hereinafter, a scheduling method by which a BS transmits DL data to a UE or indicates UL data transmission of the UE will now be described.

DCI is control information transmitted by the BS to the UE via a DL link and may include DL data scheduling information or UL data scheduling information for a certain UE. In general, the BS may independently channel-code DCI for each UE and then may transmit it to a corresponding UE via a PDCCH that is a physical control channel for DL.

The BS may apply and operate a predefined DCI format for a UE to be scheduled according to purposes such as whether DCI carries scheduling information for DL data (DL assignment), whether the DCI carries scheduling information for UL data (UL grant), whether the DCI is DCI for power control, etc.

The BS may transmit DL data to the UE via a PDSCH, which is a physical channel for DL data transmission. The BS may inform the UE of scheduling information, such as a specific mapping location of the PDSCH in the time-frequency domain, a modulation scheme, HARQ-associated control information, power control information, etc., via DCI related to DL data scheduling information among DC's transmitted on the PDCCH.

The UE may transmit UL data to the BS via a PUSCH, which is a physical channel for UL data transmission. The BS may inform the UE of scheduling information, such as a specific mapping location of the PUSCH in the time-frequency domain, a modulation scheme, HARQ-associated control information, power control information, etc., via DCI related to UL data scheduling information among DC's transmitted on the PDCCH.

Figure 5:
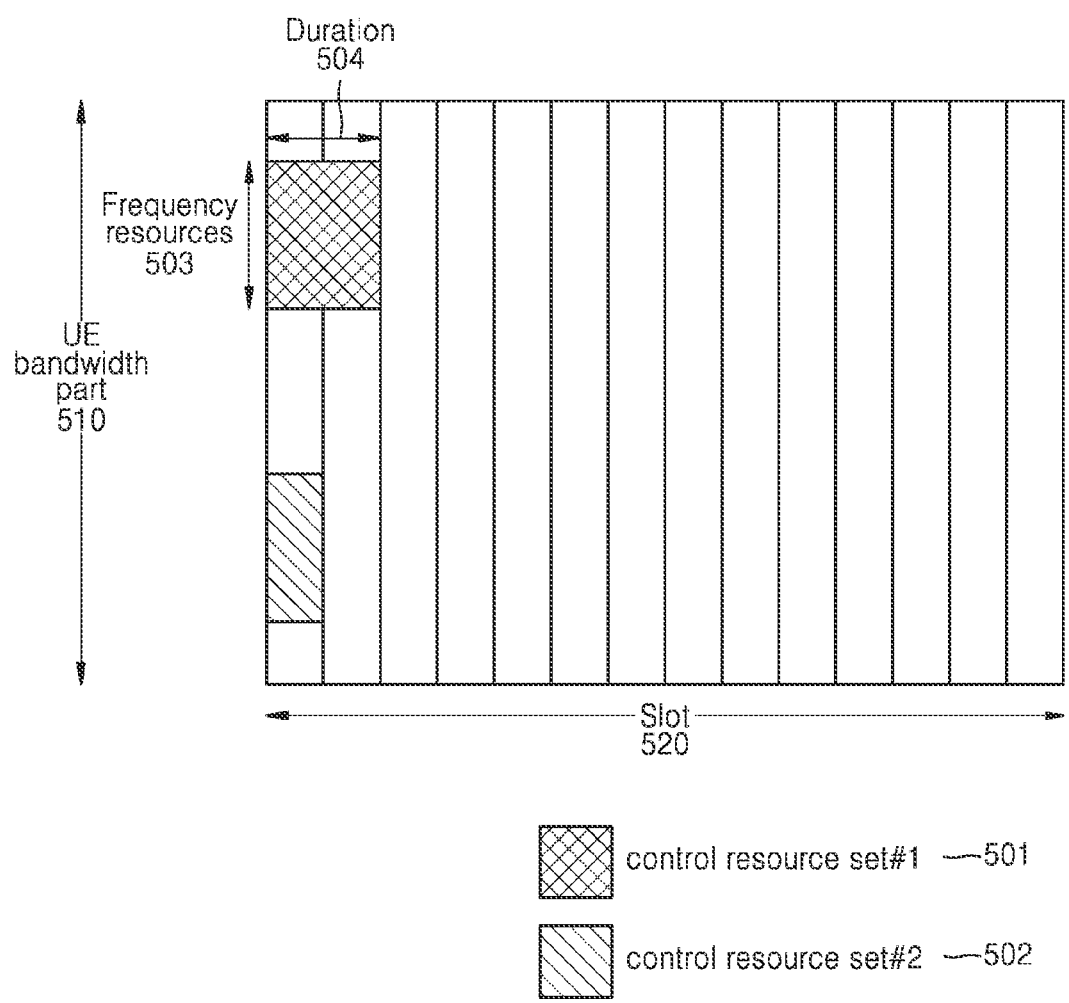
FIG. 5 illustrates a control resource set (CORESET) of time-frequency resources on which a physical downlink (DL) control channel (PDCCH) is mapped according to an embodiment.

FIG. 5 illustrates a CORESET of time-frequency resources on which a PDCCH is mapped.

Referring to FIG. 5, a UE BWP 510 is configured in a frequency axis, and two CORESETs (a CORESET #1 501 and a CORESET #2 502) are configured in one slot 520 in a time axis. The CORESETs 501 and 502 may be configured in a specific frequency resource 503 within the full UE BWP 510 along the frequency axis. A CORESET may be configured with one or more OFDM symbols along the time axis, and may be defined by a CORESET duration 504.

The CORESET #1 501 may be configured to have a CORESET duration of two symbols, and the CORESET #2 502 may be configured to have a CORESET duration of one symbol.

A BS may configure a UE with one or more CORESETs by higher layer signaling (e.g., SI, MIB, or RRC signaling). When the CORESET is configured for the UE, information such as a CORESET ID, a frequency location of the CORESET, and a symbol length of the CORESET is provided to the UE. A plurality of pieces of information are provided from the BS to the UE so as to configure a CORESET and may include at least some of information included in Table 4.

A CORESET may include $N_{RB}^{CORESET}$ RBs in a frequency domain and may include $N_{symb}^{CORESET} \in \{1,2,3\}$ symbols in a time domain. A NR PDCCH may include one or more control channel elements (CCEs). One CCE may include 6 REGs, and each REG may be defined as one RB during one OFDM symbol. REGs in one CORESET may be numbered in a time-first manner, starting with 0 for a first OFDM symbol and a lowest-numbered RB in the CORESET.

An interleaving method and a non-interleaving method may be supported as a method of transmitting a PDCCH. A BS may configure a UE as to whether to perform interleaving transmission or non-interleaving transmission for each CORESET by higher layer signaling. Interleaving may be performed in units of REG bundles. The term 'REG bundle' may be defined as a set of one or more REGs. The UE may determine a CCE-to-REG mapping method in the CORESET by using a method as in Table 5, based on whether to perform interleaving or non-interleaving transmission configured from the BS.

TABLE 5

The CCE-to-REG mapping for a control-resource set can be interleaved or non-interleaved and is described by REG bundles:
- REG bundle i is defined as REGs $\{iL, iL+1,...,iL+L-1\}$ where L is the REG bundle size, $i = 0,1,..., N_{REG}^{CORESET}/L-1$, and $N_{REG}^{CORESET} = N_{RB}^{CORESET} N_{symb}^{CORESET}$ is the number of REGs in the CORESET
- CCE j consists of REG bundles $\{f(6j/L), f(6j/L+1),..., f(6j/L+6/L-1)\}$ where $f(\cdot)$ is an interleaver

TABLE 4

```
ControlResourceSet ::=      SEQUENCE {
    controlResourceSetId        ControlResourceSetId,
    frequency DomainResources   BIT STRING (SIZE (45)),
    duration                    INTEGER (1..maxCoReSetDuration),
    (CORESET duration)
    cce-REG-Mapping Type        CHOICE {
        interleaved                 SEQUENCE {
            reg-BundleSize              ENUMERATED {n2, n3, n6},
            interleaverSize             ENUMERATED {n2, n3, n6},
            shiftIndex                  INTEGER(0..maxNrofPhysicalResourceBlocks-1)
OPTIONAL -- Need S
            (interleaver shift)
        },
        nonInterleaved              NULL
    },
    precoderGranularity         ENUMERATED {sameAsREG-bundle,
allContiguousRBs},
    (precoding unit)
    tci-StatesPDCCH-ToAddList   SEQUENCE(SIZE (1..maxNrofTCI-
StatesPDCCH)) OF TCI-StateId OPTIONAL, -- Cond NotSIB1-initialBWP
    (QCL configuration information)
    tci-StatesPDCCH-ToReleaseList  SEQUENCE(SIZE (1..maxNrofTCI-
StatesPDCCH)) OF TCI-StateId OPTIONAL, -- Cond NotSIB1-initialBWP
    (QCL configuration information)
    tci-PresentInDCI            ENUMERATED {enabled}
OPTIONAL, -- Need S
    (QCL indicator configuration information in DCI)
    pdcch-DMRS-ScramblingID     INTEGER (0..65535)
OPTIONAL, -- Need S
    (PDCCH DMRS scrambling identifier)
}
```

TABLE 5-continued

For non-interleaved CCE-to-REG mapping, L = 6 and f(x) = x.
For interleaved CCE-to-REG mapping, L ∈ {2,6} for $N_{symb}^{CORESET}$ = 1 and L ∈ {$N_{symb}^{CORESET}$, 6} for $N_{symb}^{CORESET}$ ∈ {2,3}. The interleaver is defined by $$f(x) = (rC + c + n_{shift}) \mod (N_{REG}^{CORESET}/L)$$
$$x = cR + r$$
$$r = 0,1,\ldots, R - 1$$
$$c = 0,1,\ldots, C - 1$$
$$C = N_{REG}^{CORESET} / (LR)$$

where R ∈ {2,3,6}.

The BS may inform, by signaling, the UE of which symbol a PDCCH is mapped to within a slot, configuration information such as transmission periodicity, etc.

Figure 6:
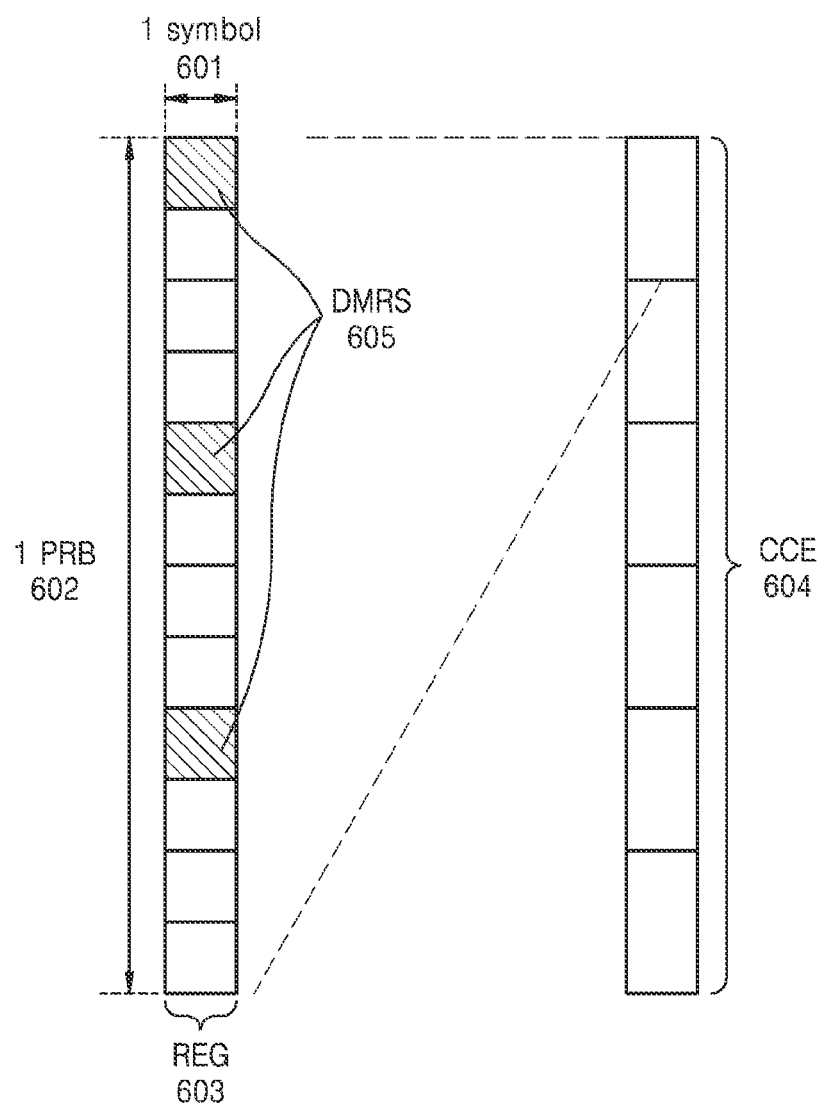
FIG. 6 illustrates DL control information (DCI) and a demodulation reference signal (DMRS) mapped in a resource element group (REG) that is a basic unit of a DL control channel according to an embodiment.

FIG. 6 illustrates DCI and a DMRS being mapped in an REG that is a basic unit of a DL control channel.

Referring to FIG. 6, a basic unit of a DL control channel, i.e., an REG 603, may include both REs to which DCI is mapped and a region to which a DMRS 605 that is a reference signal for decoding the DCI is mapped. Also, three DMRSs 605 may be transmitted in one REG 603.

Hereinafter, a search space of a PDCCH will now be described. The number of CCEs required to transmit the PDCCH may be 1, 2, 4, 8, or 16 depending on an aggregation level (AL), and different numbers of CCEs may be used to implement link adaptation of the DL control channel. For example, when the AL=L, one DL control channel may be transmitted in L CCEs. The UE performs blind decoding to detect a signal without knowing information about the DL control channel, and thus, a search space representing a set of CCEs may be defined for the blind decoding. The search space may be defined as a set of DL control channel candidates that include CCEs on which the UE should attempt decoding at a given AL, and because there are various ALs each making a bundle with 1, 2, 4, 8, or 16 CCEs, the UE may have a plurality of search spaces. A search space set may be defined as a set of search spaces at all the configured ALs.

The search spaces may be classified into a common search space (CSS) and a UE-specific search space (USS). A certain group of UEs or all the UEs may monitor a CSS of the PDCCH so as to receive dynamic scheduling of the SI or receive cell-common control information such as a paging message. For example, the UE may monitor a CSS of the PDCCH so as to receive PDSCH scheduling allocation information for receiving SI. Because a certain group of UEs or all the UEs should receive the PDCCH, the CSS may be defined as a set of pre-defined CCEs. The UE may receive UE-specific PDSCH or PUSCH scheduling allocation information by monitoring a USS of the PDCCH. The USS may be UE-specifically defined as a function of various system parameters and an ID of the UE.

A BS may configure the UE with configuration information about a search space of a PDCCH by higher layer signaling (e.g., SIB, MIB, or RRC signaling). For example, the BS may configure the UE with the number of PDCCH candidates at each L, monitoring periodicity for the search space, monitoring occasion on symbols in the slot for the search space, a type of the search space (CSS or USS), a combination of a DCI format to be monitored in the search space and a RNTI, a CORESET index to monitor the search space, etc. For example, a parameter with respect to the search space of the PDCCH may include a plurality of pieces of information as in Table 6 below.

TABLE 6

```
SearchSpace ::=              SEQUENCE {
    searchSpaceId                SearchSpaceId,
    controlResourceSetId         ControlResourceSetId
OPTIONAL,       -- Cond SetupOnly
    (CORESET identifier)
    monitoringSlotPeriodicityAndOffset CHOICE {
        sl1                      NULL,
        sl2                      INTEGER (0..1),
        sl4                      INTEGER (0..3),
        sl5                      INTEGER (0..4),
        sl8                      INTEGER (0..7),
        sl10                     INTEGER (0..9),
        sl16                     INTEGER (0..15),
        sl20                     INTEGER (0..19),
        sl40                     INTEGER (0..39),
        sl80                     INTEGER (0..79),
        sl160                    INTEGER (0..159),
        sl320                    INTEGER (0..319),
        sl640                    INTEGER (0..639),
        sl1280                   INTEGER (0..1279),
        sl2560                   INTEGER (0..2559)
    }
OPTIONAL,      -- Cond Setup
    duration                     INTEGER (2..2559)
OPTIONAL,      -- Need R
    (monitoring duration)
    monitoringSymbolsWithinSlot  BIT STRING (SIZE (14))
OPTIONAL,      -- Cond Setup
    (monitoring symbol location in slot)
        nrofCandidates           SEQUENCE {
        (number of PDCCH candidates for each aggregation level)
            aggregationLevel1    ENUMERATED {n0, n1, n2, n3, n4,
n5, n6, n8},
            aggregationLevel2    ENUMERATED {n0, n1, n2, n3, n4,
n5, n6, n8},
            aggregationLevel4    ENUMERATED {n0, n1, n2, n3, n4,
n5, n6, n8},
            aggregationLevel8    ENUMERATED {n0, n1, n2, n3, n4,
n5, n6, n8},
```

TABLE 6-continued

```
            aggregationLevel16            ENUMERATED {n0, n1, n2, n3, n4,
n5, n6, n8}
        }
OPTIONAL,   -- Cond Setup
        searchSpaceType                  CHOICE {
            common                       SEQUENCE {
            (common search space)
                dci-Format0-0-AndFormat1-0    SEQUENCE {
                    ...
                }
OPTIONAL,       -- Need R
                dci-Format2-0                 SEQUENCE {
                    nrofCandidates-SFI        SEQUENCE {
                        aggregationLevel1     ENUMERATED {n1, n2}
OPTIONAL,           -- Need R
                        aggregationLevel2     ENUMERATED {n1, n2}
OPTIONAL,           -- Need R
                        aggregationLevel4     ENUMERATED {n1, n2}
OPTIONAL,           -- Need R
                        aggregationLevel8     ENUMERATED {n1, n2}
OPTIONAL,           -- Need R
                        aggregationLevel16    ENUMERATED {n1, n2}
OPTIONAL            -- Need R
                    },
                    ...
                }
OPTIONAL,       -- Need R
                dci-Format2-1                 SEQUENCE {
                    ...
                }
OPTIONAL,       -- Need R
                dci-Format2-2                 SEQUENCE {
                    ...
                }
OPTIONAL,       -- Need R
                dci-Format2-3                 SEQUENCE {
                    dummy1                    ENUMERATED {sl1, sl2,
sl4, sl5, sl8, sl10, sl16, sl20}  OPTIONAL,  -- Cond Setup
                    dummy2                    ENUMERATED {n1, n2},
                    ...
                }
OPTIONAL        -- Need R
            },
            ue-Specific                   SEQUENCE {
            (UE-specific search space)
                dci-Formats                   ENUMERATED {formats0-0-
And-1-0, formats0-1-And-1-1},
                ...,
            }
        }
OPTIONAL        -- Cond Setup2
}
```

Based on the configuration information, the BS may configure the UE with one or more search space sets. According to an embodiment of the disclosure, the BS may configure search space set 1 and search space set 2 for the UE. The BS may configure the UE to monitor DCI format A scrambled by an X-RNTI in the search space set 1 in the CSS and to monitor DCI format B scrambled by a Y-RNTI in the search space set 2 in the USS.

Based on configuration information, one or more search space sets may be present in the CSS or the USS. For example, search space set #1 and search space set #2 may be configured as the CSS, and search space set #3 and search space set #4 may be configured as the USS.

In the CSS, the UE may monitor combinations of DCI formats and RNTIs below. The combinations are not limited to the examples below.
  DCI format 0_0/1_0 with cyclic redundancy check (CRC) scrambled by a cell (C)-RNTI, configured scheduling (CS)-RNTI, semi-persistent (SP)-CSI-RNTI, random access (RA)-RNTI, temporary C-RNTI (TC-RNTI), paging (P)-RNTI, SI-RNTI
  DCI format 2_0 with CRC scrambled by a slot format indicator (SFI)-RNTI
  DCI format 2_1 with CRC scrambled by an interruption (INT)-RNTI
  DCI format 2_2 with CRC scrambled by a transmit power control (TPC)-PUSCH-RNTI, TPC-PUCCH-RNTI
  DCI format 2_3 with CRC scrambled by a TPC-SRS-RNTI
  DCI format 2_4 with CRC scrambled by a CI-RNTI
  DCI format 2_5 with CRC scrambled by an availability indicator (AI)-RNTI
  DCI format 2_6 with CRC scrambled by a power saving (PS)-RNTI
  DCI format 2_7 with CRC scrambled by a paging early indication (PEI)-RNTI In the USS, the UE may monitor combinations of DCI formats and RNTIs below may be monitored. The combinations are not limited to an example below.
  DCI format 0_0/1_0 with CRC scrambled by C-RNTI, CS-RNTI, TC-RNTI
  DCI format 1_0/1_1 with CRC scrambled by C-RNTI, CS-RNTI, TC-RNTI The RNTIs may conform to definitions and purposes below.
- C-RNTI: for UE-specific PDSCH or PUSCH scheduling
- TC-RNTI: for UE-specific PDSCH scheduling
- CS-RNTI: for semi-statically configured UE-specific PDSCH scheduling
- RA-RNTI: for PDSCH scheduling in a random access process
- P-RNTI: for scheduling a PDSCH on which paging is transmitted
- SI-RNTI: for scheduling a PDSCH on which SI is transmitted
- INT-RNTI: for indicating whether to puncture the PDSCH
- TPC-PUSCH-RNTI: for indicating power control command for a PUSCH
- TPC-PUCCH-RNTI: for indicating power control command for a PUCCH
- TPC-SRS-RNTI: for indicating power control command for an SRS The DCI formats described above may conform to definitions as in Table 7 below.

TABLE 7

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 2_7 | Notifying paging early indication and TRS availability indication for one or more UEs. |
| 3_0 | Scheduling of NR sidelink in one cell |
| 3_1 | Scheduling of LTE sidelink in one cell |
| 4_0 | Scheduling of PDSCH with CRC scrambled by MCCH-RNTI/G-RNTI for broadcast |
| 4_1 | Scheduling of PDSCH with CRC scrambled by G-RNTI/GCS-RNTI for multicast |
| 4_2 | Scheduling of PDSCH with CRC scrambled by G-RNTI/GCS-RNTI for multicast |

A search space at AL L with CORESET p and search space set s may be represented as shown in Equation 1 below.

$$\left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad (1)$$

In Equation (1):
- L: aggregation level
- $n_{CI}$: carrier index
- $N_{CCE,p}$: total number of CCEs existing in control resource set
- $n^\mu_{s,f}$: slot index
- $M^{(L)}_{p,s,max}$: PDCCH candidates indices aggregation level L $M_{snCI}=0, \ldots, M^{(L)}_{p,s,max}-1$: PDCCH candidates indices of aggregation level L $i=0, \ldots, L-1$ $Y_{p,n_{s,f}^\mu}=(A_p \cdot Y_{p,n_{s,f}^\mu-1}) \mod D$, $Y_{p,-1}=n_{RNTI} \neq 0$, $A_0=39827$, $A_1=39829$, $A_2=39839$, $D=65537$ $n_{RNTI}$: UE identifier A value $Y_{p,n_{s,f}^\mu}$ may correspond to 0 for CSS.

The value $Y_{p,n_{s,f}^\mu}$ may be a value that changes based one a UE Identity (C-RNTI or ID configured by the BS for the UE) and time index for the USS.

Hereinafter, a method of configuring a TCI state with respect to a PDCCH (or PDCCH DMRS) in the 5G communication system will now be described in detail.

The BS may configure and indicate a TCI state with respect to a PDCCH (or PDCCH DMRS) by appropriate signaling. According to the descriptions above, the BS may configure and indicate a TCI state with respect to a PDCCH (or PDCCH DMRS) by appropriate signaling. The TCI state announces/indicates a quasi co-location (QCL) relation between a PDCCH (or PDCCH DMRS) and another RS or channel, and when a reference antenna port A (reference RS #A) and other target antenna port B (target RS #B) are QCLed with each other, the UE may be allowed to apply some or all of large-scale channel parameters estimated from the antenna port A to measurement of channels from the antenna port B. QCL may associate different parameters depending on a situation such as 1) time tracking affected by average delay and delay spread, 2) frequency tracking affected by Doppler shift and Doppler spread, 3) radio resource management (RRM) affected by an average gain, 4) beam management affected by a spatial parameter, etc. Accordingly, NR may support four types of QCL relations as in Table 8 below.

TABLE 8

| QCL type | Large-scale characteristics |
| --- | --- |
| A | Doppler shift, Doppler spread, average delay, delay spread |
| B | Doppler shift, Doppler spread |
| C | Doppler shift, average delay |
| D | Spatial Rx parameter |

A spatial reception (RX) parameter may collectively refer to some or all of various parameters such as angle of arrival (AoA), power angular spectrum (PAS) of AoA, angle of departure (AoD), PAS of AoD, transmit/receive channel correlation, transmit/receive beamforming, spatial channel correlation, etc.

The QCL relation may be configured for the UE via an RRC parameter TCI-state and QCL-Info as described in Table 9 below.

Referring to Table 9, the BS may configure the UE with one or more TCI states to notify the UE maximally up to two QCL relations (qcl-Type1 and qcl-Type2) for an RS that refers to an ID of the TCI state, i.e., a target RS. Here, the QCL information (QCL-Info) included in each of the TCI states includes a BWP index and a serving cell index of a reference RS indicated by the QCL information, a type and ID of the reference RS, and a QCL type as in Table 8 above.

TABLE 9

```
TCI-State : :=                    SEQUENCE {
    tci-StateId                   TCI-StateId,
    (ID of corresponding TCI state)
    qcl-Type1                     QCL-Info,
    (QCL information of first reference RS of RS (target RS) referring to corresponding TCI
state ID)
    qcl-Type2                     QCL-Info          OPTIONAL,   -- Need R
    (QCL information of second reference RS of RS (target RS) referring to corresponding
TCI state ID)
    ...
}
QCL-Info : : =                    SEQUENCE {
    cell                          ServCellIndex     OPTIONAL,   - - Need R
    (serving cell index of reference RS indicated by corresponding QCL information)
    bwp-Id                        BWP-Id            OPTIONAL,   -- Cond CSI-
RS-Indicated
    (BWP index of reference RS indicated by corresponding QCL information)
    referenceSignal               CHOICE {
        csi-rs                        NZP-CSI-RS-ResourceId,
        ssb                           SSB-Index
        (one of CSI-RS ID or SSB ID indicated by corresponding QCL information)
    },
    qcl-Type                      ENUMERATED { typeA, typeB, typeC, typeD},
    ...
}
```

Figure 7:
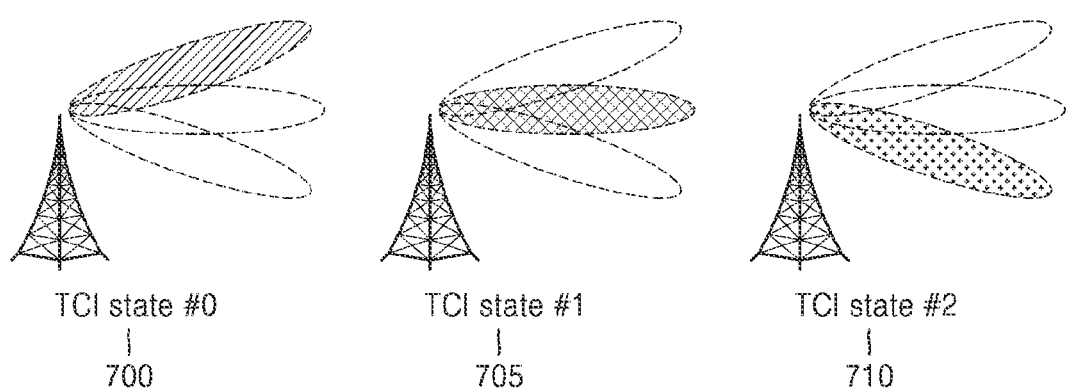
FIG. 7 illustrates BS beam allocation according to transmission configuration indication (TCI) state configurations according to an embodiment.

FIG. 7 illustrates BS beam allocation according to TCI state configurations.

Referring to FIG. 7, the BS may deliver information about N different beams to the UE via N different TCI states. For example, in a case of N=3, the BS may associate qcl-Type2 parameters included in three TCI states 700, 705, and 710 with CSI-RSs or SSBs corresponding to the different beams and may configure the qci-Type2 parameters as QCL type D. By doing so, the BS may indicate that antenna ports referring to the different TCI states 700, 705, and 710 are associated with different spatial Rx parameters, i.e., different beams.

TCI state combinations applicable to PDCCH DMRS antenna ports are shown in Table 10 below. The fourth row in Table 10 indicates a combination assumed by the UE before RRC configuration and configuration after RRC is not available.

TABLE 10

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
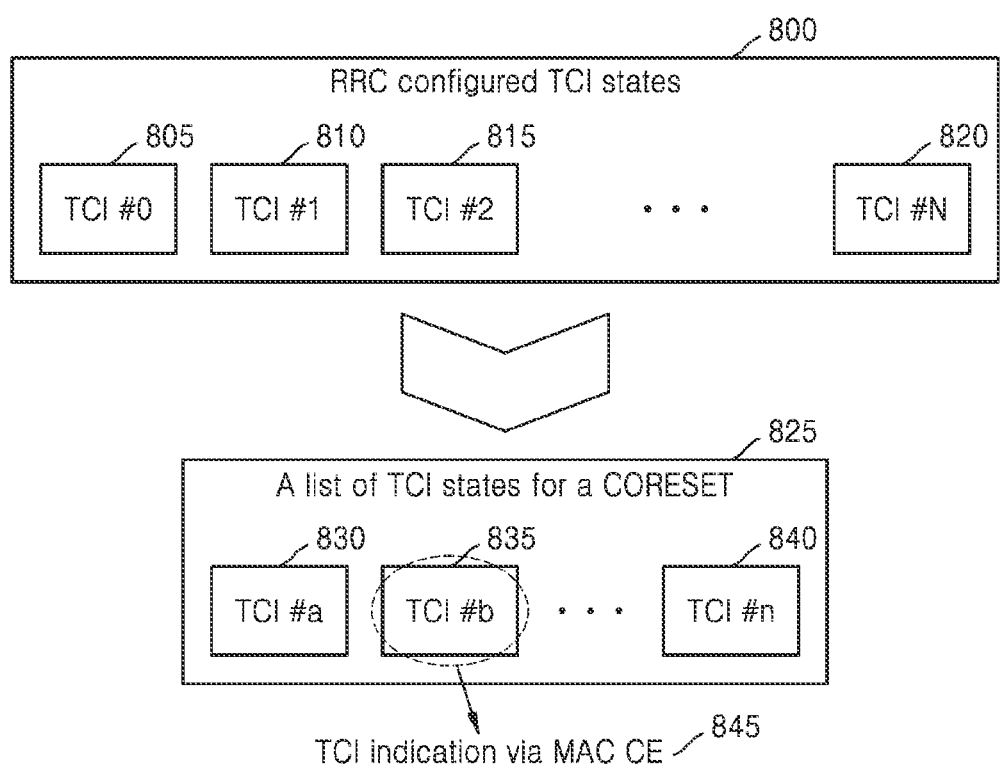
FIG. 8 illustrates a hierarchical signaling method of NR for dynamic allocation of PDCCH beams according to an embodiment.

FIG. 8 illustrates a hierarchical signaling method of NR for dynamic allocation of PDCCH beams. For example, NR supports the hierarchical signaling method as illustrated in FIG. 8 for dynamic allocation of PDCCH beams.

Referring to FIG. 8, the BS may configure N TCI states 805, 810, and 820 for the UE by RRC signaling 800, and may configure some of them as TCI states for a CORESET in 825. Next, the BS may indicate one of the TCI states 830, 835, and 840 for the CORESET to the UE by MAC CE signaling in 845. Thereafter, the UE may receive a PDCCH based on beam information included in the TCI state indicated by the MAC CE signaling.

Figure 9:
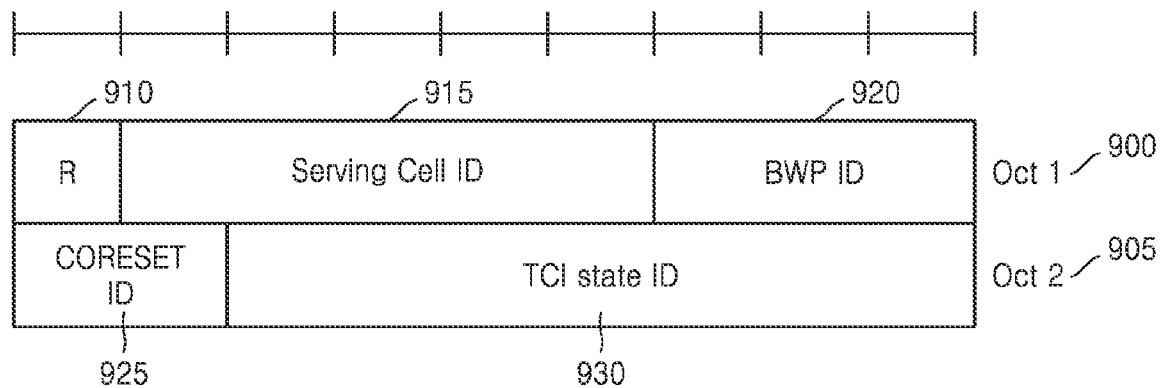
FIG. 9 illustrates a TCI indication medium access control (MAC) control element (CE) signaling structure for a PDCCH DMRS according to an embodiment.

FIG. 9 illustrates a TCI indication MAC CE signaling structure for a PDCCH DMRS.

Referring to FIG. 9, the TCI indication MAC CE signaling for the PDCCH DMRS may include 2 bytes (16 bits) Oct1 900 and Oct2 905 and may include a serving cell ID 915 of 5 bits, a CORESET ID 920 of 4 bits, and a TCI state ID 925 of 7 bits.

The BS may indicate a TCI state in a TCI state list included in a CORESET configuration by MAC CE signaling. The UE may consider that same QCL information is applied to all of one or more search spaces associated with the CORESET until another TCI state is indicated for the CORESET by another MAC CE signaling.

However, the above-described PDCCH beam allocation method has a problem in indicating beam switching earlier than the MAC CE signaling delay and has a problem in applying the same beam uniformly for each CORESET regardless of search space characteristics, such that it is difficult for flexible PDCCH beam operation.

Hereinafter, an embodiment of the disclosure provides a more flexible PDCCH beam configuration and operation method. Although several distinct examples will be used for describing the embodiments of the disclosure, the examples are not mutually exclusive but may be applied in an appropriate combination depending on the situation.

A BS may configure a UE with one or more TCI states for a particular CORESET, and may activate one of the configured TCI states by a MAC CE activation command. For example, TCI states {TCI state #0, TCI state #1 and TCI state #2} may be configured for CORESET #1, and the BS may transmit, to the UE, an activation command to assume TCI state #0 for the TCI state for CORESET #1 via MAC CE. The UE may correctly receive a DMRS of the CORESET based on QCL information in the activated TCI state, based on the activation command for the TCI state received via the MAC CE.

When the UE fails to receive the MAC CE activation command for a TCI state for a CORESET indexed with 0 (i.e., the CORESET #0), the UE may assume that a DMRS transmitted in CORESET #0 is QCLed with an SSB identified in an initial access procedure or in a non-contention based random access procedure that is not triggered by a PDCCH command.

With respect to a CORESET (CORESET #X) configured with a different index value (X) instead of index 0, when the UE is not configured with a TCI state for the CORESET #X or is configured with one or more TCI states, but fails to receive the MAC CE activation command for activating one of the configured one or more TCI states, the UE may assume that a DMRS transmitted in CORESET #X is QCLed with an SSB identified in an initial access procedure.

Hereinafter, DCI in a 5G system will be described in detail.

In a 5G system, scheduling information for UL data (or PUSCH) or DL data (or PDSCH) may be transmitted in the DCI from the BS to the UE. The UE may monitor a fallback DCI format and a non-fallback DCI format for PUSCH or PDSCH. The fallback DCI format may include a fixed field predefined between the BS and the UE, and the non-fallback DCI format may include a configurable field.

DCI may be transmitted on a PDCCH after channel coding and modulation processes. CRC may be added to a DCI message payload, and the CRC may be scrambled by an RNTI that corresponds to an ID of the UE. Depending on a purpose of the DCI message, e.g., UE-specific data transmission, power control command, RAR, etc., different RNTIs may be used. That is, the RNTI may not be explicitly transmitted, but may be transmitted in a CRC calculation process.

Upon reception of a DCI message transmitted on the PDCCH, the UE may check CRC by using an allocated RNTI, and may identify that the DCI message is transmitted to the UE, based on a result of the CRC checking.

For example, DCI that schedules a PDSCH for SI may be scrambled by SI-RNTI. DCI that schedules a PDSCH for an RAR message may be scrambled by an RA-RNTI. DCI that schedules a PDSCH for a paging message may be scrambled by a P-RNTI. DCI that notifies an SFI may be scrambled by an SFI-RNTI. DCI that notifies a TPC may be scrambled by a TPC-RNTI. DCI that schedules UE-specific PDSCH or PUSCH may be scrambled by a C-RNTI.

DCI format 0_0 may be used for the fallback DCI that schedules a PUSCH, and here, the CRC may be scrambled by a C-RNTI. The DCI format 0_0 with the CRC scrambled by the C-RNTI may include a plurality of pieces of information as shown in Table 11 below.

TABLE 11

- Identifier for DCI formats - 1 bit
  - The value of this bit field is always set to 0, indicating an UL DCI format
- Frequency domain resource assignment - $\lceil \log_2(N_{RB}^{UL,BWP}(N_{RB}^{UL,BWP}+1)/2) \rceil$ bits where $N_{RB}^{UL,BWP}$ is defined in subclause 7.3.1.0
  - For PUSCH hopping with resource allocation type 1:
    - $N_{UL\_hop}$ MSB bits are used to indicate the frequency offset according to Subclause 6.3 of [6, TS 38.214], where $N_{UL\_hop}$ =1 if the higher layer parameter frequencyHopping OffsetLists contains two offset values and $N_{UL\_hop}$ = 2 if the higher layer parameter frequencyHoppingOffsetLists contains four offset values
    - $\lceil \log_2(N_{RB}^{UL,BWP}(N_{RB}^{UL,BWP}+1)/2) \rceil - N_{UL\_hop}$ bits provides the frequency domain resource allocation according to Subclause 6.1.2.2.2 of [6, TS 38.214]
  - For non-PUSCH hopping with resource allocation type 1:
    - $\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS 38.214]
- Time domain resource assignment- 4 bits as defined in Subclause 6.1.2.1 of [6, TS 38.214]
- Frequency hopping flag – 1 bit according to Table 7.3.1.1.1-3, as defined in Subclause 6.3 of [6, TS 38.214]
- Modulation and coding scheme - 5 bits as defined in Subclause 6.1.4.1 of [6, TS 38.214]
- New data indicator - 1 bit
- Redundancy version - 2 bits as defined in Table 7.3.1.1.1-2
- HARQ process number - 4 bits
- TPC command for scheduled PUSCH - 2 bits as defined in Subclause 7.1.1 of [5, TS 38.213]
- Padding bits, if required.
- UL/SUL indicator - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
  - If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
  - If the UL/SUL indicator is not present in DCI format 0_0 and pucch-Config is configured, the corresponding PUSCH scheduled by the DCI format 0_0 is for the UL or SUL for which high layer parameter pucch-Config is configured.
  - If the UL/SUL indicator is not present in DCI format 0_0 and pucch-Config is not configured, the corresponding PUSCH scheduled by the DCI format 0_0 is for the uplink on which the latest PRACH is transmitted.

DCI format 0_1 may be used for the non-fallback DCI that schedules a PUSCH, and here, the CRC may be scrambled by a C-RNTI. The DCI format 0_1 with the CRC scrambled by the C-RNTI may include a plurality of pieces of information as shown in Table 12 below.

TABLE 12

- Identifier for DCI formats - 1 bit
  - The value of this bit field is always set to 0, indicating an UL DCI format
- Carrier indicator - 0 or 3 bits, as defined in Subclause 10.1 of [5, TS38.213].
- UL/SUL indicator - 0 bit for UEs not configured with supplementaryUplink in ServingCellConfig in the cell or UEs configured with supplementaryUplink in ServingCellConfig in the cell but only PUCCH carrier in the cell is configured for PUSCH transmission; otherwise, 1 bit as defined in Table 7.3.1.1.1-1.
- Bandwidth part indicator - 0, 1 or 2 bits as determined by the number of UL BWPs $n_{BWP,RRC}$ configured by higher layers, excluding the initial UL bandwidth part. The bitwidth for this field is determined as $\lceil \log_2(n_{BWP}) \rceil$ bits, where
  - $n_{BWP} = n_{BWP,RRC} + 1$ if $n_{BWP,RRC} \leq 3$, in which case the bandwidth part indicator is equivalent to the ascending order of the higher layer parameter BWP-Id;
  - otherwise $n_{BWP} = n_{BWP,RRC}$, in which case the bandwidth part indicator is defined in Table 7.3.1.1.2-1;
  If a UE does not support active BWP change via DCI, the UE ignores this bit field.
- Frequency domain resource assignment - number of bits determined by the following, where $N_{RB}^{UL,BWP}$ is the size of the active UL bandwidth part:
  - $N_{RBG}$ bits if only resource allocation type 0 is configured, where $N_{RBG}$ is defined in Subclause 6.1.2.2.1 of [6, TS 38.214],
  - $\lceil \log_2(N_{RB}^{UL,BWP}(N_{RB}^{UL,BWP} + 1)/2) \rceil$ bits if only resource allocation type 1 is configured, or max ($\lceil \log_2(N_{RB}^{UL,BWP}(N_{RB}^{UL,BWP} + 1)/2) \rceil$, $N_{RGB}$) + 1 bits if both resource allocation type 0 and 1 are configured.
  - If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  - For resource allocation type 0, the $N_{RBG}$ LSBs provide the resource allocation as defined in Subclause 6.1.2.2.1 of [6, TS 38.214].
  - For resource allocation type 1, the $\lceil \log_2(N_{RB}^{UL,BWP}(N_{RB}^{UL,BWP} + 1)/2) \rceil$ LSBs provide the resource allocation as follows:
    - For PUSCH hopping with resource allocation type 1:
      - $N_{UL\_hop}$ MSB bits are used to indicate the frequency offset according to Subclause 6.3 of [6, TS 38.214], where $N_{UL\_hop} = 1$ if the higher layer parameter frequencyHoppingOffsetLists contains two offset values and $N_{UL\_hop} = 2$ if the higher layer parameter frequencyHoppingOffsetLists contains four offset values
      - $\lceil \log_2(N_{RB}^{UL,BWP}(N_{RB}^{UL,BWP} + 1)/2) \rceil - N_{UL\_hop}$ bits provides the frequency domain resource allocation according to Subclause 6.1.2.2.2 of [6, TS 38.214]
    - For non-PUSCH hopping with resource allocation type 1:
      - $\lceil \log_2(N_{RB}^{UL,BWP}(N_{RB}^{UL,BWP} + 1)/2) \rceil$ bits provides the frequency domain resource allocation according to Subclause 6.1.2.2.2 of [6, TS 38.214]
  If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
- Time domain resource assignment - 0, 1, 2, 3, or 4 bits as defined in Subclause 6.1.2.1 of [6, TS38.214]. The bitwidth for this field is determined as $\lceil \log_2(I) \rceil$ bits, where I is the number of entries in the higher layer parameter pusch-TimeDomainAllocationList if the higher layer parameter is configured; otherwise I is the number of entries in the default table.
- Frequency hopping flag - 0 or 1 bit:
  - 0 bit if only resource allocation type 0 is configured or if the higher layer parameter frequencyHopping is not configured;
  - 1 bit according to Table 7.3.1.1.1-3 otherwise, only applicable to resource allocation type 1, as defined in Subclause 6.3 of [6, TS 38.214].
- Modulation and coding scheme - 5 bits as defined in Subclause 6.1.4.1 of [6, TS 38.214]
- New data indicator - 1 bit
- Redundancy version - 2 bits as defined in Table 7.3.1.1.1-2
- HARQ process number - 4 bits
- 1$^{st}$ downlink assignment index - 1 or 2 bits:
  - 1 bit for semi-static HARQ-ACK codebook;
  - 2 bits for dynamic HARQ-ACK codebook.
- 2$^{nd}$ downlink assignment index - 0 or 2 bits:
  - 2 bits for dynamic HARQ-ACK codebook with two HARQ-ACK sub-codebooks;
  - 0 bit otherwise.
- TPC command for scheduled PUSCH - 2 bits as defined in Subclause 7.1.1 of [5, TS38.213]
- SRS resource indicator - $\left\lceil \log_2\left( \sum_{k=1}^{\min\{L_{max}, N_{SRS}\}} \binom{N_{SRS}}{k} \right) \right\rceil$ or $\lceil \log_2(N_{SRS}) \rceil$ bits, where $N_{SRS}$ TABLE 12-continued is the number of configured SRS resources in the SRS resource set associated with
the higher layer parameter usage of value 'codeBook' or 'nonCodeBook', $$-\log_2\left(\sum_{k=1}^{\min\{L_{max},N_{SRS}\}}\binom{N_{SRS}}{k}\right)$$ bits according to Tables 7.3.1.1.2–28/29/30/31 if the higher layer parameter txConfig = nonCodebook, where $N_{SRS}$ is the number of
configured SRS resources in the SRS resource set associated with the higher layer
parameter usage of value 'nonCodeBook' and
- if UE supports operation with maxMIMO-Layers and the higher layer
  parameter maxMIMO-Layers of PUSCH-ServingCellConfig of the serving cell
  is configured, $L_{max}$ is given by that parameter
- otherwise, $L_{max}$ is given by the maximum number of layers for PUSCH
  supported by the UE for the serving cell for non-codebook based operation.
- $\lceil \log_2(N_{SRS}) \rceil$ bits according to Tables 7.3.1.1.2-32 if the higher layer parameter
  txConfig = codebook, where $N_{SRS}$ is the number of configured SRS resources in
  the SRS resource set associated with the higher layer parameter usage of value
  'codeBook'.
- Precoding information and number of layers - number of bits determined by the following:
  - 0 bits if the higher layer parameter txConfig = nonCodeBook;
  - 0 bits for 1 antenna port and if the higher layer parameter txConfig = codebook;
  - 4, 5, or 6 bits according to Table 7.3.1.1.2-2 for 4 antenna ports, if txConfig =
    codebook, and according to whether transform precoder is enabled or disabled,
    and the values of higher layer parameters maxRank, and codebookSubset;
  - 2, 4, or 5 bits according to Table 7.3.1.1.2-3 for 4 antenna ports, if txConfig =
    codebook, and according to whether transform precoder is enabled or disabled,
    and the values of higher layer parameters maxRank, and codebookSubset;
  - 2 or 4 bits according to Table7.3.1.1.2-4 for 2 antenna ports, if txConfig =
    codebook, and according to whether transform precoder is enabled or disabled,
    and the values of higher layer parameters maxRank and codebookSubset;
  - 1 or 3 bits according to Table7.3.1.1.2-5 for 2 antenna ports, if txConfig =
    codebook, and according to whether transform precoder is enabled or disabled,
    and the values of higher layer parameters maxRank and codebookSubset.
- Antenna ports - number of bits determined by the following
  - 2 bits as defined by Tables 7.3.1.1.2-6, if transform precoder is enabled, dmrs-
    Type=1, and maxLength=1;
  - 4 bits as defined by Tables 7.3.1.1.2-7, if transform precoder is enabled, dmrs-
    Type=1, and maxLength=2;
  - 3 bits as defined by Tables 7.3.1.1.2-8/9/10/11, if transform precoder is disabled,
    dmrs-Type=1, and maxLength=1, and the value of rank is determined according to
    the SRS resource indicator field if the higher layer parameter txConfig =
    nonCodebook and according to the Precoding information and number of layers
    field if the higher layer parameter txConfig = codebook;
  - 4 bits as defined by Tables 7.3.1.1.2-12/13/14/15, if transform precoder is
    disabled, dmrs-Type=1, and maxLength=2, and the value of rank is determined
    according to the SRS resource indicator field if the higher layer parameter
    txConfig = nonCodebook and according to the Precoding information and number
    of layers field if the higher layer parameter txConfig = codebook;
  - 4 bits as defined by Tables 7.3.1.1.2-16/17/18/19, if transform precoder is
    disabled, dmrs-Type=2, and maxLength=1, and the value of rank is determined
    according to the SRS resource indicator field if the higher layer parameter
    txConfig = nonCodebook and according to the Precoding information and number
    of layers field if the higher layer parameter txConfig = codebook;
  - 5 bits as defined by Tables 7.3.1.1.2-20/21/22/23, if transform precoder is
    disabled, dmrs-Type=2, and maxLength=2, and the value of rank is determined
    according to the SRS resource indicator field if the higher layer parameter
    txConfig = nonCodebook and according to the Precoding information and number
    of layers field if the higher layer parameter txConfig = codebook.
  where the number of CDM groups without data of values 1, 2, and 3 in Tables
  7.3.1.1.2-6 to 7.3.1.1.2-23 refers to CDM groups {0}, {0, 1}, and {0, 1, 2}
  respectively.
  If a UE is configured with both dmrs-UplinkForPUSCH-MappingTypeA and dmrs-
  UplinkForPUSCH-MappingTypeB, the bitwidth of this field equals max $\{x_A, x_B\}$,
  where $x_A$ is the "Antenna ports" bitwidth derived according to dmrs-
  UplinkForPUSCH-MappingTypeA and $x_B$ is the "Antenna ports" bitwidth derived
  according to dmrs-UplinkForPUSCH-MappingTypeB. A number of $|x_A - x_B|$ zeros
  are padded in the MSB of this field, if the mapping type of the PUSCH corresponds
  to the smaller value of $x_A$ and $x_B$.
- SRS request - 2 bits as defined by Table 7.3.1.1.2-24 for UEs not configured with
  supplementaryUplink in ServingCellConfig in the cell; 3 bits for UEs configured with
  supplementaryUplink in ServingCellConfig in the cell where the first bit is the non-
  SUL/SUL indicator as defined in Table 7.3.1.1.1-1 and the second and third bits are
  defined by Table 7.3.1.1.2-24. This bit field may also indicate the associated CSI-RS
  according to Subclause 6.1.1.2 of [6, TS 38.214].
- CSI request - 0, 1, 2, 3, 4, 5, or 6 bits determined by higher layer parameter
  reportTriggerSize.
- CBG transmission information (CBGTI) - 0 bit if higher layer parameter
  codeBlockGroupTransmission for PDSCH is not configured, otherwise, 2, 4, 6, or 8

TABLE 12-continued bits determined by higher layer parameter maxCodeBlockGroupsPerTransportBlock
  for PUSCH.
- PTRS-DMRS association - number of bits determined as follows
  - 0 bit if PTRS-UplinkConfig is not configured and transform precoder is disabled,
    or if transform precoder is enabled, or if maxRank=1;
  - 2 bits otherwise, where Table 7.3.1.1.2-25 and 7.3.1.1.2-26 are used to indicate the
    association between PTRS port(s) and DMRS port(s) for transmission of one PT-
    RS port and two PT-RS ports respectively, and the DMRS ports are indicated by
    the Antenna ports field.
  If "Bandwidth part indicator" field indicates a bandwidth part other than the active
  bandwidth part and the "PTRS-DMRS association" field is present for the indicated
  bandwidth part but not present for the active bandwidth part, the UE assumes the
  "PTRS-DMRS association" field is not present for the indicated bandwidth part.
- beta_offset indicator - 0 if the higher layer parameter betaOffsets = semiStatic;
  otherwise 2 bits as defined by Table 9.3-3 in [5, TS 38.213].
- DMRS sequence initialization - 0 bit if transform precoder is enabled; 1 bit if
  transform precoder is disabled.
- UL-SCH indicator - 1 bit. A value of "1" indicates UL-SCH shall be transmitted on
  the PUSCH and a value of "0" indicates UL-SCH shall not be transmitted on the
  PUSCH. Except for DCI format 0_1 with CRC scrambled by SP-CSI-RNTI, a UE is
  not expected to receive a DCI format 0_1 with UL-SCH indicator of "0" and CSI
  request of all zero(s).

DCI format 1_0 may be used for the fallback DCI that schedules a PDSCH, and here, the CRC may be scrambled by a C-RNTI. The DCI format 1_0 with the CRC scrambled by the C-RNTI may include a plurality of pieces of information as shown in Table 13 below.

TABLE 13

- Identifier for DCI formats - 1 bits
  - The value of this bit field is always set to 1, indicating a DL DCI format
- Frequency domain resource assignment - $\lceil \log_2(N_{RB}^{DL,BWP}(N_{RB}^{DL,BWP}+1)/2) \rceil$ bits where
  $N_{RB}^{DL,BWP}$ is given by subclause 7.3.1.0
If the CRC of the DCI format 1_0 is scrambled by C-RNTI and the "Frequency domain resource
assignment" field are of all ones, the DCI format 1_0 is for random access procedure initiated by a
PDCCH order, with all remaining fields set as follows:
- Random Access Preamble index - 6 bits according to ra-PreambleIndex in Subclause 5.1.2 of [8,
  TS38.321]
- UL/SUL indicator - 1 bit. If the value of the "Random Access Preamble index" is not all zeros and if
  the UE is configured with supplementaryUplink in ServingCellConfig in the cell, this field indicates
  which UL carrier in the cell to transmit the PRACH according to Table 7.3.1.1.1-1; otherwise, this
  field is reserved
- SS/PBCH index - 6 bits. If the value of the "Random Access Preamble index" is not all zeros, this
  field indicates the SS/PBCH that shall be used to determine the RACH occasion for the PRACH
  transmission; otherwise, this field is reserved.
- PRACH Mask index - 4 bits. If the value of the "Random Access Preamble index" is not all zeros, this
  field indicates the RACH occasion associated with the SS/PBCH indicated by "SS/PBCH index" for
  the PRACH transmission, according to Subclause 5.1.1 of [8, TS38.321]; otherwise, this field is
  reserved
- Reserved bits - 10 bits
Otherwise, all remaining fields are set as follows:
- Time domain resource assignment - 4 bits as defined in Subclause 5.1.2.1 of [6, TS 38.214]
- VRB-to-PRB mapping - 1 bit according to Table 7.3.1.2.2-5
- Modulation and coding scheme - 5 bits as defined in Subclause 5.1.3 of [6, TS 38.214]
- New data indicator - 1 bit
- Redundancy version - 2 bits as defined in Table 7.3.1.1.1-2
- HARQ process number - 4 bits
- Downlink assignment index - 2 bits as defined in Subclause 9.1.3 of [5, TS 38.213], as counter DAI
- TPC command for scheduled PUCCH - 2 bits as defined in Subclause 7.2.1 of [5, TS 38.213]
- PUCCH resource indicator - 3 bits as defined in Subclause 9.2.3 of [5, TS 38.213]
- PDSCH-to-HARQ_feedback timing indicator - 3 bits as defined in Subclause 9.2.3 of [5, TS38.213]

DCI format 1_1 may be used for the non-fallback DCI that schedules a PDSCH, and here, the CRC may be scrambled by a C-RNTI. The DCI format 1_1 with the CRC scrambled by the C-RNTI may include a plurality of pieces of information as shown in Table 14 below.

TABLE 14

- Identifier for DCI formats - 1 bits
  - The value of this bit field is always set to 1, indicating a DL DCI format
- Carrier indicator - 0 or 3 bits as defined in Subclause 10.1 of [5, TS 38.213].
- Bandwidth part indicator - 0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where
  - $n_{BWP} = n_{BWP,RRC} + 1$ if $n_{BWP,RRC} \leq 3$, in which case the bandwidth part indicator is equivalent to the ascending order of the higher layer parameter BWP-Id;
  - otherwise $n_{BWP} = n_{BWP,RRC}$, in which case the bandwidth part indicator is defined in Table 7.3.1.1.2-1;
  If a UE does not support active BWP change via DCI, the UE ignores this bit field.
- Frequency domain resource assignment - number of bits determined by the following, where $N_{RB}^{DL,BWP}$ is the size of the active DL bandwidth part:
  - $N_{RBG}$ bits if only resource allocation type 0 is configured, where $N_{RBG}$ is defined in Subclause 5.1.2.2.1 of [6, TS38.214],
  - $\lceil \log_2(N_{RB}^{DL,BWP}(N_{RB}^{DL,BWP}+1)/2) \rceil$ bits if only resource allocation type 1 is configured, or
  - max ($\lceil \log_2(N_{RBDL,BWP}(N_{RBDL,BWP}+1)/2) \rceil$ , $N_{RBG}$ )+1 bits if both resource allocation type 0 and 1 are configured.
  - If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  - For resource allocation type 0, the $N_{RBG}$ LSBs provide the resource allocation as defined in Subclause 5.1.2.2.1 of [6, TS 38.214].
  - For resource allocation type 1, the $\lceil \log_2(N_{RB}^{DL,BWP}(N_{RB}^{DL,BWP}+1)/2) \rceil$ LSBs provide the resource allocation as defined in Subclause 5.1.2.2.2 of [6, TS 38.214]
  If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
  - Time domain resource assignment - 0, 1, 2, 3, or 4 bits as defined in Subclause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entries in the default table.
- VRB-to-PRB mapping - 0 or 1 bit:
  - 0 bit if only resource allocation type 0 is configured or if interleaved VRB-to-PRB mapping is not configured by high layers;
  - 1 bit according to Table 7.3.1.2.2-5 otherwise, only applicable to resource allocation type 1, as defined in Subclause 7.3.1.6 of [4, TS 38.211].
- PRB bundling size indicator - 0 bit if the higher layer parameter prb-BundlingType is not configured or is set to 'static', or 1 bit if the higher layer parameter prb-BundlingType is set to 'dynamic' according to Subclause 5.1.2.3 of [6, TS 38.214].
- Rate matching indicator - 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.
- ZP CSI-RS trigger - 0, 1, or 2 bits as defined in Subclause 5.1.4.2 of [6, TS 38.214]. The bitwidth for this field is determined as $\lceil \log_2(n_{ZP}+1) \rceil$ bits, where $n_{ZP}$ is the number of aperiodic ZP CSI-RS resource sets configured by higher layer.
For transport block 1:
  - Modulation and coding scheme - 5 bits as defined in Subclause 5.1.3.1 of [6, TS 38.214]
  - New data indicator - 1 bit
  - Redundancy version - 2 bits as defined in Table 7.3.1.1.1-2
For transport block 2 (only present if maxNrofCodeWordsScheduledByDCI equals 2):
  - Modulation and coding scheme - 5 bits as defined in Subclause 5.1.3.1 of [6, TS 38.214]
  - New data indicator - 1 bit
  - Redundancy version - 2 bits as defined in Table 7.3.1.1.1-2
  If "Bandwidth part indicator" field indicates a bandwidth part other than the active bandwidth part and the value of maxNrofCode WordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields of transport block 2 for the indicated bandwidth part.
- HARQ process number - 4 bits
- Downlink assignment index - number of bits as defined in the following
  - 4 bits if more than one serving cell are configured in the DL and the higher layer parameter pdsch-HARQ-ACK-Codebook=dynamic, where the 2 MSB bits are the counter DAI and the 2 LSB bits are the total DAI;
  - 2 bits if only one serving cell is configured in the DL and the higher layer parameter pdsch-HARQ-ACK-Codebook=dynamic, where the 2 bits are the counter DAI;
  - 0 bits otherwise.
- TPC command for scheduled PUCCH - 2 bits as defined in Subclause 7.2.1 of [5, TS 38.213]
- PUCCH resource indicator - 3 bits as defined in Subclause 9.2.3 of [5, TS 38.213]
- PDSCH-to-HARQ_feedback timing indicator - 0, 1, 2, or 3 bits as defined in Subclause 9.2.3 of [5,

TABLE 14-continued

TS 38.213]. The bitwidth for this field is determined as $[\log_2(I)]$ bits, where I is the number of entries in the higher layer parameter dl-DataToUL-ACK.
- Antenna port(s) - 4, 5, or 6 bits as defined by Tables 7.3.1.2.2-1/2/3/4, where the number of CDM groups without data of values 1, 2, and 3 refers to CDM groups {0}, {0,1}, and {0, 1,2} respectively. The antenna ports $\{p_0,..., p_{v-1}\}$ shall be determined according to the ordering of DMRS port(s) given by Tables 7.3.1.2.2-1/2/3/4.
   If a UE is configured with both dmrs-DownlinkForPDSCH-MappingTypeA and dmrs-DownlinkForPDSCH-MappingTypeB, the bitwidth of this field equals max $\{x_A, x_B\}$, where $x_A$ is the "Antenna ports" bitwidth derived according to dmrs-DownlinkForPDSCH-MappingTypeA and $x_B$ is the "Antenna ports" bitwidth derived according to dmrs-DownlinkForPDSCH-MappingTypeB. A number of $|x_A - x_B|$ zeros are padded in the MSB of this field, if the mapping type of the PDSCH corresponds to the smaller value of $x_A$ and $x_B$.
- Transmission configuration indication - 0 bit if higher layer parameter tci-PresentInDCI is not enabled; otherwise 3 bits as defined in Subclause 5.1.5 of [6, TS38.214].
   If "Bandwidth part indicator" field indicates a bandwidth part other than the active bandwidth part,
   - if the higher layer parameter tci-PresentInDCI is not enabled for the CORESET used for the PDCCH carrying the DCI format 1_1,
     - the UE assumes tci-PresentInDCI is not enabled for all CORESETs in the indicated bandwidth part;
   - otherwise,
     - the UE assumes tci-PresentInDCI is enabled for all CORESETs in the indicated bandwidth part.
- SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].
- CBG transmission information (CBGTI) - 0 bit if higher layer parameter codeBlockGroupTransmission for PDSCH is not configured, otherwise, 2, 4, 6, or 8 bits as defined in Subclause 5.1.7 of [6, TS38.214], determined by the higher layer parameters maxCodeBlockGroupsPerTransportBlock and maxNrofCode WordsScheduledByDCI for the PDSCH.
- CBG flushing out information (CBGFI) - 1 bit if higher layer parameter code BlockGroupFlushIndicator is configured as "TRUE", 0 bit otherwise.
- DMRS sequence initialization - 1 bit.

Hereinafter, a time domain resource allocation method for a data channel in the 5G communication system will be described.

A BS may configure a UE with a table of time domain resource allocation information for a DL data channel (e.g., a PDSCH) and a UL data channel (e.g., a PUSCH) by higher layer signaling (e.g., RRC signaling). For the PDSCH, a table including maximally up to 16 (maxNrofDL-Allocations=16) entries may be configured, and for the PUSCH, a table including maximally up to 16 (maxNrofUL-Allocations=16) entries may be configured. For example, the time domain resource allocation information may include PDCCH-to-PDSCH slot timing (corresponding to a time interval in slots between a reception time of PDCCH and a transmission time of PDSCH scheduled by the received PDCCH, and indicated as K0), PDCCH-to-PUSCH slot timing (corresponding to a time interval in slots between a reception time of PDCCH and a transmission time of PUSCH scheduled by the received PDCCH, and indicated as K2), information about location and length of a start symbol scheduled on the PDSCH or the PUSCH in the slot, a mapping type of PDSCH or PUSCH, etc. For example, a plurality of pieces of information as in Tables 15 and 16 below may be informed from the BS to the UE.

TABLE 15

PDSCH-TimeDomainResourceAllocationList information element

```
PDSCH-TimeDomainResourceAllocationList ::=  SEQUENCE  (SIZE (1..maxNrofDL-Allocations) )  OF PDSCH-
TimeDomainResourceAllocation
PDSCH-TimeDomainResourceAllocation  ::=  SEQUENCE  {
       k0                                                                                  INTEGER (0..32)
OPTIONAL,       -- Need S
           (PDCCH-to-PDSCH timing, slot unit)
       mappingType                           ENUMERATED   { typeA, typeB},
           (PDSCH mapping type)
       startSymbolAndLength                  INTEGER   (0..127)
           (start symbol and length of PDSCH)
}
```

TABLE 16

PUSCH-TimeDomainResourceAllocation information element

```
PUSCH-TimeDomainResourceAllocationList  ::=  SEQUENCE (SIZE (1..maxNrofUL-Allocations) )  OF
PUSCH-TimeDomainResourceAllocation
PUSCH-TimeDomainResourceAllocation  ::=  SEQUENCE  {
    k2                                INTEGER (0..32)      OPTIONAL,    -- Need S
        (PDCCH-to-PUSCH timing, slot unit)
    mappingType                       ENUMERATED  { typeA, typeB},
        (PUSCH mapping type)
    startSymbolAndLength              INTEGER   (0..127)
        (start symbol and length of PUSCH)
}
```

The BS may notify the UE of at least one of the entries in Tables 15 and 16 about the time domain resource allocation information by layer 1 (L1) signaling (e.g., DCI) (e.g., the one entry may be indicated in a 'time domain resource allocation' field in the DCI). The UE may obtain the time domain resource allocation information for the PDSCH or the PUSCH, based on the DCI received from the BS.

Hereinafter, a frequency domain resource allocation method for a data channel in a 5G communication system will be described.

A 5G communication system supports two types of resource allocation, i.e., resource allocation type 0 and resource allocation type 1, as a method of indicating frequency domain resource allocation information with respect to a PDSCH and a PUSCH.

Resource Allocation Type 0

RB allocation information may be notified from the BS to the UE in the form of a bitmap with respect to a RB group (RBG). Here, the RBG may include a set of sequential virtual RBs (VRBs), and size P of the RBG may be determined based on a value configured by a higher layer parameter (rbg-Size) and a value of a BWP as defined in Table 17 below.

TABLE 17

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

A total number of RBGs ($N_{RBG}$) of a BWP i of which size is $N_{BWP_i}^{size}$ may be defined as shown below.

$N_{RBG} = \lceil N_{BWP_i}^{size} + (N_{BWP_i}^{start} \bmod P) \rceil / P$, where the size of the first RBG is $RBG_0^{size} = P - (N_{BWP_i}^{start} \bmod P)$, the size of last RBG is $RBG_{last}^{size} = (N_{BWP_i}^{size} + N_{BWP_i}^{start}) \bmod P$, if $(N_{BWP_i}^{size} + N_{BWP_i}^{start}) \bmod P > 0$ and P otherwise, the size of all other RBGs is P.

Bits of a bitmap with a size of $N_{RBG}$ bits may respectively correspond to RBGs. The RBGs may be allocated indices in order from a lowest frequency location of a BWP to a higher frequency. With respect to $N_{RBG}$ RBGs in a BWP, RBG #0 through RBG # ($N_{RBG}$−1) may be sequentially mapped from a most significant bit (MSB) to a least significant bit (LSB) in the bitmap of an RBG. When a particular bit value in the bitmap is 1, the UE may determine that an RBG corresponding to the bit value is allocated, and when a particular bit value in the bitmap is 0, the UE may determine that an RBG corresponding to the bit value is not allocated.

Resource Allocation Type 1

It is information about a start location and length of VRBs to which RB allocation information is sequentially allocated, and may be notified from the BS to the UE. Here, interleaving or non-interleaving may be additionally applied to the sequentially-allocated VRBs. A resource allocation field of resource allocation type 1 may be configured of a resource indication value (RIV), and the RIV may be configured of a VRB start point $RB_{start}$ and a length of a sequentially-allocated RB $L_{RBs}$. In more detail, a RIV in a BWP having a size of $N_{BWP}^{size}$ may be defined as shown below.

- if $(L_{RBS} - 1) \leq \lfloor N_{BWP}^{size}/2 \rfloor$ then
    - $RIV = N_{BWP}^{size}(L_{RBS} - 1) + RB_{start}$
- else
    - $RIV = N_{BWP}^{size}(N_{BWP}^{size} - L_{RBS} - 1) + (N_{BWP}^{size} - 1 - RB_{start})$
- where $L_{RBS} \geq 1$ and shall not exceed $N_{BWP}^{size} - RB_{start}$ The BS may semi-statically configure the UE with time and frequency transmission resources and various transmission and reception parameters for a PDSCH and a PUSCH so as to support grant-based transmission and reception with respect to the DL data channel (e.g., the PDSCH) or the UL data channel (e.g., the PUSCH).

More specifically, the BS may configure the UE with a plurality of pieces of information as shown in Table 18 below, by higher layer signaling (e.g., RRC signaling), so as to support DL semi-persistent scheduling (SPS).

TABLE 18

```
SPS-Config ::=                            SEQUENCE {
periodicity (transmission periodicity)              ENUMERATED {ms10,
ms20, ms32, ms40, ms64, ms80, ms128, ms160, ms320, ms640,
spare6, spare5, spare4, spare3, spare2, spare1},
nrofHARQ-Processes (HARQ process no.)    INTEGER (1..8),
PUCCH-ResourceId
n1PUCCH-AN (HARQ transmission resource)    PUCCH-ResourceId
```

TABLE 18-continued

```
OPTIONAL,     -- Need M
mcs-Table              ENUMERATED {qam64LowSE}
OPTIONAL,     -- Need S
...
}
```

DL SPS may be configured in a primary cell or a secondary cell, and in one cell group, DL SPS may be configured in one cell.

In a 5G communication system, two types (Type-1 PUSCH transmission with a configured grant and Type-2 PUSCH transmission with a configured grant) may be supported as a configured grant (or grant free)-based transmission method with respect to a PUSCH.

Type-1 PUSCH Transmission with Configured Grant

In Type-1 PUSCH transmission with a configured grant, the BS may configure, by higher layer signaling such as RRC signaling, the UE with a specific time/frequency resource on which configured-grant PUSCH transmission is allowed. For example, time-axis allocation information, frequency-axis allocation information, periodicity information, etc., with respect to the resource may be configured. Also, the BS may configure the UE with various parameters (e.g., frequency hopping, DMRS configuration, modulation coding scheme (MCS) table, MCS, RBG size, the number of repetition transmissions, redundancy version (RV), etc.) by higher layer signaling. For example, a plurality of pieces of configuration information as shown in Table 19 may be included.

TABLE 19

```
ConfiguredGrantConfig    : :=              SEQUENCE  {
    frequencyHopping                    ENUMERATED  {mode1, mode2 }
                             OPTIONAL,   -- Need S,
    cg-DMRS-Configuration               DMRS-UplinkConfig,
    mcs-Table                           ENUMERATED  {qam256,  spare1}
                             OPTIONAL,   -- Need S
    mcs-TableTransformPrecoder          ENUMERATED  {qam256,
spare1}                      OPTIONAL,   -- Need S
    uci-OnPUSCH                         SetupRelease  {  CG-UCI-OnPUSCH
},
    resourceAllocation                  ENUMERATED  {
resourceAllocationType0,  resourceAllocationType1,
dynamicSwitch  },
    rbg-Size                            ENUMERATED  {config2}
                             OPTIONAL,   -- Need S
    powerControl LoopToUse              ENUMERATED  {n0, n1},
    p0-PUSCH-Alpha                         P0-PUSCH-AlphaSetId,
    transformPrecoder                   ENUMERATED  {enabled}
                             OPTIONAL,   -- Need S
    nrofHARQ-Processes                  INTEGER (1..16),
    repK                                ENUMERATED  {n1, n2, n4, n8} ,
    repK-RV                             ENUMERATED  {s1-0231, s2-0303, s3-
0000}                        OPTIONAL,   -- Cond RepK
    periodicity                         ENUMERATED  {
                                            sym2,  sym7,  sym1x14,  sym2x14,
sym4x14,  sym5x14,  sym8x14,  sym10x14,  sym16x14,  sym20x14,
                                            sym32x14,  sym40x14,  sym64x14,
sym80x14,  sym128x14,  sym160x14,  sym256x14,  sym320x14,
sym512x14,
                                            sym640x14,  sym1024x14,
sym1280x14, sym2560x14, sym5120x14,
                                            sym6,  sym1x12,  sym2x12,
sym4x12, sym5x12, sym8x12, sym10x12, sym16x12, sym20x12,
sym32x12,
                                            sym40x12, sym64x12, sym80x12,
sym128x12, sym160x12, sym256x12, sym320x12, sym512x12,
sym640x12,
sym1280x12, sym2560x12
                                        },
    configuredGrantTimer                INTEGER  (1..64)
                             OPTIONAL,   -- Need R
    rrc-ConfiguredUplinkGrant                      SEQUENCE  {
        timeDomainOffset                           INTEGER  (0..5119),
        timeDomainAllocation                       INTEGER  (0..15) ,
        frequencyDomainAllocation                      BIT STRING  (SIZE(18)),
            antennaPort         INTEGER      (0..31),
            dmrs-SeqInitialization                 INTEGER    (0..1)
                             OPTIONAL,   -- Cond NoTransformPrecoder
            precodingAndNumberOfLayers             INTEGER    (0..63) ,
            srs-Resource Indicator                 INTEGER    (0..15),
```

TABLE 19-continued

```
        mcsAndTBS                    INTEGER   (0..31) ,
        frequencyHoppingOffset       INTEGER   (1..
maxNrofPhysicalResourceBlocks-1)              OPTIONAL,   -- Need M
        pathlossReference Index INTEGER (0. . maxNrofPUSCH-
PathlossReferenceRSs-1) ,
        ...
    }
        OPTIONAL   -- Need R
}
```

When the UE receives configuration information for a Type-1 PUSCH transmission with a configured grant from the BS, the UE may periodically transmit a PUSCH on the configured resource, without permission from the BS. Various parameters (e.g., frequency hopping, DMRS configuration, MCS, RBG size, the number of repetition transmissions, RV, precoding, the number of layers, antenna ports, frequency hopping offset, etc.) may follow configuration values notified by the BS.

Type-2 PUSCH Transmission with Configured Grant

In Type-2 PUSCH transmission with a configured grant, the BS may configure, by higher layer signaling (e.g., RRC signaling), the UE with some information (e.g., periodicity information) from among information about a specific time/frequency resource on which configured-grant PUSCH transmission is allowed. Also, the BS may configure the UE with various parameters (e.g., frequency hopping, DMRS configuration, MCS table, RBG size, the number of repetition transmissions, RV, etc.) by higher layer signaling. For example, the BS may configure, by higher layer signaling, the UE with a plurality of pieces of configuration information as shown in Table 20.

TABLE 20

```
ConfiguredGrantConfig   : : =           SEQUENCE   {
    frequencyHopping                    ENUMERATED   { mode1,  mode2}
                            OPTIONAL,   -- Need S,
    cg-DMRS-Configuration               DMRS-UplinkConfig,
    mcs-Table                           ENUMERATED   {qam256,  spare1}
                            OPTIONAL,   -- Need S
    mcs-TableTransformPrecoder          ENUMERATED   {qam256,
spare1}                         OPTIONAL,   -- Need S
    uci-OnPUSCH                         SetupRelease  {  CG-UCI-OnPUSCH
},
    resourceAllocation                  ENUMERATED   {
resourceAllocationType0,  resourceAllocationType1,
dynamicSwitch   },
    rbg-Size                            ENUMERATED   {config2}
                OPTIONAL,   -- Need S
    powerControlLoopToUse               ENUMERATED   {n0, n1},
    p0-PUSCH-Alpha                      P0-PUSCH-AlphaSetId,
    transformPrecoder                   ENUMERATED   {enabled}
                            OPTIONAL,   -- Need S
    nrofHARQ-Processes                  INTEGER   (1..16) ,
    repK                                ENUMERATED   {n1, n2, n4, n8} ,
    repK-RV                             ENUMERATED   {s1-0231, s2-0303, s3-
0000}                   OPTIONAL,   -- Cond RepK
    periodicity                                 ENUMERATED   {
                                sym2, sym7, sym1x14, sym2x14,
sym4x14, sym5x14, sym8x14, sym10x14, sym16x14, sym20x14,
                                sym32x14, sym40x14, sym64x14,
sym80x14, sym128x14, sym160x14, sym256x14, sym320x14,
sym512x14,
                                sym640x14, sym1024x14,
sym1280x14, sym2560x14, sym5120x14,
                                sym6, sym1x12, sym2x12,
sym4x12, sym5x12, sym8x12, sym10x12, sym16x12, sym20x12,
sym32x12,
                                sym40x12, sym64x12, sym80x12,
sym128x12, sym160x12, sym256x12, sym320x12, sym512x12,
sym640x12, sym1280x12, sym2560x12
                    } ,
    configuredGrantTimer                INTEGER   (1..64)
                    OPTIONAL, Need R
}
```

The BS may transmit, to the UE, DCI including a specific DCI field value for scheduling activation or scheduling release with respect to DL SPS and UL grant Type 2.

The BS may configure the UE with a CS-RNTI, and the UE may monitor a DCI format with a CRC scrambled by the CS-RNTI. When the CRC of the DCI format received by the UE is scrambled by the CS-RNTI, a new data indicator (NDI) is set to '0', and the DCI field satisfies Table 21 below, the UE may regard the DCI as an instruction to activate transmission and reception respect to DL SPS or UL grant Type 2.

TABLE 21

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

The BS may configure the UE with a CS-RNTI, and the UE may monitor a DCI format with a CRC scrambled by the CS-RNTI. When the CRC of the DCI format received by the UE is scrambled by the CS-RNTI, an NDI is set to '0', and the DCI field satisfies Table 22 below, the UE may regard the DCI as an instruction to activate transmission and reception respect to DL SPS or UL grant Type 2.

TABLE 22

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Frequency domain resource assignment | set to all '1's | set to all '1's |

As the DCI indicating release with respect to DL SPS or UL grant Type 2 follows a DCI format corresponding to DCI format 0_0 or DCI format 1_0, and DCI format 0_0 or 1_0 does not include a carrier indicator field (CIF), in order to receive a release command with respect to DL SPS or UL grant Type 2 for a specific cell, the UE should perform monitoring of a PDCCH in a cell for which corresponding DL SPS or UL grant Type 2 is always configured. Even when a specific cell is configured with cross-carrier scheduling, in order to receive a release command with respect to DL SPS or UL grant Type 2 for the specific cell, the UE monitors DCI format 1_0 or DCI format 0_0 in the corresponding cell.

Hereinafter, a CA and scheduling method in a 5G communication system will be described in detail.

A UE may be configured with a plurality of cells (or component carriers (CCs)) from a BS, and may be configured with respect to cross-carrier scheduling for the cells configured for the UE. If cross-carrier scheduling is configured for a specific cell (cell A, scheduled cell), PDCCH monitoring with respect to cell A may not be performed in cell A, but may be performed in another cell (cell B, scheduling cell) indicated as cross-carrier scheduling. Here, scheduled cell (cell A) and scheduling cell (cell B) may be configured with different numerologies. Here, the numerology may include subcarrier spacing, a CP, etc. When numerologies of cell A and cell B are different, and a PDCCH of cell B schedules a PDSCH of cell B, minimum scheduling offset as below may be additionally considered between the PDCCH and the PDSCH.

Cross-Carrier Scheduling Method

When subcarrier spacing ($\mu_B$) of cell B is smaller than subcarrier spacing ($\mu_A$) of cell A, the PDSCH may be scheduled from a next PDSCH slot of a PDSCH slot after X symbol from a last symbol of the PDCCH received in cell B. Here, X may be different depending on $\mu_B$, it may be defined as X=4 symbol when $\mu_B$=15 kHz, X=4 symbol when $\mu_B$=30 kHz, and X=8 symbol when $\mu_B$=60 kHz.

When subcarrier spacing ($\mu_B$) of cell B is larger than subcarrier spacing ($\mu_A$) of cell A, the PDSCH may be scheduled from a PDSCH slot after X symbol from a last symbol of the PDCCH received in cell B. Here, X may be different depending on $\mu_B$, and it may be defined as X=4 symbol when $\mu_B$=30 kHz, X=8 symbol when $\mu_B$=60 kHz, and X=12 symbol when $\mu_B$=120 kHz.

Hereinafter, a rate matching operation and a puncturing operation will be described in detail.

When time and frequency resource A on which a random symbol sequence A is intended to be transmitted overlaps with random time and frequency resource B, a rate matching operation or a puncturing operation may be considered for operations of transmission and reception of channel A (or the symbol sequence A), in consideration of resource C of a region on which the resource A and the resource B are overlapped. Detailed operations will now be provided.

Rate Matching Operation

The BS may transmit a symbol sequence A by mapping channel A (or the symbol sequence A) to the whole resource A on which the symbol sequence A is intended to be transmitted to the UE, except for a region of the resource A which corresponds to the resource C overlapping with the resource B. For example, when the symbol sequence A includes {symbol #1, symbol #2, symbol #3, and symbol #4}, the resource A includes {resource #1, resource #2, resource #3, and resource #4} and the resource B includes {resource #3 and resource #5}, the BS may transmit the symbol sequence A by sequentially mapping the symbol sequence A to resources {resource #1, resource #2, and resource #4} of the resource A excluding {resource #3} corresponding to the resource C. As a result, the BS may transmit the symbol sequence {symbol #1, symbol #2, and symbol #3} by respectively mapping them to {resource #1, resource #2, and resource #4}.

The UE may determine the resource A and the resource B from scheduling information for the symbol sequence A from the BS, and thus, may determine the resource C corresponding to an overlapping region between the resource A and the resource B. The UE may receive the symbol sequence A assuming that the symbol sequence A is transmitted by being mapped to the whole resource A excluding the resource C. For example, when the symbol sequence A includes {symbol #1, symbol #2, symbol #3, and symbol #4}, the resource A includes {resource #1, resource #2, resource #3 and, resource #4} and the resource B includes {resource #3 and resource #5}, the UE may receive the symbol sequence A assuming that the symbol sequence A is sequentially mapped to resources {resource #1, resource #2, and resource #4} of the resource A excluding {resource #3} corresponding to the resource C. As a result, the UE may assume that the symbol sequence {symbol #1, symbol #2, and symbol #3} is transmitted by being respectively mapped to {resource #1, resource #2, and resource #4}, and may perform a series of next operations.

Puncturing Operation

When there is the resource C corresponding to an overlapping region between the whole resource A on which the symbol sequence A is intended to be transmitted to the UE and the resource B, the BS may map the symbol sequence A to the whole resource A, and may perform transmission in the resource regions of the resource A, excluding the resource C, i.e., without performing transmission on the resource region corresponding to the resource C. For example, when the symbol sequence A includes {symbol #1, symbol #2, symbol #3, and symbol #4}, the resource A includes {resource #1, resource #2, resource #3, and resource #4} and the resource B includes {resource #3 and resource #5}, the BS may map the symbol sequence A {symbol #1, symbol #2, symbol #3, and symbol #4} to the resource A {resource #1, resource #2, resource #3 and resource #4}, and may transmit a symbol sequence {symbol #1, symbol #2, and symbol #4} corresponding to resource regions {resource #1, resource #2, and resource #4} of the resource A excluding {resource #3} corresponding to the resource C without transmitting {symbol #3} mapped to {resource #3} corresponding to the resource C. As a result, the BS may transmit the symbol sequence {symbol #1, symbol #2, and symbol #4} by respectively mapping them to {resource #1, resource #2, and resource #4}.

The UE may determine the resource A and the resource B from scheduling information for the symbol sequence A from the BS, and thus, may determine the resource C corresponding to an overlapping region between the resource A and the resource B. The UE may receive the symbol sequence A assuming that the symbol sequence A is mapped to the whole resource A, but transmitted only on the regions of the resource A, excluding the resource C. For example, when the symbol sequence A includes {symbol #1, symbol #2, symbol #3, and symbol #4}, the resource A includes {resource #1, resource #2, resource #3, and resource #4} and the resource B includes {resource #3 and resource #5}, the UE may perform reception assuming that the symbol sequence A {symbol #1, symbol #2, symbol #3, and symbol #4} are mapped to the resource A {resource #1, resource #2, resource #3 and resource #4}, but {symbol #1, symbol #2, and symbol #4} of the symbol sequence A mapped to {resource #1, resource #2, and resource #4} are transmitted without {symbol #3} mapped to {resource #3} corresponding to the resource C. As a result, the UE may assume that the symbol sequence {symbol #1, symbol #2, and symbol #4} is transmitted by being respectively mapped to {resource #1, resource #2, and resource #4}, and may perform a series of next operations.

Figure 10:
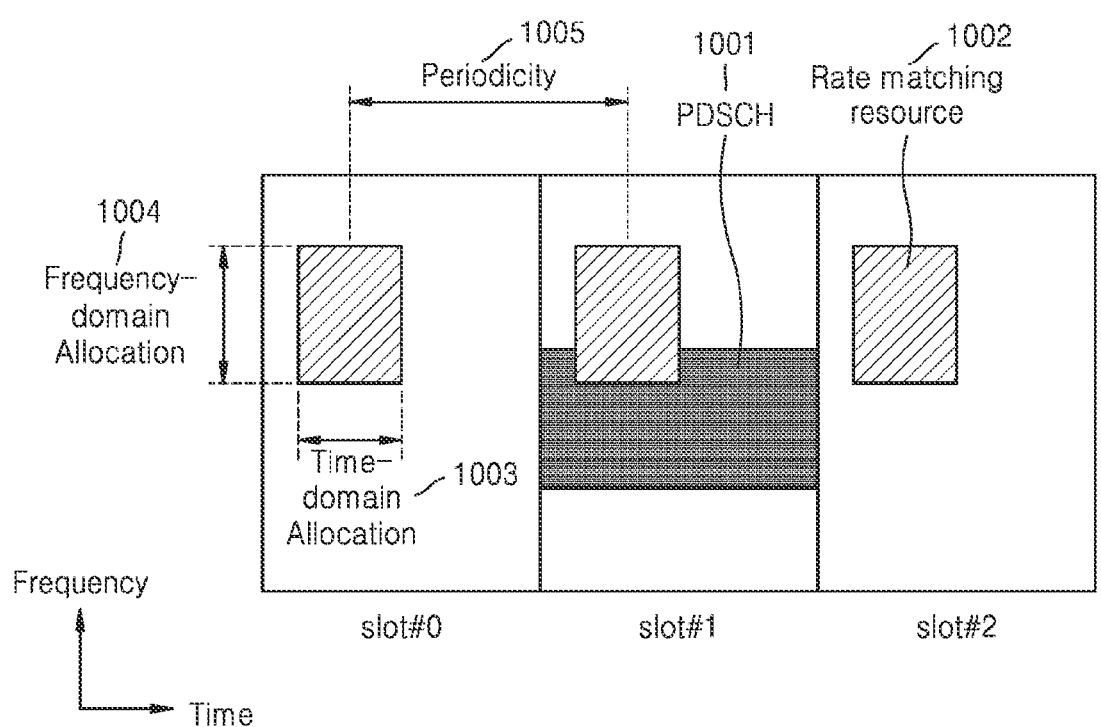
FIG. 10 illustrates a method by which a BS and a UE transmit or receive data by considering a DL data channel and a rate matching resource according to an embodiment.

FIG. 10 illustrates a method by which a BS and a UE transmit or receive data by considering a DL data channel and a rate matching resource.

Referring to FIG. 10, a DL data channel (e.g., a PDSCH) 1001 and a rate matching resource 1002 are illustrated. The BS may configure the UE with one or more rate matching resources 1002 by higher layer signaling (e.g., RRC signaling). Configuration information for the rate matching resource 1002 may include time-domain resource allocation information 1003, frequency-domain resource allocation information 1004, and periodicity information 1005. Hereinafter, a bitmap corresponding to the frequency-domain resource allocation information 1004 is referred to as a "first bitmap", a bitmap corresponding to the time-domain resource allocation information 1003 is referred to as a "second bitmap", and a bitmap corresponding to the periodicity information 1005 is referred to as a "third bitmap". When all or some of time and frequency resources of the scheduled data channel 1001 overlap with the configured rate matching resource 1002, the BS may transmit the data channel 1101 by performing rate matching on the data channel 1001 in a portion of the rate matching resource 1002, and the UE may assume that the data channel 1001 has been rate matched in the portion of the rate matching resource 1002 and then may receive and decode the data channel 1001.

Through additional configuration, the BS may dynamically notify whether to perform rate matching on the data channel in the portion of the configured rate matching resource to the UE via DCI (corresponding to the "rate matching indicator" in the DCI format described above). The BS may select and group some of the configured rate matching resources into a rate matching resource group, and may indicate whether to perform rate matching on the data channel for each rate matching resource group to the UE by DCI in a bitmap scheme. For example, when there are four rate matching resources configured, e.g., RMR #1, RMR #2, RMR #3, and RMR #4, the BS may configure rate matching groups RMG #1={RMR #1, RMR #2} and RMG #2={RMR #3, RMR #4}, and may indicate, by using 2 bits in a DCI field, whether to perform rate matching in each of RMG #1 and RMG #2 to the UE in a bitmap. For example, the BS may indicate "1" when the rate matching is to be performed and may indicate "0" when the rate matching is not to be performed.

A 5G communication system supports "RB symbol level" and "RE level" granularities for a method of configuring the rate matching resource for the UE. In more detail, a configuration method below may be performed.

RB Symbol Level

A UE may be configured with maximally up to four RateMatchPatterns for each BWP by higher layer signaling, and each RateMatchPattern may include information below.

For a reserved resource on a BWP, a resource configured with time and frequency resource region of the reserved resource in a combination of a symbol level bitmap and an RB level bitmap on the frequency axis may be included. The reserved resource may span one or two slots. A time domain pattern (periodicityAndPattern) in which a time and frequency region consisting of an RB-level and symbol-level bitmap pair is repeated may be additionally configured.

A time and frequency domain resource region configured with a CORESET on a BWP and a resource region corresponding to a time domain pattern configured with a search space configuration in which the time and frequency domain resource region is repeated may be included.

RE Level

A UE may be configured with conditions below by higher layer signaling.

configuration information (lte-CRS-ToMatchAround) for an RE corresponding to an LTE cell-specific reference signal or common reference signal (CRS) pattern which may include the number of LTE CRS ports (nrofCRS-Ports), an LTE-CRS-vshift(s) value (v-shift), center subcarrier location information (carrierFreqDL) of an LTE carrier from a reference frequency point (e.g., reference point A), bandwidth size information of an LTE carrier (carrierBandwidthDL), and subframe configuration information (mbsfn-SubframConfigList) corresponding to a multicast-broadcast single-frequency network (MBSFN). The UE may determine a location of a CRS in an NR slot corresponding to an LTE subframe based on a plurality of pieces of information described above.

Configuration information about a resource set corresponding to one or multiple zero power (ZP) CSI-RSs in a BWP.

Hereinafter, a method of measuring and reporting a channel state in a 5G communication system will be described in detail.

CSI may include at least one channel quality information (CQI), a precoding matrix indicator (PMI), a CSI-RS resource indicator (CRI), an SSB resource indicator (SSBRI), a layer indicator (LI), a rank indicator (RI), an L1-reference signal received power (L1-RSRP), etc. The BS may control time and frequency resource for the CSI measurement and reporting by the UE.

For the CSI measurement and reporting, the UE may be configured, by higher layer signaling, setting information for N(≥1) CSI reports (CSI-ReportConfig), setting information for M(≥1) RS transmission resources (CSI-ResourceConfig), and one or two trigger state (CSI-AperiodicTriggerStateList, CSI-SemiPersistentOnPUSCH-TriggerStateList) list information.

The configuration information for the CSI measurement and reporting may be as shown in Tables 23 to 29 below.

TABLE 23

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214, clause 5.2.1.
CSI-ReportConfig information element

```
-- ASN1START
-- TAG-CSI-REPORTCONFIG-START
CSI-ReportConfig ::=                    SEQUENCE {
    reportConfigId                          CSI-ReportConfigId,
    carrier                                 ServCellIndex            OPTIONAL,   -- Need S
    resources ForChannelMeasurement         CSI-ResourceConfigId,
    csi-IM-Resources ForInterference        CSI-ResourceConfigId     OPTIONAL,   -- Need R
    nzp-CSI-RS-Resources ForInterference    CSI-ResourceConfigId     OPTIONAL,   -- Need R
    reportConfigType                        CHOICE {
        periodic                                SEQUENCE {
            reportSlotConfig                        CSI-ReportPeriodicityAndOffset,
            pucch-CSI-ResourceList                  SEQUENCE (SIZE (1..maxNrofBWPs) ) OF PUCCH-CSI-Resource
        },
        semiPersistentOnPUCCH                   SEQUENCE {
            reportSlotConfig CSI-ReportPeriodicityAndOffset,
            pucch-CSI-ResourceList SEQUENCE (SIZE (1.. maxNrofBWPs) ) OF PUCCH-CSI-Resource
        },
        semiPersistentOnPUSCH                   SEQUENCE {
            reportSlotConfig                        ENUMERATED  {s15, s110, s120, s140, s180, sl160, s1320},
            reportSlotOffsetList                    SEQUENCE (SIZE (1..maxNrofUL-Allocations) ) OF INTEGER (0..32) ,
            p0alpha                                 P0-PUSCH-AlphaSetId
        },
        aperiodic                               SEQUENCE {
            reportSlotOffsetList                    SEQUENCE (SIZE (1..maxNrofUL-Allocations ) ) OF INTEGER (0..32)
        }
    },
    reportQuantity                          CHOICE {
        none                                    NULL,
        cri-RI-PMI-CQI                          NULL,
        cri-RI-i1                               NULL,
        cri-RI-i1-CQI                           SEQUENCE {
            pdsch-BundleSizeForCSI                  ENUMERATED  {n2, n4}     OPTIONAL     -- Need S
        },
        cri-RI-CQI                              NULL,
        cri-RSRP                                NULL,
        ssb-Index-RSRP                          NULL,
        cri-RI-LI-PMI-CQI                       NULL
    },
    reportFreqConfiguration                 SEQUENCE {
        cqi-FormatIndicator                     ENUMERATED { widebandCQI,  subbandCQI }    OPTIONAL,   -- Need R
        pmi-FormatIndicator                     ENUMERATED { widebandPMI,  subbandPMI }    OPTIONAL,   -- Need R
        csi-ReportingBand                       CHOICE {
            subbands 3                              BIT STRING (SIZE (3) ),
            subbands 4                              BIT STRING (SIZE (4) ),
            subbands 5                              BIT STRING (SIZE (5) ),
            subbands 6                              BIT STRING (SIZE (6) ),
            subbands 7                              BIT STRING (SIZE (7) ),
            subbands 8                              BIT STRING (SIZE (8) ),
            subbands 9                              BIT STRING (SIZE (9) ),
            subbands10                              BIT STRING (SIZE (10) ),
            subbands11                              BIT STRING (SIZE (11) ),
            subbands 12                             BIT STRING (SIZE (12) ),
            subbands13                              BIT STRING (SIZE (13) ),
            subbands 14                             BIT STRING (SIZE (14) ),
            subbands 15                             BIT STRING (SIZE (15) ),
            subbands16                              BIT STRING (SIZE (16) ),
```

TABLE 23-continued

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214, clause 5.2.1.
CSI-ReportConfig information element

```
            subbands 17                                 BIT STRING (SIZE (17) ),
            subbands 18                                 BIT STRING (SIZE (18) ),
            ...,
            subbands19-v1530                            BIT STRING (SIZE (19) )
        }   OPTIONAL       -- Need S
    }
    OPTIONAL,    -- Need R
        timeRestriction ForChannelMeasurements          ENUMERATED   {configured, notConfigured},
        timeRestriction ForInterferenceMeasurements     ENUMERATED   {configured, notConfigured},
        codebookConfig                                  CodebookConfig
    OPTIONAL,    -- Need R
        dummy                                           ENUMERATED   {n1, n2}
    OPTIONAL,    -- Need R
        groupBasedBeamReporting                         CHOICE {
            enabled                                         NULL,
            disabled                                        SEQUENCE {
                nrofReportedRS                                  ENUMERATED   {n1, n2, n3, n4}
    OPTIONAL     -- Need S
            }
        },
        cqi-Table                                       ENUMERATED   { table1, table2, table3, spare1}
    OPTIONAL,    -- Need R
        subbandSize                                     ENUMERATED   {value1, value2},
        non-PMI-PortIndication                          SEQUENCE  (SIZE   (1..maxNrofNZP-CSI-RS-Resources PerConfig) )
    OF PortIndexFor8Ranks  OPTIONAL,    Need R
        ...,
        [[
        semiPersistentOnPUSCH-v1530                     SEQUENCE {
            reportSlotConfig-v1530                          ENUMERATED   {s14, s18, s116}
        }
    OPTIONAL     -- Need R
        ]]
    }
    CSI-ReportPeriodicityAndOffset  ::=   CHOICE {
        slots4                                          INTEGER (0..3),
        slots5                                          INTEGER (0..4),
        slots8                                          INTEGER (0..7),
        slots10                                         INTEGER (0..9),
        slots16                                         INTEGER (0..15),
        slots20                                         INTEGER (0..19),
        slots40                                         INTEGER (0..39),
        slots80                                         INTEGER (0..79),
        slots160                                        INTEGER (0..159),
        slots320                                        INTEGER (0..319)
    }
    PUCCH-CSI-Resource ::=                              SEQUENCE {
        uplinkBandwidthPartId                               BWP-Id,
        pucch-Resource                                      PUCCH-ResourceId
    }
    PortIndex For8Ranks ::=                             CHOICE {
        portIndex8                                          SEQUENCE{
            rank1-8                                             PortIndex8
    OPTIONAL,    -- Need R
            rank2-8                                             SEQUENCE (SIZE (2) )  OF PortIndex8
    OPTIONAL,    -- Need R
            rank3-8                                             SEQUENCE (SIZE (3) )  OF PortIndex8
    OPTIONAL,    -- Need R
            rank4-8                                             SEQUENCE (SIZE (4) )  OF PortIndex8
    OPTIONAL,    -- Need R
            rank5-8                                             SEQUENCE ( SIZE (5) )   OF PortIndex8
    OPTIONAL,    -- Need R
            rank6-8                                             SEQUENCE (SIZE (6) )  OF PortIndex8
    OPTIONAL,    -- Need R
            rank7-8                                             SEQUENCE (SIZE (7) )  OF PortIndex8
    OPTIONAL,    -- Need R
            rank8-8                                             SEQUENCE (SIZE (8) )  OF PortIndex8
    OPTIONAL     -- Need R
        },
        portIndex4                                          SEQUENCE{
            rank1-4                                             PortIndex4
    OPTIONAL,    -- Need R
            rank2-4                                             SEQUENCE ( SIZE (2) )  OF PortIndex4
```

TABLE 23-continued

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214, clause 5.2.1.

CSI-ReportConfig information element

```
OPTIONAL,    -- Need R
    rank3-4                              SEQUENCE ( SIZE (3) )   OF PortIndex4
OPTIONAL,    -- Need R
    rank4-4                              SEQUENCE (SIZE (4) )   OF PortIndex4
OPTIONAL    -- Need R
    },
    portIndex2                           SEQUENCE
        rank1-2                          PortIndex2
OPTIONAL, Need R
        rank2-2                          SEQUENCE ( SIZE (2) )   OF PortIndex2
OPTIONAL    -- Need R
    },
    portIndex1                           NULL
}
PortIndex8 : : =                         INTEGER (0..7)
PortIndex4 : : =                         INTEGER (0..3)
PortIndex2 : : =                         INTEGER (0..1)
-- TAG-CSI-REPORTCONFIG-STOP
-- ASN1STOP
```

CSI-ReportConfig field descriptions carrier
Indicates in which serving cell the CSI-ResourceConfig indicated below are to be found. If the field is absent, the resources are on the same serving cell as this report configuration.
codebookConfig
Codebook configuration for Type-1 or Type-II including codebook subset restriction.
cqi-FormatIndicator
Indicates whether the UE shall report a single (wideband) or multiple (subband) CQI. (see TS 38.214, clause 5.2.1.4).
cqi-Table
Which CQI table to use for CQI calculation (see TS 38.214, clause 5.2.2.1).
csi-IM-ResourcesForInterference
CSI IM resources for interference measurement. csi-ResourceConfigId of a CSI-ResourceConfig included in the configuration of the serving cell indicated with the field "carrier" above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement.
csi-ReportingBand
Indicates a contiguous or non-contiguous subset of subbands in the bandwidth part which CSI shall be reported for. Each bit in the bit-string represents one subband. The right-most bit in the bit string represents the lowest subband in the BWP. The choice determines the number of subbands (subbands3 for 3 subbands, subbands4 for 4 subbands, and so on) (see TS 38.214 [19], clause 5.2.1.4). This field is absent if there are less than 24 PRBs (no sub band) and present otherwise, the number of sub bands can be from 3 (24 PRBs, sub band size 8) to 18 (72 PRBs, sub band size 4).
dummy
This field is not used in the specification. If received it shall be ignored by the UE.
groupBasedBeamReporting
Turning on/off group beam based reporting (see TS 38.214, clause 5.2.1.4)
non-PMI-PortIndication
Port indication for RI/CQI calculation. For each CSI-RS resource in the linked ResourceConfig for channel measurement, a port indication for each rank R, indicating which R ports to use. Applicable only for non-PMI feedback (see TS 38.214, clause 5.2.1.4.2).
The first entry in non-PMI-PortIndication corresponds to the NZP-CSI-RS-Resource indicated by the first entry in nzp-CSI-RS-Resources in the NZP-CSI-RS-ResourceSet indicated in the first entry of nzp-CSI-RS-ResourceSetList of the CSI-ResourceConfig whose CSI-ResourceConfigId is indicated in a CSI-MeasId together with the above CSI-ReportConfigId; the second entry in non-PMI-PortIndication corresponds to the NZP-CSI-RS-Resource indicated by the second entry in nzp-CSI-RS-Resources in the NZP-CSI-RS-ResourceSet indicated in the first entry of nzp-CSI-RS-ResourceSetList of the same CSI-ResourceConfig, and so on until the NZP-CSI-RS-Resource indicated by the last entry in nzp-CSI-RS-Resources in the in the NZP-CSI-RS-ResourceSet indicated in the first entry of nzp-CSI-RS-ResourceSetList of the same CSI-ResourceConfig. Then the next entry corresponds to the NZP-CSI-RS-Resource indicated by the first entry in nzp-CSI-RS-Resources in the NZP-CSI-RS-ResourceSet indicated in the second entry of nzp-CSI-RS-ResourceSetList of the same CSI-ResourceConfig and so on.
nrofReportedRS
The number (N) of measured RS resources to be reported per report setting in a non-group-based report. N <= N_max, where N_max is either 2 or 4 depending on UE capability.
(see TS 38.214, clause 5.2.1.4) When the field is absent the UE applies the value 1
nzp-CSI-RS-ResourcesForInterference
NZP CSI RS resources for interference measurement. csi-ResourceConfigId of a CSI-ResourceConfig

| CSI-ReportConfig field descriptions |
| --- |
| included in the configuration of the serving cell indicated with the field "carrier" above. The CSI-ResourceConfig indicated here contains only NZP-CSI-RS resources. The bwp-Id in that CSI-ResourceConfig is the same value as the bwp-Id in the CSI-ResourceConfig indicated by resourcesForChannelMeasurement.<br>p0alpha<br>Index of the p0-alpha set determining the power control for this CSI report transmission (see TS 38.214 [19], clause 6.2.1.2).<br>pdsch-BundleSizeForCSI<br>PRB bundling size to assume for CQI calculation when reportQuantity is CRI/RI/i1/CQI. If the field is absent, the UE assumes that no PRB bundling is applied (see TS 38.214, clause 5.2.1.4.2).<br>pmi-FormatIndicator<br>Indicates whether the UE shall report a single (wideband) or multiple (subband) PMI. (see TS 38.214, clause 5.2.1.4).<br>pucch-CSI-ResourceList<br>Indicates which PUCCH resource to use for reporting on PUCCH.<br>reportConfigType<br>Time domain behavior of reporting configuration<br>reportFreqConfiguration<br>Reporting configuration in the frequency domain. (see TS 38.214, clause 5.2.1.4).<br>reportQuantity<br>The CSI related quantities to report. Corresponds to L1 parameter 'ReportQuantity' (see TS 38.214, clause 5.2.1).<br>reportSlotConfig<br>Periodicity and slot offset (see TS 38.214, clause 5.2.1.4)<br>reportSlotConfig-v1530<br>Extended value range for reportSlotConfig for semi-persistent CSI on PUSCH. If the field is present, the UE shall ignore the value provided in the legacy field (semiPersistentOnPUSCH.reportSlotConfig).<br>reportSlotOffsetList<br>Timing offset Y for semi persistent reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The first report is transmitted in slot n + Y, second report in n + Y + P, where P is the configured periodicity.<br>Timing offset Y for aperiodic reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on (see TS 38.214, clause 5.2.3).<br>resourcesForChannelMeasurement<br>Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig.<br>subbandSize<br>Indicates one out of two possible BWP-dependent values for the subband size as indicated in TS 38.214, table 5.2.1.4-2. If csi-ReportingBand is absent, the UE shall ignore this field.<br>timeRestrictionForChannelMeasurements<br>Time domain measurement restriction for the channel (signal) measurements (see TS 38.214, clause 5.2.1.1)<br>timeRestrictionForInterferenceMeasurements<br>Time domain measurement restriction for interference measurements (see TS 38.214, clause 5.2.1.1) |

TABLE 24

The IE CSI-ResourceConfig defines a group of one or more NZP-CSI-RS-ResourceSet, CSI-IM-ResourceSet and/or CSI-SSB-ResourceSet.
CSI-ResourceConfig information element

```
-- ASN1START
-- TAG-CSI-RESOURCECONFIG-START
CSI-ResourceConfig : : =        SEQUENCE {
    csi-ResourceConfigId        CSI-ResourceConfigId,
    csi-RS-ResourceSetList      CHOICE {
      nzp-CSI-RS-SSB                  SEQUENCE {
        nzp-CSI-RS-ResourceSetList    SEQUENCE (SIZE  (1..maxNrofNZP-CSI-RS-
ResourceSetsPerConfig) )   OF NZP-CSI-RS-ResourceSetId
OPTIONAL,   -- Need R
        csi-SSB-ResourceSetList           SEQUENCE  (SIZE   (1..maxNrofCSI-SSBResourceSetsPerConfig))
OF CSI-SSB-ResourceSetId
OPTIONAL    -- Need R
      },
      csi-IM-ResourceSetList            SEQUENCE  (SIZE   (1..maxNrofCSI-IM-ResourceSets PerConfig) )   OF
CSI-IM-ResourceSetId
```

TABLE 24-continued

The IE CSI-ResourceConfig defines a group of one or more NZP-CSI-RS-ResourceSet,
CSI-IM-ResourceSet and/or CSI-SSB-ResourceSet.
CSI-ResourceConfig information element

```
    },
    bwp-Id                        BWP-Id,
    resourceType                  ENUMERATED   { aperiodic, semiPersistent, periodic },
    ...
}
-- TAG-CSI-RESOURCECONFIG-STOP
-- ASN1STOP
```

CSI-ResourceConfig field descriptions bwp-Id
The DL BWP which the CSI-RS associated with this CSI-ResourceConfig are located in (see
TS 38.214 [19], clause 5.2.1.2
csi-ResourceConfigId
Used in CSI-ReportConfig to refer to an instance of CSI-ResourceConfig
csi-RS-ResourceSetList
Contains up to maxNrofNZP-CSI-RS-ResourceSetsPerConfig resource sets if ResourceConfig Type is
'aperiodic' and 1 otherwise (see TS 38.214 [19], clause 5.2.1.2)
csi-SSB-ResourceSetList
List of SSB resources used for beam measurement and reporting in a resource set (see TS 38.214 [19],
section FFS_Section)
resource Type
Time domain behavior of resource configuration (see TS 38.214 [19], clause 5.2.1.2). It does not apply
to resources provided in the csi-SSB-ResourceSetList.

TABLE 25

The IE NZP-CSI-RS-ResourceSet is a set of Non-Zero-Power
(NZP) CSI-RS resources (their IDs) and set-specific parameters.
NZP-CSI-RS-ResourceSet information element

```
-- ASN1START
-- TAG-NZP-CSI-RS-RESOURCESET-START
NZP-CSI-RS-ResourceSet : :=             SEQUENCE  {
    nzp-CSI-ResourceSetId                   NZP-CSI-RS-ResourceSetId,
    nzp-CSI-RS-Resources                    SEQUENCE  (SIZE  (1..maxNrofNZP-CSI-RS-ResourcesPerSet) )  OF
NZP-CSI-RS-ResourceId,
    repetition                              ENUMERATED  { on, off  }
OPTIONAL,     -- Need S
    aperiodicTriggeringOffset               INTEGER (0..6)
OPTIONAL,     -- Need S
    trs-Info                                ENUMERATED  {true}
OPTIONAL,     -- Need R
    ...
}
-- TAG-NZP-CSI-RS-RESOURCESET-STOP
-- ASN1STOP
```

NZP-CSI-RS-ResourceSet field descriptions aperiodic TriggeringOffset
Offset X between the slot containing the DCI that triggers a set of aperiodic NZP CSI-RS resources and the
slot in which the CSI-RS resource set is transmitted. The value 0 corresponds to 0 slots, value 1
corresponds to 1 slot, value 2 corresponds to 2 slots, value 3 corresponds to 3 slots, value 4 corresponds
to 4 slots, value 5 corresponds to 16 slots, value 6 corresponds to 24 slots. When the field is absent the UE
applies the value 0.
nzp-CSI-RS-Resources
NZP-CSI-RS-Resources associated with this NZP-CSI-RS resource set (see TS 38.214 [19], clause 5.2).
For CSI, there are at most 8 NZP CSI RS resources per resource set
repetition
Indicates whether repetition is on/off. If the field is set to 'OFF' or if the field is absent, the UE may not

| NZP-CSI-RS-ResourceSet field descriptions |
|---|
| assume that the NZP-CSI-RS resources within the resource set are transmitted with the same downlink spatial domain transmission filter and with same NrofPorts in every symbol (see TS 38.214 [19], clauses 5.2.2.3.1 and 5.1.6.1.2). Can only be configured for CSI-RS resource sets which are associated with CSI-ReportConfig with report of L1 RSRP or "no report"<br>trs-Info<br>Indicates that the antenna port for all NZP-CSI-RS resources in the CSI-RS resource set is same. If the field is absent or released the UE applies the value "false" (see TS 38.214 [19], clause 5.2.2.3.1). |

TABLE 26

The IE CSI-SSB-ResourceSet is used to configure one SS/PBCH block resource set which refers to SS/PBCH as indicated in ServingCellConfigCommon.
CSI-SSB-ResourceSet information element

```
-- ASN1START
-- TAG-CSI-SSB-RESOURCESET-START
CSI-SSB-ResourceSet  ::=           SEQUENCE {
    csi-SSB-ResourceSetId              CSI-SSB-ResourceSetId,
    csi-SSB-ResourceList               SEQUENCE (SIZE (1..maxNrofCSI-SSB-ResourcePerSet) ) OF SSB-Index,
    ...
}
-- TAG-CSI-SSB-RESOURCESET-STOP
-- ASN1STOP
```

TABLE 27

The IE CSI-IM-ResourceSet is used to configure a set of one or more CSI Interference Management (IM) resources (their IDs) and set-specific parameters.
CSI-IM-ResourceSet information element

```
-- ASN1START
-- TAG-CSI-IM-RESOURCESET-START
CSI-IM-ResourceSet  ::=           SEQUENCE {
    csi-IM-ResourceSetId              CSI-IM-ResourceSetId,
    csi-IM-Resources                  SEQUENCE (SIZE (1..maxNrofCSI-IM-Resources PerSet) ) OF CSI-
    ...
}
-- TAG-CSI-IM-RESOURCESET-STOP
-- ASN1STOP
```

| CSI-IM-ResourceSet field descriptions |
|---|
| csi-IM-Resources<br>CSI-IM-Resources associated with this CSI-IM-ResourceSet (see TS 38.214 [19], clause 5.2) |

TABLE 28

The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state.
CSI-AperiodicTriggerStateList information element

```
-- ASN1START
-- TAG-CSI-APERIODICTRIGGERSTATELIST--START
CSI-AperiodicTriggerStateList  ::=   SEQUENCE (SIZE (1..maxNrOfCSI-AperiodicTriggers) ) OF CSI-
AperiodicTriggerState
CSI-AperiodicTriggerState  ::=        SEQUENCE {
    associatedReportConfigInfoList        SEQUENCE
(SIZE (1..maxNrofReportConfigPerAperiodicTrigger) )  OF CSI-AssociatedReportConfigInfo,
    ...
```

TABLE 28-continued

The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state.
CSI-AperiodicTriggerStateList information element

```
}
CSI-AssociatedReportConfigInfo   ::=      SEQUENCE {
    reportConfigId                        CSI-ReportConfigId,
    resources ForChannel                  CHOICE {
        nzp-CSI-RS                          SEQUENCE {
            resourceSet                     INTEGER   (1..maxNrofNZP-CSI-RS-
ResourceSets PerConfig) ,
            qcl-info                        SEQUENCE   (SIZE   (1..maxNrofAP-CSI-RS-
Resources PerSet) )   OF TCI-StateId OPTIONAL -- Cond Aperiodic
        },
        csi-SSB-ResourceSet                INTEGER    (1..maxNrofCSI-SSB-ResourceSets PerConfig)
    },
    csi-IM-Resources ForInterference       INTEGER (1..maxNrofCSI-IM-ResourceSetsPerConfig)
OPTIONAL,   --   Cond CSI-EM For Interference
    nzp-CSI-RS-Resources ForInterference   INTEGER   (1..maxNrofNZP-CSI-RS-ResourceSets PerConfig)
OPTIONAL,    --    Cond WZP-CSI-PS-ForInterference
    ...
}
-- TAG-CSI -APERIODICTRIGGERSTATELIST--STOP
-- ASN1STOP
```

CSI-AssociatedReportConfigInfo field descriptions csi-IM-ResourcesForInterference
CSI-IM-ResourceSet for interference measurement. Entry number in csi-IM-ResourceSetList in the CSI-ResourceConfig indicated by csi-IM-ResourcesForInterference in the CSI-ReportConfig indicated by reportConfigId above (1 corresponds to the first entry, 2 to the second entry, and so on). The indicated CSI-IM-ResourceSet should have exactly the same number of resources like the NZP-CSI-RS-ResourceSet indicated in nzp-CSI-RS-ResourcesforChannel.
csi-SSB-ResourceSet
CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (1 corresponds to the first entry, 2 to the second entry, and so on).
nzp-CSI-RS-ResourcesForInterference
NZP-CSI-RS-ResourceSet for interference measurement. Entry number in nzp-CSI-RS-ResourceSetList in the CSI-ResourceConfig indicated by nzp-CSI-RS-ResourcesForInterference in the CSI-ReportConfig indicated by reportConfigId above (1 corresponds to the first entry, 2 to the second entry, and so on).
qcl-info
List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-States ToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on (see TS 38.214 [19], clause 5.2.1.5.1)
reportConfigId
The reportConfigId of one of the CSI-ReportConfigToAddMod configured in CSI-MeasConfig
resourceSet
NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (1 corresponds to the first entry, 2 to the second entry, and so on).

| Conditional Presence | Explanation |
| --- | --- |
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise it is absent. |

| Conditional Presence | Explanation |
|---|---|
| NZP-CSI-RS-ForInterference | This field is optional need M if the CSI-ReportConfig identified by reportConfigId is configured with nzp-CSI-RS-ResourcesForInterference; otherwise it is absent. |

TABLE 29

The CSI-SemiPersistentOnPUSCH-TriggerStateList IE is used to configure the UE with
list of trigger states for semi-persistent reporting of channel state information on L1.
See also TS38.214, clause 5.2.
CSI-SemiPersistentOnPUSCH-TriggerStateList information element -- ASN1START
-- TAG-CSI-SEMIPERSISTENTONPUSCHTRIGGERSTATELIST--START
CSI-SemiPersistentOnPUSCH-TriggerStateList  ::=  SEQUENCE  (SIZE  (1..maxNrOfSemi PersistentPUSCH-Triggers) )  OF CSI-SemiPersistentOnPUSCH-TriggerState
CSI-SemiPersistentOnPUSCH-TriggerState  ::=  SEQUENCE {
    associatedReportConfigInfo
    ...
}
CSI-ReportConfigId,
-- TAG-CSI-SEMIPERSISTENTONPUSCHTRIGGERSTATELIST-STOP
-- ASN1STOP Regarding the aforementioned CSI report setting (CSI-ReportConfig), each report setting (CSI-ReportConfig) may be associated with a CSI resource setting associated with a corresponding report setting and one DL BWP identified by a higher layer parameter bwp-id given by CSI-ResourceConfig. As a time-domain reporting operation with respect to each report setting (CSI-ReportConfig), an aperiodic, semi-persistent, or periodic scheme may be supported, and the time-domain reporting operation may be configured from the BS for the UE by a reportConfigType parameter configured by a higher layer. A semi-persistent CSI reporting method supports a PUCCH-based semi-persistent (semi-PersistentOnPUCCH) reporting method or a PUSCH-based semi-persistent (semi-PersistentOnPUSCH) reporting method. According to the periodic or semi-persistent CSI reporting method, the UE may be configured, from the BS by higher layer signaling, with a PUCCH or PUSCH resource to transmit CSI. Periodicity and slot offset of the PUCCH or PUSCH resource to transmit CSI may be given by numerology of a UL BWP configured for transmission of a CSI report. According to the aperiodic CSI reporting method, the UE may receive, from the BS by L1 signaling (DCI format 0_1 described above), scheduling of a PUSCH resource to transmit CSI.

Regarding the CSI resource setting (CSI-ResourceConfig), each CSI resource setting CSI-ReportConfig may include S(≥1) CSI resource sets (given by higher layer parameter csi-RS-ResourceSetList). The CSI resource set list may be configured of a non-zero power (NZP) CSI-RS resource set and an SSB set or may be configured of a CSI-interference measurement (CSI-IM) resource set. Each CSI resource setting may be located on a DL BWP identified by higher layer parameter bwp-id, and CSI resource setting may be associated with CSI report setting of the same DL BWP. A time-domain operation of a CSI-RS resource in the CSI resource setting may be configured to one of 'aperiodic', 'periodic' or 'semi-persistent' by higher layer parameter resourceType. For the periodic or semi-persistent CSI resource setting, the number of CSI-RS resource sets may be limited to S=1, and configured periodicity and slot offset may be given by numerology of the DL BWP identified by bwp-id. The UE may be configured, from the BS by higher layer signaling, with one or more CSI resource settings for channel or interference measurement, and for example, the CSI resource settings may include CSI resources below.

CSI-IM resource for interference measurement

NZP CSI-RS resource for interference measurement

NZP CSI-RS resource for channel measurement

For CSI-RS resource sets associated with resource setting configured to 'aperiodic', 'periodic' or 'semi-persistent' by higher layer parameter resourceType, a trigger state with respect to CSI report setting in which reportType is configured to 'aperiodic' and resource setting for channel or interference measurement of one or more CCs may be configured by higher layer parameter CSI-AperiodicTriggerStateList.

The aperiodic CSI reporting by the UE may be performed by using a PUSCH, the periodic CSI reporting by the UE may be performed by using a PUCCH, and when the semi-persistent CSI reporting is triggered or activated by DCI, the semi-persistent CSI reporting by the UE may be performed by using a PUSCH, and after the semi-persistent CSI reporting is activated by a MAC CE, the semi-persistent CSI reporting may be performed by using a PUCCH. As described above, CSI resource setting may also be configured to 'aperiodic', 'periodic' or 'semi-persistent'. Combinations of the CSI report setting and the CSI resource setting may be supported, e.g., based on Table 30 below.

TABLE 30

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [TS 38.321]; for reporting on PUSCH, the UE receives triggering on DCI | Triggered by DCI; additionally, activation command [TS 38.321] possible as defined in Subclause 5.2.1.5.1. |
| Semi-Persistent CSI-RS | Not Supported | For reporting on PUCCH, the UE receives an activation command [TS 38.321]; for reporting on PUSCH, the UE receives triggering on DCI | Triggered by DCI; additionally, activation command [TS 38.321] possible as defined in Subclause 5.2.1.5.1. |
| Aperiodic CSI-RS | Not Supported | Not Supported | Triggered by DCI; additionally, activation command [TS 38.321] possible as defined in Subclause 5.2.1.5.1. |

The aperiodic CSI reporting may be triggered by "CSI request" field of the aforementioned DCI format 0_1 corresponding to scheduling DCI with respect to a PUSCH. The UE may monitor a PDCCH, may obtain the DCI format 0_1, and may obtain scheduling information with respect to a PUSCH and a CSI request indicator. The CSI request indicator may be configured with NTS(=0, 1, 2, 3, 4, 5, or 6) bits, and may be determined by higher layer signaling (reportTriggerSize). One trigger state from among one or more aperiodic CSI report trigger states configurable by higher layer signaling (CSI-AperiodicTriggerStateList) may be triggered by the CSI request indicator.

When all bits of the CSI request field are 0, this may indicate that a CSI report is not requested.

If the number (M) of CSI trigger states in configured CSI-AperiodicTriggerStateList is greater than 2NTs−1, M CSI trigger states may be mapped to 2NTs−1 according to a predefined mapping relation, and one trigger state from among 2NTs−1 CSI trigger states may be indicated by the CSI request field.

If the number (M) of CSI trigger states in configured CSI-AperiodicTriggerStateList is equal to or smaller than 2NTs−1, one of M CSI trigger states may be indicated by the CSI request field.

Table 31 below shows an example of a relation between a CSI request indicator and a CSI trigger state indicative by the CSI request indicator.

TABLE 31

| CSI request field | CSI trigger state | CSI-Report-ConfigId | CSI-Resource-ConfigId |
|---|---|---|---|
| 00 | no CSI request | N/A | N/A |
| 01 | CSI trigger state#1 | CSI report#1, CSI report#2 | CSI resource#1, CSI resource#2 |
| 10 | CSI trigger state#2 | CSI report#3 | CSI resource#3 |
| 11 | CSI trigger state#3 | CSI report#4 | CSI resource#4 |

The UE may perform measurement on a CSI resource in the CSI trigger state triggered by the CSI request field, and may generate CSI (including at least one of CQI, PMI, CRI, SSBRI, LI, RI, or L1-RSRP described above) from a result of the measurement. The UE may transmit the generated CSI by using the PUSCH scheduled by the corresponding DCI format 0_1. When one bit corresponding to a UL data indicator (UL-SCH indicator) in the DCI format 0_1 indicates "1", the UE may multiplex UL data (UL-SCH) and the obtained CSI with a PUSCH resource scheduled by the DCI format 0_1 and may transmit it. When one bit corresponding to a UL data indicator (UL-SCH indicator) in the DCI format 0_1 indicates "0", the UE may map only the CSI to a PUSCH resource scheduled by the DCI format 0_1, without UL data (UL-SCH), and may transmit it.

Figure 11:
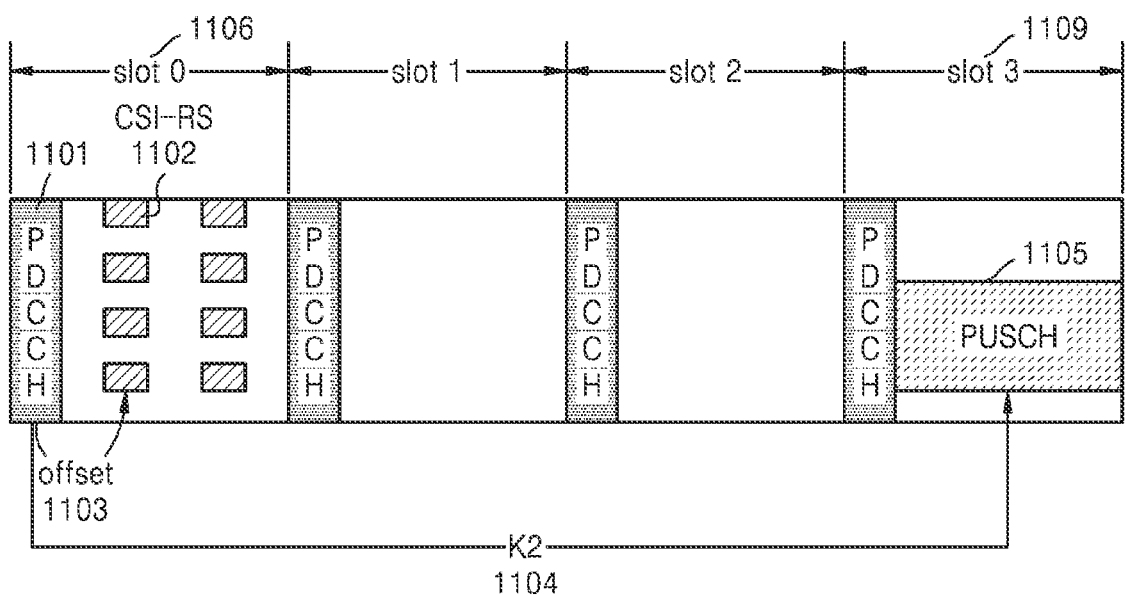
FIG. 11 illustrates an aperiodic channel state information (CSI) reporting method when a CSI-reference signal (CSI-RS) offset is 0 according to an embodiment.
Figure 12:
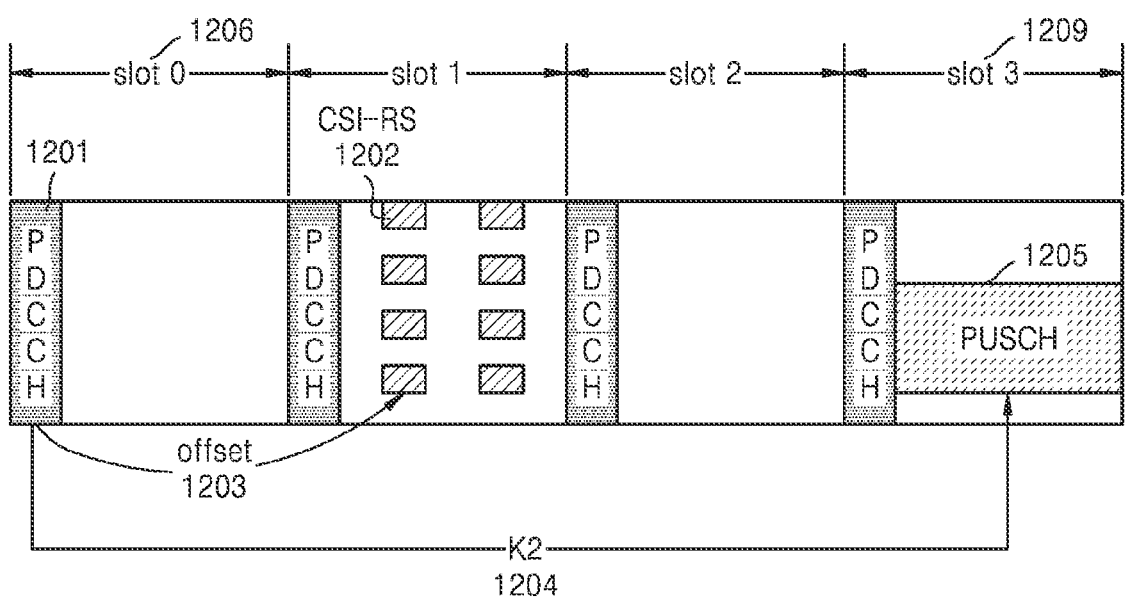
FIG. 12 illustrates an aperiodic CSI reporting method when a CSI-RS offset is 1 according to an embodiment.

FIGS. 11 and 12 illustrate examples of an aperiodic CSI reporting method.

Referring to FIG. 11, a UE may obtain DCI format 0_1 by monitoring a PDCCH 1101, and may obtain, from the DCI format 0_1, scheduling information with respect to a PUSCH 1105 and CSI request information. The UE may obtain, from the received CSI request indicator, resource information with respect to a CSI-RS 1102 to be measured. The UE may determine at what time point to measure transmitted CSI-RS 1102, based on a time point of reception of the DCI format 0_1 and a parameter (aforementioned aperiodicTriggeringOffset) with respect to offset in CSI resource set configuration (e.g., NZP CSI-RS resource set configuration (NZP-CSI-RS-ResourceSet)). The UE may be configured, from the BS, by higher layer signaling, with an offset 1103 value X of parameter aperiodicTriggeringOffset in NZP-CSI-RS resource set configuration, and the configured offset 1103 value X may indicate offset between a slot in which DCI to trigger an aperiodic CSI report is received and a slot in which a CSI-RS resource is to be transmitted. For example, a value of the parameter aperiodicTriggeringOffset and the offset 1103 value X may have mapping relations as shown in Table 32 below.

TABLE 32

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

Referring to FIG. 11, the offset 1103 value is configured as X=0. In this case, the UE may receive a CSI-RS 1102 in a slot (corresponding to a slot 0 1106 of FIG. 11) in which the DCI format 0_1 triggering the aperiodic CSI report is received, and may report CSI information on a PUSCH 1105 to the BS, the CSI information being measured by using the received CSI-RS 1102. The UE may obtain, from the DCI format 0_1, scheduling information (a plurality of pieces of information respectively corresponding to fields of the DCI format 0_1) with respect to the PUSCH 1105 for a CSI report. For example, the UE may obtain information about a slot in which the PUSCH 1105 is to be transmitted, from time-domain resource allocation information of the DCI format 0_1 with respect to the PUSCH 1105. In the example of FIG. 11, the UE may obtain 3 as K2 1104 value corresponding to a slot offset value for PDCCH-to-PUSCH, and thus, the PUSCH 1105 may be transmitted in a slot 3 1109 that is distant, by 3 slots, from the slot 0 1106 in which the PDCCH 1101 is received.

In the example of FIG. 12, the UE may obtain DCI format 0_1 by monitoring a PDCCH 1201, and may obtain, from the DCI format 0_1, scheduling information with respect to a PUSCH 1205 and CSI information. The UE may obtain, from a received CSI request indicator, resource information with respect to a CSI-RS 1202 to be measured. In the example of FIG. 12, an offset 1203 value for CSI-RS may be configured as X=1 and the UE may obtain 3 as K2 1204 value corresponding to a slot offset value for PDCCH-to-PUSCH. In this case, the UE may receive the CSI-RS 1202 in a slot (slot 0 1206 of FIG. 12) in which the DCI format 0_1 triggering an aperiodic CSI report is received, and may report, to the BS via the PUSCH 1205 in a slot 3 1209, CSI information measured by using a received CSI-RS.

Next, a BWP configuration in the 5G communication system will be described in detail.

Figure 13:
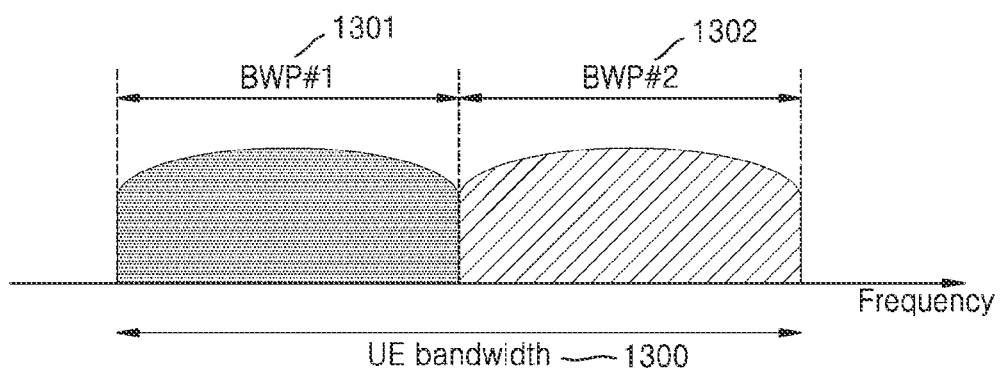
FIG. 13 illustrates a configuration of BWPs in a 5G communication system according to an embodiment.

FIG. 13 illustrates a configuration of BWPs in a 5G communication system.

Referring to FIG. 13, a UE bandwidth 1300 may be configured into two BWPs, i.e., BWP #1 1301 and BWP #2 1302. A BS may configure a UE with one or more BWPs, and may configure, for each BWP, a plurality of pieces of information as shown in Table 33 below.

TABLE 33

| BWP ::= | SEQUENCE { |
|---|---|
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

The plurality of pieces of information may be transmitted from the BS to the UE by higher layer signaling, e.g., RRC signaling. At least one BWP among the configured one or more BWPs may be activated. Whether to activate a configured BWP may be notified from the BS to the UE semi-statically by RRC signaling or dynamically by DCI.

Before the UE is RRC connected, the UE may be configured by the BS with an initial BWP for initial access in a MIB. The UE may receive, via the MIB, in an initial access process, configuration information for a CORESET and search space in which a PDCCH may be transmitted for reception of SI (e.g., remaining minimum SI (RMSI) or SIB 1 (SIB1)) requested for initial access. Each of the CORESET and the search space which are configured in the MIB may be regarded with ID 0. The BS may notify, in the MIB, the UE of configuration information such as frequency allocation information, time allocation information, numerology, etc., for CORESET #0. Also, the BS may notify, in the MIB, the UE of configuration information such as a monitoring periodicity and occasion for the CORESET #0, i.e., configuration information for search space #0. The UE may regard a frequency region configured as the CORESET #0 obtained from the MIB, as the initial BWP for initial access. Here, the ID of the initial BWP may be regarded as 0.

Configuration of the BWP supported by the 5G communication system may be used for various purposes.

According to an embodiment of the disclosure, when a bandwidth supported by the UE is smaller than a system bandwidth, the BS may support additional bandwidth via configuration of the BWP. For example, the BS may configure the UE with a frequency location (configuration information 2) of the BWP, such that the UE may transmit or receive data in a particular frequency location in the system bandwidth.

In order to support different numerologies, the BS may configure a plurality of BWPs for the UE. For example, in order to support data transmission and reception using both 15 KHz subcarrier spacing and 30 KHz subcarrier spacing for a certain UE, the BS may configure two BWPs with 15 KHz and 30 KHz subcarrier spacings, respectively. The different BWPs may be frequency division multiplexed, and in a case where a UE attempts to transmit and receive data with particular subcarrier spacing, a BWP configured with the subcarrier spacing may be activated.

In order to reduce power consumption of the UE, the BS may configure BWPs with different bandwidth sizes for the UE. For example, when the UE supports very large bandwidth, e.g., 100 MHz bandwidth, and always transmits or receives data in the bandwidth, very high power consumption may occur. In particular, when there is no traffic, monitoring unnecessary DL control channel in the large 100 MHz bandwidth may be very inefficient in terms of power consumption. In order to reduce the power consumption of the UE, the BS may configure a BWP with relatively small bandwidth, e.g., a 20 MHz BWP, for the UE. When there is no traffic, the UE may perform monitoring in the 20 MHz BWP, and when data occurs, the UE may transmit or receive the data on the 100 MHz BWP based on an indication from the BS.

In a method of configuring a BWP, UEs before being RRC connected may receive, via the MIB, configuration information for the initial BWP in an initial access process. The UE may be configured, based on the MIB of a PBCH, with a CORESET for a DL control channel on which DCI for scheduling a SIB may be transmitted. A bandwidth of the CORESET configured based on the MIB may be regarded as the initial BWP, and the UE may receive, on the initial BWP, a PDSCH on which the SIB is transmitted. The initial BWP may also be used for other SI (OSI), paging, or random access, in addition to reception of the SIB.

When one or more BWPs are configured for the UE, the BS may indicate, to the UE, switching of a BWP by using a BWP indicator field in DCI. For example, as illustrated in FIG. 13, when a currently-activated BWP of the UE is BWP #1 1301, the BS may indicate BWP #2 1302 with a bandwidth indicator in DCI to the UE, and the UE may perform BWP switching to the BWP #2 1302 indicated with the BWP indicator in the received DCI.

As described above, the DCI-based BWP switching may be indicated by DCI that schedules a PDSCH or a PUSCH, and thus, when the UE receives a BWP switching request, the UE may perform, in the switched BWP without difficulty, transmission or reception of the PDSCH or the PUSCH scheduled by the DCI. For this end, a requirement for a delay time TBWP required for BWP switching is defined in a standard, and, for example, may be defined as shown in Table 34 below.

TABLE 34

| NR Slot | | BWP switch delay $T_{BWP}$ (slots) | |
|---|---|---|---|
| μ | length (ms) | Type 1$^{Note\ 1}$ | Type 2$^{Note\ 1}$ |
| 0 | 1 | 1 | 3 |
| 1 | 0.5 | 2 | 5 |
| 2 | 0.25 | 3 | 9 |
| 3 | 0.125 | 6 | 17 |

Note 1:
Depends on UE capability.
Note 2:
If the BWP switch involves changing of SCS, the BWP switch delay is determined by the larger one between the SCS before BWP switch and the SCS after BWP switch.

The requirement for BWP switching delay time supports type 1 or type 2 depending on a capability of the UE. The UE may report a supportable BWP delay time type to the BS.

According to the requirement for the BWP switching delay time, when the UE receives DCI including the BWP switching indicator in slot n, the UE may complete switching to a new BWP indicated by the BWP switching indicator no later than slot n+TBWP, and may transmit or receive, on the new BWP, a data channel scheduled by the DCI. When the BS attempts to schedule the data channel on the new BWP, the BS may determine to allocate a time domain resource for the data channel by considering the BWP switching delay time (TBWP) of the UE. That is, when the BS schedules a data channel on a new BWP, as for a method of determining time domain resource allocation for the data channel, the BS may schedule the data channel after the BWP switching delay time. Accordingly, the UE may not expect the DCI, which indicates BWP switching, to indicate a slot offset value (K0 or K2) smaller than the BWP switching delay time TBWP.

If the UE receives DCI indicating BWP switching (e.g., DCI format 1_1 or 0_1), the UE may not perform any transmission or reception during time duration from a third symbol of the slot in which a PDCCH including the DCI is received to a starting point of a slot indicated by a slot offset value (K0 or K2) indicated in a time domain resource allocation indicator field in the DCI. For example, when the UE has received DCI indicating BWP switching in slot n and a slot offset value indicated by the DCI is K, the UE may not perform any transmission or reception from a third symbol of the slot n to a symbol before slot n+k (i.e., a last symbol of slot n+K−1).

Hereinafter, a method of configuring transmission and reception associated parameters for each BWP in a 5G wireless communication system will be described.

The UE may be configured by the BS with one or a plurality of BWPs and may be additionally configured with parameters to be used for transmission and reception (e.g., configuration information related to UL and DL data channels and control channels, etc.) for each of the configured BWPs. For example, referring again to FIG. 13, when the UE is configured with the BWP #1 1301 and the BWP #2 1302, the UE may be configured with transmission/reception parameter #1 for the BWP #1 1301 and transmission/reception parameter #2 for the BWP #2 1302. When the BWP #1 1301 is activated, the UE may perform transmission and reception with the BS based on the transmission/reception parameter #1, and when the BWP #2 1302 is activated, the UE may perform transmission and reception with the BS based on the transmission/reception parameter #2.

For example, the UE may be configured, by the BS, with parameters as shown below.

A plurality of pieces of information as shown in Table 35 may be configured for a UL BWP.

TABLE 35

```
BWP-Uplink := SEQUENCE {
    bwp-Id              BWP-Id,
    bwp-Common          BWP-UplinkCommon OPTIONAL, -- Cond
        SetupOtherBWP
    (cell-specific or common parameter)
    bwp-Dedicated       BWP-UplinkDedicated OPTIONAL, -- Cond
        SetupOtherBWP
    (UE-specific parameter)
    ...
}
BWP-UplinkCommon := SEQUENCE {
    genericParameters   BWP,
    rach-ConfigCommon       SetupRelease { RACH-ConfigCommon } OPTIONAL,
    -- Need M
    pusch-ConfigCommon      SetupRelease { PUSCH-ConfigCommon }
    OPTIONAL, -- Need M
    pucch-ConfigCommon      SetupRelease { PUCCH-ConfigCommon }
    OPTIONAL, -- Need M
    ...
}
BWP-UplinkDedicated := SEQUENCE {
    pucch-Config            SetupRelease { PUCCH-Config } OPTIONAL,
    -- Need M
    (PUCCH-associated UE-specific parameter)
    pusch-Config            SetupRelease { PUSCH-Config } OPTIONAL, --
    -- Need M
    (PUSCH-associated UE-specific parameter)
    configuredGrantConfig
    SetupRelease { ConfiguredGrantConfig } OPTIONAL, -- Need M
    srs-Config
                            SetupRelease { SRS-Config } OPTIONAL,
```

TABLE 35-continued

```
-- Need M
    beamFailureRecoveryConfig
        SetupRelease { BeamFailureRecoveryConfig } OPTIONAL, -- Cond SpCellOnly
    ...
}
```

According to Table 35, the UE may be configured, by the BS, with cell-specific (or cell common or common) transmission-associated parameters (e.g., parameters associated with a random access channel (RACH), a PUCCH, and a PUSCH) (corresponding to BWP-UplinkCommon). Also, the UE may be configured, by the BS, with UE-specific (or dedicated) transmission-associated parameters (e.g., parameters associated with a PUCCH, a PUSCH, configured grant UL transmission (configured grant PUSCH), and a sounding reference signal (SRS)) (corresponding to BWP-UplinkDedicated).

A plurality of pieces of information as shown in Table 36 may be configured for a DL BWP.

TABLE 36

```
BWP-Downlink ::= SEQUENCE {
    bwp-Id              BWP-Id,
    bwp-Common          BWP-UplinkCommon OPTIONAL, -- Cond
        SetupOtherBWP
    (cell-specific or common parameter)
    bwp-Dedicated       BWP-UplinkDedicated OPTIONAL, -- Cond
        SetupOtherBWP
    (UE-specific parameter)
    ...
}
BWP-DownCommon ::= SEQUENCE {
    genericParameters   BWP,
    pdcch-ConfigCommon          SetupRelease { PDCCH-ConfigCommon }
    (PDCCH-associated common parameter)
    pdsch-ConfigCommon          SetupRelease { PDSCH-ConfigCommon }
    OPTIONAL, -- Need M
    (PDSCH-associated common parameter)
    ...
}
BWP-DownDedicated := SEQUENCE {
    pdcch-Config                SetupRelease { PDCCH-Config } OPTIONAL, --
        Need M
    (PDCCH-associated UE-specific parameter)
    pdsch-Config                SetupRelease { PDSCH-Config } OPTIONAL, --
        Need M
    (PDSCH-associated UE-specific parameter)
    sps-Config
        SetupRelease { SPS-Config } OPTIONAL, -- Need M
    radioLinkMonitoringConfig
        SetupRelease { radioLinkMonitoringConfig} OPTIONAL, -- Cond SpCellOnly
    ...
}
```

According to Table 36, the UE may be configured, by the BS, with cell-specific (or cell common or common) reception-associated parameters (e.g., parameters associated with a PDCCH and a PDSCH) (corresponding to BWP-DownlinkCommon). Also, the UE may be configured, by the BS, with UE-specific (or dedicated) reception-associated parameters (e.g., parameters associated with a PDCCH, a PDSCH, configured grant DL transmission (SPS PDSCH), and radio link monitoring (RLM)) (corresponding to BWP-UplinkDedicated).

Hereinafter, DRX configuration in a 5G communication system will be described in detail.

Figure 14:
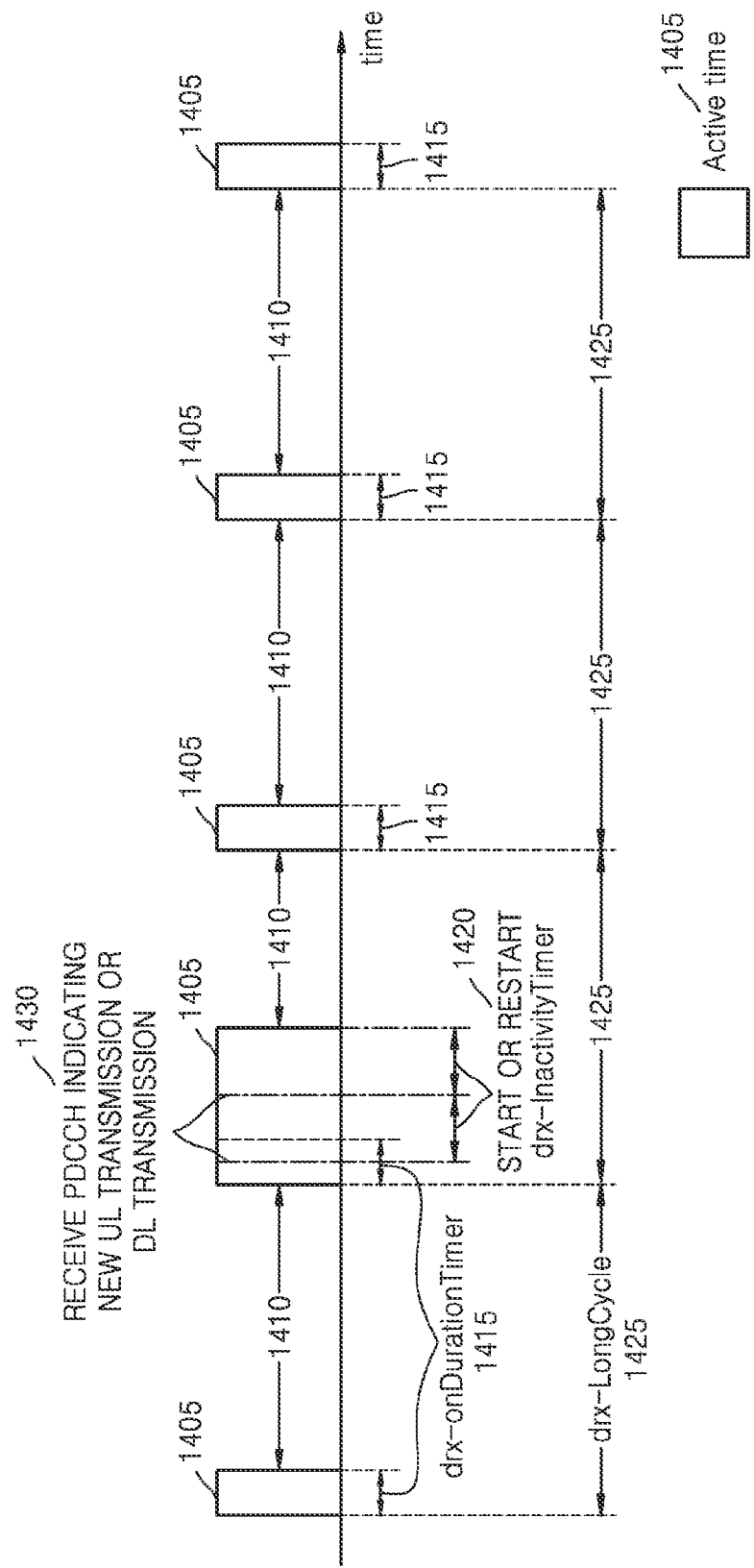
FIG. 14 illustrates discontinuous reception (DRX) in a 5G communication system according to an embodiment.

FIG. 14 illustrates DRX in a 5G communication system.

DRX refers to an operation of the UE, in which the UE that uses a service discontinuously receives data while in an RRC connected state in which a radio link is configured between the UE and the BS. When the DRX is applied, the UE may turn on a receiver at a particular time to monitor a control channel. When no data is received for a certain period of time, the UE may turn off the receiver, thereby reducing power consumption of the UE. The DRX operation may be controlled by a MAC layer entity, based on various parameters and timers.

Referring to FIG. 14, an active time 1405 is a period of time in which the UE wakes up in every DRX cycle and monitors a PDCCH. The active time 1405 may be defined as below.

- drx-onDurationTimer or drx-InactivityTimer or drx-RetransmissionTimerDL or drx-RetransmissionTimerUL or ra-ContentionResolutionTimer is running; or
- a Scheduling Request is sent on PUCCH and is pending; or
- a PDCCH indicating a new transmission addressed to the C-RNTI of the MAC entity has not been received after successful reception of an RAR for the random access preamble not selected by the MAC entity among the contention-based random access preamble drx-onDurationTimer, drx-InactivityTimer, drx-RetransmissionTimerDL, drx-RetransmissionTimerUL, ra-ContentionResolutionTimer, etc., are timers whose values are configured by the BS, and have a function to configure the UE to monitor a PDCCH when a certain condition is satisfied.

A drx-onDurationTimer 1415 is a parameter to configure a minimum time in which the UE stays awake. A drx-InactivityTimer 1420 is a parameter to configure an extra period of time in which the UE additionally stays awake when a PDCCH indicating new UL transmission or DL transmission is received (1430). A drx-RetransmissionTimerDL is a parameter to configure a maximum period of time in which the UE stays awake to receive DL retransmission in a DL HARQ procedure. A drx-RetransmissionTimerUL is a parameter to configure a maximum period of time in which the UE stays awake to receive UL retransmission grant in a UL HARQ procedure. The drx-onDurationTimer, drx-InactivityTimer, drx-RetransmissionTimerDL and drx-RetransmissionTimerUL may be configured with time, the number of subframes, the number of slots, etc. An ra-ContentionResolutionTimer is a parameter to monitor the PDCCH in a random access procedure.

An inActive time 1410 is a time configured not to monitor the PDCCH or not to receive the PDCCH during a DRX operation, and may correspond to a rest of the entire time performing the DRX operation excluding the active time 1405. When the UE does not monitor the PDCCH during the active time 1405, the UE may enter a sleep or inactive state to reduce power consumption.

The DRX cycle refers to a cycle in which the UE wakes up and monitors a PDCCH. That is, the DRX cycle refers to a time gap from after the UE monitors the PDCCH to a time to monitor a next PDCCH, or an occurrence cycle of on duration. The DRX cycle may have two types which are short DRX cycle and long DRX cycle. The short DRX cycle may be optionally applied.

A long DRX cycle 1425 may be a DRX cycle having a longer cycle among two DRX cycles configured for the UE. The UE may start drx-onDurationTimer 1415 again at a point in time after a lapse of the long DRX cycle 1425 from a starting point (e.g., a start symbol) of drx-onDurationTimer 1415 during the long DRX operation. When the UE operates in the long DRX cycle 1425, the UE may start the drx-onDurationTimer 1415 in a slot after drx-SlotOffset from a subframe that satisfies Equation (2) below. Here, the drx-SlotOffset may refer to a delay before the drx-onDurationTimer 1415 starts. The drx-SlotOffset may be configured with time, the number of slots, etc.

$$[(SFN \times 10) + \text{subframe number}] \bmod \text{ulo}(\text{drx-LongCycle}) = \text{drx-StartOffset} \quad (2)$$

Here, the drx-LongCycleStartOffset may include the long DRX cycle 1425 and drx-StartOffset, and may be used to define the long DRX cycle 1425. The drx-LongCycleStartOffset may be configured with time, the number of subframes, the number of slots, etc.

A short DRX cycle may be a DRX cycle having a shorter cycle among the two DRX cycles configured for the UE. While the UE operates in the long DRX cycle 1425, when a certain event occurs, e.g., reception of a PDCCH indicating a new UL transmission or DL transmission (1430), the UE may start or restart drx-InactivityTimer 1420, and when the drx-InactivityTimer 1420 expires or the UE receives a DRX command MAC CE, the UE may operate in the short DRX cycle.

For example, referring to FIG. 14, the UE may start drx-ShortCycleTimer when previous drx-onDurationTimer 1415 or drx-InactivityTimer 1420 expires, and may operate in the short DRX cycle until the drx-ShortCycleTimer expires. When the UE receives the PDCCH indicating new UL transmission or DL transmission (1430), the UE may expect additional UL transmission or DL transmission at a later time and thus may extend Active Time 1405 or delay an arrival of InActive Time 1410. While the UE operates in the short DRX cycle, the UE restarts drx-onDurationTimer 1415 at a time elapsed by the short DRX cycle from a start point of on duration. Afterward, when drx-ShortCycleTimer expires, the UE operates again in the long DRX cycle 1425.

When the UE operates in the short DRX cycle, the UE may start drx-onDurationTimer 1415 after drx-SlotOffset from a subframe that satisfies Equation (3) below. Here, the drx-SlotOffset may refer to a delay before the drx-onDurationTimer 1415 starts. For example, the drx-SlotOffset may be configured with time, the number of slots, etc.

$$[(SFN \times 10) + \text{subframe number}] \bmod \text{ulo}(\text{drx-ShortCycle}) = (\text{drx-StartOffset}) \bmod \text{ulo} (\text{drx-ShortCycle}) \quad (3)$$

Here, the drx-ShortCycle and drx-StartOffset may be used to define a subframe where the short DRX cycle is to start. The drx-ShortCycle and drx-StartOffset may be configured with time, the number of subframes, the number of slots, etc.

The DRX operation has been described above with reference to FIG. 14.

According to an embodiment of the disclosure, the UE may reduce power consumption of the UE by performing the DRX operation. However, even when the UE performs the DRX operation, it is not that the UE always receives a PDCCH associated with the UE in the active time 1405. Accordingly, an embodiment of the disclosure may provide a signal for controlling an operation of the UE so as to further efficiently save power of the UE.

As described above, in order to achieve a high-speed data service of several Gbps, the 5G communication system uses a spatial multiplexing method supporting signal transmission and reception in an ultra-wide bandwidth or using multiple transmission and reception antennas, and supports various power saving modes to reduce power consumption of a UE. A BS also experiences excessive power consumption. For example, the number of requested power amplifiers (PAs) increases in proportion to the number of transmission antennas of the BS or the UE. A maximum output of each of the BS and the UE depends on a feature of a PA, and in general, a maximum output of the BS various depending on a cell size covered by the BS. Normally, a maximum output is expressed as dBm. A maximum output of the UE is generally 23 dBm or 26 dBm. As an example of a commercial-use 5G BS, the BS may have 64 transmission antennas and 64 PAs corresponding thereto in a frequency band of 3.5 GHz, and may operate in a bandwidth of 100 MHz. That is, energy consumption of the BS increases in proportion to an output of PAs and an operation time of the PAs. Compared to the LTE BS, the 5G BS has a wide bandwidth and many transmission antennas as an operating frequency band of the 5G BS is relatively high. These features have an effect of increasing a data rate but cause costs of large energy consumption of the BS. Therefore, as the number of BSs configuring a mobile communication network increases, the more the energy consumption of the mobile communication network proportionally increases.

As described above, energy consumption of the BS significantly depends on an operation of a PA. As the PA involves a transmission operation of the BS, a DL transmission operation of the BS is highly associated with energy consumption of the BS. A portion of a UL reception operation of the BS is not relatively large in energy consumption of the BS. A physical channel and a physical signal the BS transmit via a DL are as below.

PDSCH: DL data channel including data to be transmitted to one or more UEs.

PDCCH: DL control channel including scheduling information about a PDSCH and a PUSCH. Alternatively, a PDCCH may solely transmit control information such as a slot format, a power control command, etc., without a PDSCH or a PUSCH for scheduling. The scheduling information includes resource information on which a PDSCH or a PUSCH is mapped, HARQ-associated information, power control information, etc.

PBCH: a DL broadcast channel providing an MIB that is essential SI needed for a UE to transmit and receive a data channel and a control channel.

PSS: a signal used as a reference for DL time/frequency synchronization and provides partial information of a cell ID.

SSS: a signal used as a reference for DL time and/or frequency (hereinafter, time/frequency) synchronization and provides other partial information of the cell ID.

DM-RS: a reference signal for the UE to estimate a channel for each of a PDSCH, a PDCCH, and a PBCH.

CSI-RS: a DL signal for reference when the UE measures a DL channel state.

phase-tracking reference signal (PT-RS): a DL signal for phase tracking.

In terms of BS energy saving, when the BS stops a DL transmission operation, an operation of a PA also stops in response thereto, such that a BS energy saving effect increases, not only the PA, but also operations of other BS devices such as a baseband device decrease, and thus, additional energy saving is possible. Further, if a UL reception operation can be stopped, even if a portion of the UL reception operation is relatively small in entire energy consumption of the BS, an additional energy saving effect may be obtained.

A DL transmission operation of the BS is basically dependent on the amount of DL traffic. For example, when the BS does not have data to be transmitted to a UE, there is no need for the BS to transmit a PDCCH for scheduling a PDSCH or a PDSCH. Alternatively, if the data can be temporarily suspended from transmission as the data is not sensitive to a transmission delay, the BS may refrain from transmitting a PDSCH and/or a PDCCH.

On the contrary, physical channels and physical signals which include PSS, SSS, PBCH, CSI-RS, etc., are characterized in that they are repeatedly transmitted based on preset defined periodicity, regardless of data transmission to the UE. Therefore, even when the UE does not receive data, the UE may continuously update DL time/frequency synchronization, a DL channel state, a radio link quality, etc. That is, the PSS, SSS, PBCH, and CSI-RS have to be transmitted via a DL, regardless of DL data traffic, and thus causes energy consumption by the BS. Therefore, by adjusting transmission of the signals not related (or of low relativity) to data traffic to less frequently occur, BS energy saving may be achieved.

While the BS does not perform DL transmission via the two BS energy saving methods, an operation of PAs of the BS, an operation of a radio frequency (RF) device related thereto, an operation of a baseband device, etc., may be stopped or minimized such that an energy saving effect of the BS may be maximized.

As another method, by switching off some of antennas or the PAs of the BS, energy consumption of the BS may be saved (hereinafter, 'BS energy saving method 2'). In this case, as a reaction to the energy saving effect of the BS, a decrease in cell coverage or a decrease in throughput may be caused. For example, when the BS that has 64 transmission antennas and 64 PAs corresponding thereto in a frequency band of 3.5 GHz and operates in a bandwidth of 100 MHz activates only 4 transmission antennas and 4 PAs during a preset time period so as to reduce BS energy consumption and switches off the others, BS energy consumption during the time period may be reduced by about $\frac{1}{16}$ (=4/64). However, due to a decrease in a maximum transmission power and a decrease in a beamforming gain, it is difficult to achieve cell coverage and throughput of 64 antennas and 64 PAs.

The BS energy saving methods may be reclassified into three methods, i.e., 1. a BS energy saving method in a frequency domain which adjusts a size of a BWP according to traffic of a BS, 2. a BS energy saving method in a spatial domain which adaptively decreases the number of antenna ports, and 3. a BS energy saving method in a time domain which adjusts periodicity of CSI-RS, SSB, and DRX. The three BS energy saving methods may be used in a manner that only a specific method may be solely used according to a BS characteristic such as BS traffic or coverage or the methods may be used in a combined manner, and a plurality of pieces of change information corresponding thereto have to be shared with a UE.

Hereinafter, a method of indicating a BS energy saving mode according to an embodiment of the disclosure will be described.

In accordance with an embodiment of the disclosure, each operation of a method, performed by a BS, of indicating a BS energy saving mode to a UE for BS energy saving will be described.

Figure 15:
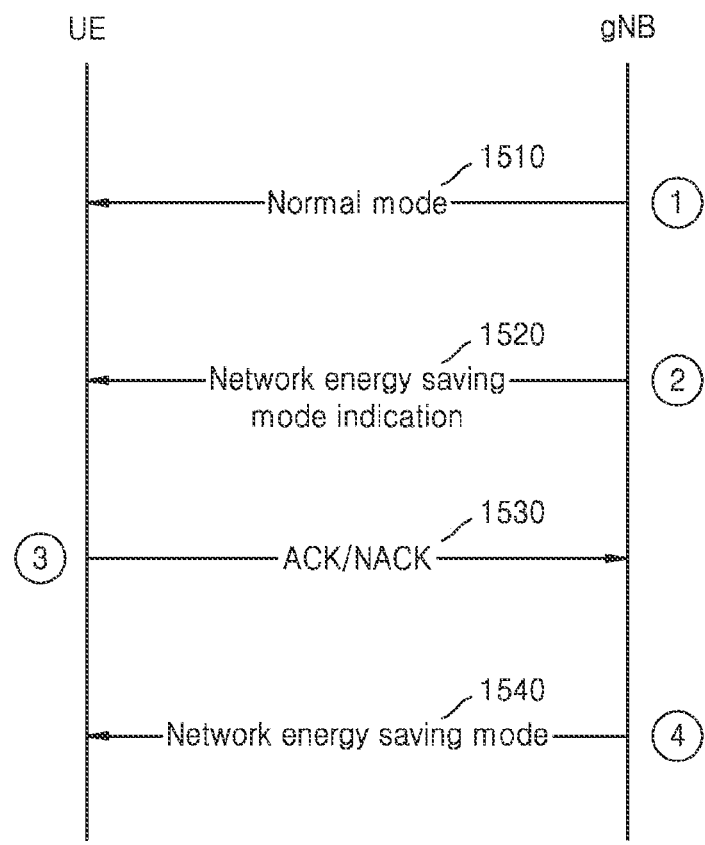
FIG. 15 illustrates a signaling method by which a BS indicates a BS energy saving mode to a UE for BS energy saving according to an embodiment.

FIG. 15 illustrates a signaling method by which a BS indicates a BS energy saving mode to a UE for BS energy saving according to an embodiment.

Referring to FIG. 15, when the amount of traffic in the BS (or gNB) is high and thus enough transmission capacity (transmission power, the number of antennas) is requested, the BS services the UE in a normal mode 1510. The UE may obtain SI of the BS via an SIB, and thus, is aware of information such as a frequency band, the number of antenna ports, etc.

When the amount of traffic in the BS decreases, if transmission and reception are performed in the same normal mode, excessive power consumption may occur in the BS. In order to prevent this, the BS performs a procedure for a BS energy saving mode.

With respect to the three BS energy saving modes associated with a frequency, a space, and a time, each BS considers fine adjustment of parameters for BS energy saving while not highly decreasing performance of UEs serviced in each BS, and notifies that to each UE by signaling. For example, in order to save energy of a BS, the BS may perform a discontinuous transmission and reception (DTRX) operation of transmitting and receiving data information and control information at regular intervals. This is similar to DRX applied to a UE, and the DTRX operation may be classified to a transmission and reception mode (TRX mode) of performing both transmission and reception according to an operation of a BS, a reception mode (RX-only mode) of only receiving a UL, and a transmission mode (TX-only mode) of only transmitting a DL. Here, a plurality of DTRX operations may be configured for one sleep mode.

A time period in which a BS can transmit and receive information is determined according to slot n for which a DTRX mode is configured, DTRX periodicity that indicates a count of transmitting and receiving information, and DTRX wakeup-duration in which an activity of the BS continues when the BS transmits and receives information one time. When the BS operates in a sleep mode, a time excluding DTRX wakeup-duration determined based on a plurality of DTRX configuration values is DTRX sleep-duration, and in the DTRX sleep-duration, the BS does not perform any operation so as to save energy.

Periodicity of a DTRX operation of the BS may be configured based on periodicity of a signal transmitted or received to or from a UE, and energy consumption of the BS may be reduced by applying a value larger than a current configurable value. For example, periodicity of an SSB may be configured as among 5 ms, 10 ms, 20 ms, 40 ms, 80 ms, and 160 ms, and the periodicity of the DTRX operation may be configured as 320 ms, 640 ms, etc., which is longer than the periodicity of the SSB. Also, the sleep mode may be classified to deep sleep when the periodicity is greater than or equal to 1280 ms, and light sleep when the periodicity is smaller than or equal to 640 ms.

That is, by parameterizing periodicity of DTRX as described above, the BS may perform a BS energy saving mode.

There are broadly two methods of notifying a BS energy saving mode.

First, there is a method (1520) by which, parameters for BS energy saving predetermined between a BS and a UE are configured as a set, and the set is indicated with a small number of bits for switching from a normal mode 1510 to a BS energy saving mode 1540. As a special case, a BS energy saving mode may be on or off by using 1 bit. This method causes small signaling overhead but has a limit in terms of BS energy saving. This method is referred to as 'bit-based BS energy saving mode indication'.

Next, there is a method by which a BS transmits specific parameters for BS energy saving to a UE. Different than the method described above, this method is available in dynamic BS energy saving, but may cause large signaling overhead and is referred to as 'parameter-based BS energy saving mode indication'. BS energy saving mode indication may be signaled by using RRC, MAC-CE, or DCI.

When the BS energy saving mode indication is signaled to a UE, the UE transmits, to the BS, ACK/NACK 1530 as to whether the BS energy saving mode indication is correctly received. After the BS successfully receives an ACK from the UE, the BS switches to a BS energy saving mode 1540 and performs servicing.

A method of signaling a BS energy saving mode of a BS according to another embodiment is described below based on a procedure for indicating a BS energy saving mode of a BS as described above, but the disclosure is not limited thereto.

The BS may configure, according to a sleep mode of the BS, similar to a sleep mode of a UE, parameters such as a list of channels to be transmitted or monitored, periodicity of a signal being periodically transmitted, a size of a frequency resource, etc., which are associated with operations of the BS. In order to reduce unnecessary energy consumption of the UE and adaptively increase performance corresponding to an operation of the BS, the UE should be aware of a change in an operation according to state switching of the BS. In this process, the BS may indicate a BS energy saving mode to the UE by signaling RRC, MAC-CE, or DCI.

When a BS energy saving mode is indicated as 'bit-based BS energy saving mode indication' by an RRC message, it may be configured as shown in Table 37.

TABLE 37

```
NetworkEnergySavingModeConfig  : : =            SEQUENCE {
    nes-ModeConfiguration  (Network energy saving mode
configuration)  ENUMERATED  {sleepmode1, sleepmode2, ... ,
sleepmodeN}                      OPTIONAL,  -- Need S
    nes-ModeonDurationTimer  (Network energy saving mode
duration time)          ENUMERATED  {value1, value2, ... , valueN}
                        OPTIONAL,  -- Need S
    nes-ModeStartOffset  (Network energy saving mode start slot
definition)        ENUMERATED  {value1, value2, ... , valueN}
                   OPTIONAL,  -- Need S
}
```

The BS notifies the UE of BS energy saving configuration, duration, and a start slot location of a BS energy saving mode, which are predefined according to traffic or a level of power to be consumed or a sleep mode.

However, compared to MAC-CE or DCI signaling, as the RRC message has a relatively small limit with respect to signaling overhead, 'parameter-based BS energy saving mode indication' may be more reasonable although the RRC message is configurable as 'bit-based BS energy saving mode indication'. In this case, values of existing RRC messages such as BWP, CSI-RS, SSB, etc., may be updated to be signaled to the UE, or updating of parameters as shown in Table 38 may be used.

TABLE 38

```
NetworkEnergySavingModeConfig : : =             SEQUENCE {
    BWP   : :=         SEQUENCE {
        bwp-Id                  BWP-Id,
        locationAndBandwidth         INTEGER  (1..65536) ,
        subcarrierSpacing            ENUMERATED  {n0, n1, n2, n3,
n4, n5} ,
        cyclicPrefix              ENUMERATED  { extended }
    }
    nes-ModeonDurationTimer  (Network energy saving mode
duration time)          ENUMERATED  { value1, value2, ... , valueN}
                        OPTIONAL,  -- Need S
    nes-ModeStartOffset  (Network energy saving mode start slot
definition)         ENUMERATED  { value1, value2, ... , valueN}
                    OPTIONAL,  ... Need S
}
```

For example, in order to adjust a size of a BWP via a BS energy saving mode, an RRC message with respect to the BWP may be called back and then a message of adjusting a location and bandwidth size of the BWP may be transmitted. Also, as 'bit-based BS energy saving mode indication', duration and a start slot location of a BS energy saving mode are notified.

In a case of a MAC CE, an activation or deactivation of a specific function may be performed with a logical channel ID (LCID) for a DL-SCH. For example, in a case of scrambling ID (SCID) index 111001 and 111010, information about activation/deactivation of an Scell is signaled. Currently, as about 15 bits of 100001-101111 are reserved for activation/deactivation of another function to be standardized at a later time, a BS energy saving mode may also be indicated by a single bit or multi-bits. However, as an LCID of a MAC CE involves activation/deactivation, it is more practical to represent activation/deactivation of the BS energy saving mode by a single bit. Specific embodiments may be implemented similar to an example of L1 signaling below.

The BS energy saving mode indication by RRC or MAC signaling has a higher reliability than L1 signaling, but has a long delay time in switching to the BS energy saving mode and thus is not dynamically applied, so that it is difficult to immediately adapt to a state change in a BS. An indication method for a UE to omit transmission and reception of a specific channel varies according to channel types, and indication has to be made separately for each channel, such that high signaling overhead occurs to change an operation of the UE to be adapted to the state change in the BS. On the other hand, L1 signaling has a short delay time, but has a definite limit in signaling overhead, and thus needs a compact indication and has a low reliability (an error occurrence probability of about 1%).

There are three points to indicate a BS energy saving mode by L1 signaling.

Cell-specific DCI vs. UE-specific DCI
   Unlike a mode for power saving of one UE, the BS energy saving mode affects all UEs within a cell, and thus, it is appropriate to use cell-specific DCI, in consideration of overhead.

CSS vs. USS
   It is requested to notify an RRC_CONNECTED UE and also an RRC_IDLE UE within a cell of BS switching to a BS energy saving mode, and it is logical to perform operation by a CSS than a USS.

Scheduling DCI vs. non-scheduling DCI
   It is not requested to be bound by scheduling DCI.

DCI format 1_0 or new DCI format 2_x for a BS energy saving mode is appropriate as DCI format to satisfy the three points above. As described above, DCI format 1_0 is scrambled by many types of RNTI such as C-RNTI, SI-RNTI, RA-RNTI, MsgB-RNTI, etc. DCI format 1_0 scrambled by a P-RNTI from among those as shown in Table 39.

TABLE 39

| Field | bits | Note |
|---|---|---|
| Short Messages Indicator | 2 | |
| Short Messages | 8 | |
| Frequency domain resource assignment | $[\log_2(N_{RB}^{DL,BWP}(N_{RB}^{DL,BWP}+1/2)]$ | * |
| Time domain resource assignment | 4 | * |
| VRB-to-PRB mapping | 1 | * |
| Modulation and coding scheme | 5 | * |
| TB scaling | 2 | * |
| TRS availability indication | M = 0~6 | ** |
| Reserved bits | (8-M) or (6-M) | *** |

* If only the short message is carried, this bit field is reserved
** M = 1~6 bits (if TRS-ResourceSetConfig is configured), 0 (otherwise)
*** with spectrum sharing or without spectrum sharing Here, $N_{RB}^{DL,BWP}$ is a size of CORESET 0. Short Messages Indicator in a first row serves to indicate, by 2-bits information, whether it is short message information or paging information or both as in Table 40.

TABLE 40

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

Here, in a short message, SI may be changed as in Table 41 or information related to a disaster may be included.

TABLE 41

| Bit | Short Message |
|---|---|
| 1 | systemInfoModification |
| 2 | etwsAndCmasIndication |
| 3 | stopPagingMonitoring |
| 4 | systemInfoModification-eDRX |
| 5-8 | Not used in this release of the specification, and shall be ignored by UE if received. |

Likewise, in regard to a MAC CE, there are a high amount of reserved bits. In particular, when only a short message is transmitted via first node of Table 39 (i.e., short message indicator='10'), all bits in *-marked rows are changed to reserved bits, so that it is possible to perform various indications for a BS energy saving mode.

Embodiments below may each be used individually or may be simultaneously depending on situations.

short message indicator='00'
   short message indicator='00' that is a reserved bit may be configured as BS energy saving mode indication. In this case, only one information can be transmitted, and thus, it is used only to indicate on/off of the BS energy saving mode. When required, it may be used together with another reserved bit.
   In this case, existence or non-existence of paging information as short message indicator={'01', '10', '11'} cannot be indicated, such that alternatives as below may be used.
   When short message indicator='00', both a short message and paging information do not exist.
   When short message indicator='00', a short message is checked in a Short Message field, and paging information does not exist.
   When short message indicator='00', a short message is used to indicate specific parameters of a BS energy saving mode, and paging information always exists.
   When short message indicator='00', a short message is checked in a Short Message field, and paging information always exists.
   When short message indicator='00', a Short Message field is reserved, and paging information always exists.

Reuse of Short Message 5-8 bit
   As in Table 41, 5-8th bits are reserved for a Short Message, and thus, may be used for indication of a BS energy saving mode. Likewise, in regard to a short message indicator, 1 bit information may be used to indicate on/off or 4 bits may be all used to configure predefined BS energy saving modes according to energy levels.

Obviously, when a Short message indicator is set to '01', a Short Message is all reserved such that 8 bits may be all used.

Reuse of Reserved bit

This is a method by which a field for reserved bit which is not for Short Message Indicator and Short Message field uses only reserved bits of 6-M bit of *** of Table 39 or is set to Short Message Indicator='10' such that all fields of * including frequency domain resource assignment (FDRA) bits are reserved for a BS energy saving mode. In the former case, the number of available bits is not large such that it is possible to perform operation by limitedly configuring a predefined BS energy saving mode, but in the latter case, the number of available bits is large such that it is possible to operate 'parameter-based BS energy saving mode indication'.

However, when 'parameter-based BS energy saving mode indication' is operated, a UE has to recognize whether 'parameter-based BS energy saving mode indication' is operated, and thus, when this is simultaneously operated with Short Message Indicator='00', an additional bit to indicate that this is a BS energy saving mode may be saved for each parameter.

As described above, DCI format 1_0 may be scrambled by a P-RNTI as well as by a C-RNTI, an SI-RNTI, an RA-RNTI, a MsgB-RNTI, and a TC-RNTI. As a total number of bits of DCI format 1_0 is constant, no matter which RNTI DCI format 1_0 is scrambled, a reserved bit exists similar to a case of P-RNTI, such that 'bit-based BS energy saving mode indication' or 'parameter-based BS energy saving mode indication' may be used according to the number of available bits. For example, a case where DCI format 1_0 is scrambled by C-RNTI for PDCCH order and a field corresponding to FDRA is all 1 is as shown in Table 42.

TABLE 42

| Field | bits | Note |
|---|---|---|
| Identifier for DCI formats | 1 | |
| Frequency domain resource assignment | $\lceil \log_2(N_{RB}^{DL,BWP}(N_{RB}^{DL,BWP}+1)/2)\rceil$ | All ones |
| Random Access Preamble index | 6 | * |
| UL/SUL indicator | 1 | * |
| SS/PBCH index | 6 | * |
| PRACH Mask index | 4 | |
| Reserved bits | 12 or 10 | |

* If "Random Access Preamble index" is all zeros, this field is reserved

When 10 bits exist as reserved bits and a Random Access Preamble index field is all 0, fields corresponding to * are all reserved, such that 'bit-based BS energy saving mode indication' or 'parameter-based BS energy saving mode indication' may be used.

When DCI format 1_0 is scrambled by SI-RNTI, BS energy saving indication may be performed by using only explicit reserved bits as shown in Table 43 without an additional condition.

TABLE 43

| Field | Bits | Note |
|---|---|---|
| Frequency domain resource assignment | $\lceil \log_2(N_{RB}^{DL,BWP}(N_{RB}^{DL,BWP}+1)/2)\rceil$ | |
| Time domain resource assignment | 4 | |
| VRB-to-PRB mapping | 1 | |
| Modulation and coding scheme | 5 | |
| Redundancy version | 2 | |
| System information indicator | 1 | |
| Reserved bits | 17 or 15 | |

When DCI format 1_0 is scrambled by an RA-RNTI or a MsgB-RNTI, BS energy saving indication may be performed by using only explicit reserved bits as shown in Table 44, without an additional condition.

TABLE 44

| Field | Bits | Note |
|---|---|---|
| Frequency domain resource assignment | $\lceil \log_2(N_{RB}^{DL,BWP}(N_{RB}^{DL,BWP}+1)/2)\rceil$ | |
| Time domain resource assignment | 4 | |
| VRB-to-PRB mapping | 1 | |
| Modulation and coding scheme | 5 | |
| TB scaling | 2 | |
| LSBs of SFN | A = 2 or 0 | |
| Reserved bits | 17 or 15 | |

When DCI format 1_0 is scrambled by TC-RNTI, BS energy saving indication may be performed by using explicit reserved bits as shown in Table 44 and a reserved DL assignment index field. In this case, as available bits are not large, it is logical to perform 'bit-based BS energy saving mode indication'.

In addition, there is a method of scramble DCI format 1_0 by using new RNTI for BS energy saving mode. For example, when DCI format 1_0 is scrambled by network energy saving (NES)-RNTI that is newly set, $\lceil \log_2(N_{RB}^{DL,BWP}(N_{RB}^{DL,BWP}+1)/2)\rceil+29$ bits may be used for indication of a BS energy saving mode. As the number of available bits is large, it is logical to perform 'parameter-based BS energy saving mode indication'.

A 'bit-based BS energy saving mode indication' in the above description may be operated in accordance with an embodiment as shown in Tables 45 and 46.

TABLE 45

| Field | bits | Note |
|---|---|---|
| . . . | . . . | . . . |
| Network energy saving mode indicator | 2 | |
| Network energy saving mode offset (K3) | 2 | |
| Network energy saving mode duration | 2 | |
| . . . | . . . | . . . |

TABLE 46

| Bit field | Network Energy Saving Mode indicator |
|---|---|
| 00 | Network saving mode 0 |
| 01 | Network saving mode 1 |
| 10 | Network saving mode 2 |
| 11 | Network saving mode 3 |

The 'Network saving mode indicator' serves to indicate preset N 'Network saving modes', and in an example, it has 2 bits as N=4, but in actual application, it is set to ⌈log₂ N⌉ bits, provided that it is available in DCI format 1_0. In a special case, when N=2, it serves to indicate on/off of 'Network saving mode'.

In a case of predefined 'Network saving mode', it may be configured as {SSB/CSI-RS transmission configuration or power level, DTRX configuration, BS transmission and reception bandwidth, the number of BS transmission and reception antenna ports, etc.} 'Network saving mode' predefined below may be defined in RRC or an SIB, and DCI is used to indicate a corresponding mode.

Network saving mode 0: frequency domain
   BWP_ID {sequence 0,1,2,3}
Network saving mode 1: spatial domain
   nrof Ports/CSI-ResourseSet (CSI-RS resource 수)/BWP_ID {sequence 0,1,2,3}
Network saving mode 2: time domain
   DTRX=640 ms;
   CSI-RS periodicity $T_{CSI-RS}$=80 ms
   Secondary cell activation/deactivation
Network saving mode 3: combination
   BWP_ID {sequence 0,1,2,3}
   ■ DTRX=640 ms The 'Network saving mode' requests, in the lower part of each mode, additional information about specific option, e.g., which BWP_ID is to be selected. This may be defined in RRC or an SIB as described above. On the other hand, an embodiment below indicates a modified embodiment of the 'Network saving mode'.

Network saving mode 0:
   nrof Ports (the number of antenna ports)=64
   BW=100 MHz
   PSD=33 dBM/Hz
Network saving mode 1
   nrof Ports (the number of antenna ports)=32
   BW=50 MHz
   PSD=30 dBM/Hz
Network saving mode 2
   nrof Ports (the number of antenna ports)=16
   BW=25 MHz
   PSD=27 dBM/Hz
Network saving mode 3
   nrof Ports (the number of antenna ports)=8
   BW=10 MHz
   PSD=24 dBM/Hz As the modified embodiment of the 'Network saving mode' is a single option without specific configuration in the lower part of each mode, a UE may not additionally receive an RRC message about each specific configuration. A start location of a BW may be separately transmitted by an RRC message (e.g., offset with reference to point A). An embodiment below is a modified mode of the single option mode.

Network saving mode 0:
   (k,m,n)=(1,1,1)
Network saving mode 1
   (k,m,n)=(1,0.5,0.5)
Network saving mode 2
   (k,m,n)=(0.5,0.5,0.5)
Network saving mode 3
   (k,m,n)=(0.25,0.25,0.5)

In accordance with an embodiment of the disclosure, scaling factors (k,m,n) of each parameter may be indicated under the condition of {nrofPorts (the number of antenna ports)=64, BW=100 MHz, PSD=33 dBM/Hz}. For example, in Network saving mode 1, each factor is scaled to (1,0.5, 0.5), such that a network saving mode may operate with {nrofPorts (the number of antenna ports)=64, BW=50 MHz, PSD=30 dBM/Hz}. (k,m,n) values may be predefined or may be received by an RRC message.

Also, 'Network energy saving mode offset' field of Table 45 may indicate that a BS energy saving mode is to be executed after K3 offset after DCI is received. A BS energy saving mode may be performed after an ACK is received from all UEs within a cell as described with reference to FIG. 16, but the BS energy saving mode may be performed based on self-determination by a BS without an ACK/NACK. It may be configured as K3={1, 2, 4, 8 slots} as predefined values. 'Network energy saving mode duration' indicates a time period in which a BS energy saving mode is performed, and may be configured such as {20, 40, 160, 320 slots or symbols}.

Figure 16:
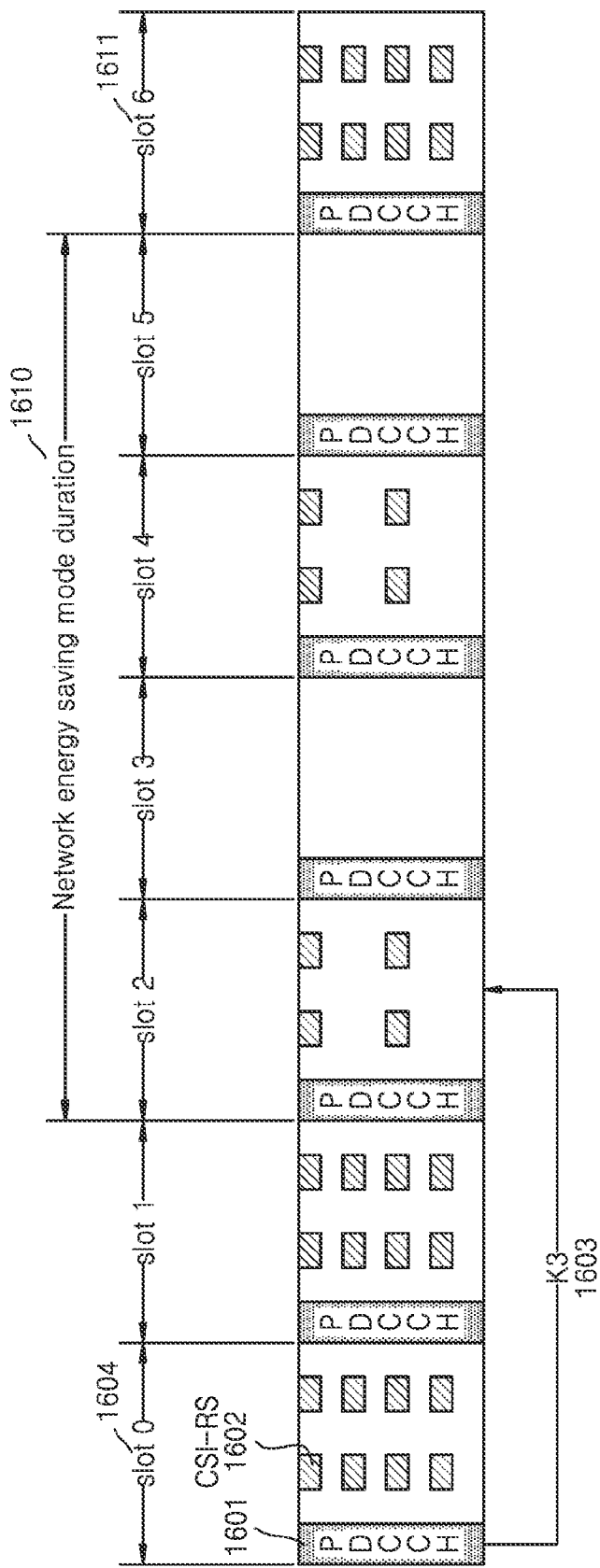
FIG. 16 illustrates BS energy saving being applied after a BS indicates a BS energy saving mode to a UE for BS energy saving according to an embodiment.

That is, the predefined BS energy saving method may be operated as described with reference to FIG. 16. For example, when DCI of 1) 'Network saving mode indicator' about 'Network saving mode' about CSI-RS (1602) periodicity and adjustment of the number of antenna ports on PDCCH (1601), 2) K3 (1603)=2 slots, 3) 'Network energy saving mode duration' (1610)=4 slots of slot 0 (1604) is received, a BS energy saving mode is performed during 4 slots after K3 1603 in (1601), and the BS energy saving mode is operated by adjusting periodicity and density about (1602). In Slot 6 1611, the BS energy saving mode ends and a normal mode starts.

Next, 'parameter-based BS energy saving mode indication' may be operated in an embodiment as shown in Table 47. A difference from 'bit-based BS energy saving mode indication' is that parameters are adjusted for flexible BS energy saving according to a BS situation, unlike to a predefined BS energy saving mode. Values of the parameters should be expressed as a bit, and thus, should be within a predefined set.

TABLE 47

| Field | bits | Note |
|---|---|---|
| . . . | . . . | |
| Network energy saving mode indicator | 1 | |
| BWP_ID | 2 | |
| DTRX periodicity | 3 | |
| Network energy saving mode offset (K3) | 2 | |
| Network energy saving mode duration | 2 | |
| . . . | . . . | |

For example, 'Network energy saving mode indicator' is allocated with 1 bit, such that corresponding DCI indicates a BS energy saving mode and adjusts specific BWP or DTRX periodicity. In addition, K3 and duration may be equally applied as the case of 'bit-based BS energy saving mode indication'.

Additional DCI may indicate ending of the BS energy saving mode or may indicate switching to another BS energy saving mode. For example, when additional DCI about 'Network energy saving mode 2' is indicated while a gNB operates in 'Network energy saving mode 1', the gNB switches to 'Network energy saving mode 2' after K3 slots from when the additional DCI is received, and a UE also performs an operation in a mode corresponding thereto.

Lastly, there is a method of scrambling a new DCI format 2_8, not DCI format 1_0, by NES-RNTI for a BS energy saving mode. New DCI format 2_8 may be used for a BS energy saving mode and is indicated to all UEs within a BS. Similar to existing DCI format 2_1 to 7, DCI format 2_8 may be defined as shown below.

DCI format 2_8 is used for a BS energy saving mode, and information about the BS energy saving mode may be transmitted to all UEs within the BS. Information below may be transmitted by DCI format 2_8 with CRC scrambled by NES-RNTI.

block number 1, block number 2, . . . , block number N

Here, a start position of a block is determined by parameter nes-PositionDCI-2-8 provided from a higher layer for a UE configured of blocks. Here, when UEs are grouped for N blocks to notify all UEs within the BS, it is set that N=1.

When a UE is configured with higher layer parameter NES-RNTI and DCI format 2_8, one block is configured for each higher layer, and a field defined for corresponding block is as below.

Network energy saving mode indication: 1 bit
Network saving mode: 8 bit

A size of DCI format 2_8 is expressed by higher layer parameter sizeDCI-2-8.

In the example, DCI format 2_8 is configured based on 'bit-based BS energy saving mode indication', and may be configured based on 'parameter-based BS energy saving mode indication' when required. Unlike DCI format 1_0 using reserved bit, DCI format 2_8 is solely defined and thus may be efficiently configured to support an energy saving mode of a BS with higher definition.

In accordance with an embodiment of the disclosure, a method by which a UE within a cell receives BS energy saving mode indication and transmits ACK/NACK with respect to the indication to a BS, which is process #3 of FIG. 15, will now be described. There are four schemes of {ACK/NACK are not transmitted, ACK/NACK are transmitted, only ACK is transmitted, only NACK is transmitted}.

ACK/NACK are not transmitted
   gNB is switched to a BS energy saving mode after a specific time (e.g., K3) from a point of time when DCI is received, as defined in Table 45.

ACK/NACK are transmitted
   After gNB successfully receives ACK from all UEs within a cell, the gNB is switched to a BS energy saving mode.

Only ACK is transmitted
   After gNB successfully receives ACK from all UEs within a cell, the gNB is switched to a BS energy saving mode.

Only NACK is transmitted
   When a gNB does not receive NACK from all UEs within a cell, the gNB is switched to a BS energy saving mode.

According to the four schemes above, a gNB may determine a switching time to a BS energy saving mode. When BS energy saving mode indication is transmitted to all UEs within the gNB via group broadcast, if all UEs correctly receive DCI and transmit ACK, the gNB performs a BS energy saving mode at a point of time corresponding thereto (reception of ACK). However, there may be a case where specific UEs do not correctly receive DCI format 1_0 or 2_8. In this case, the gNB may transmit additional signaling until the gNB receives ACK from the UEs, but this causes large delay and signaling overhead.

As an alternative method, the gNB may switch to a BS energy saving mode, regardless of the specific UEs, as in a case where ACK/NACK are not transmitted. In this case, the gNB switches to a BS energy saving mode after K3, but the specific UEs that did not correctly receive DCI may not update parameters associated with the BS energy saving mode. Therefore, the gNB may update the parameters associated with the BS energy saving mode, the parameters being changed by the DCI, and may transmit them by an RRC message to the specific UEs not having correctly received the DCI, or the specific UEs may request the gNB for SI update or may perform a random access again.

Figure 17:
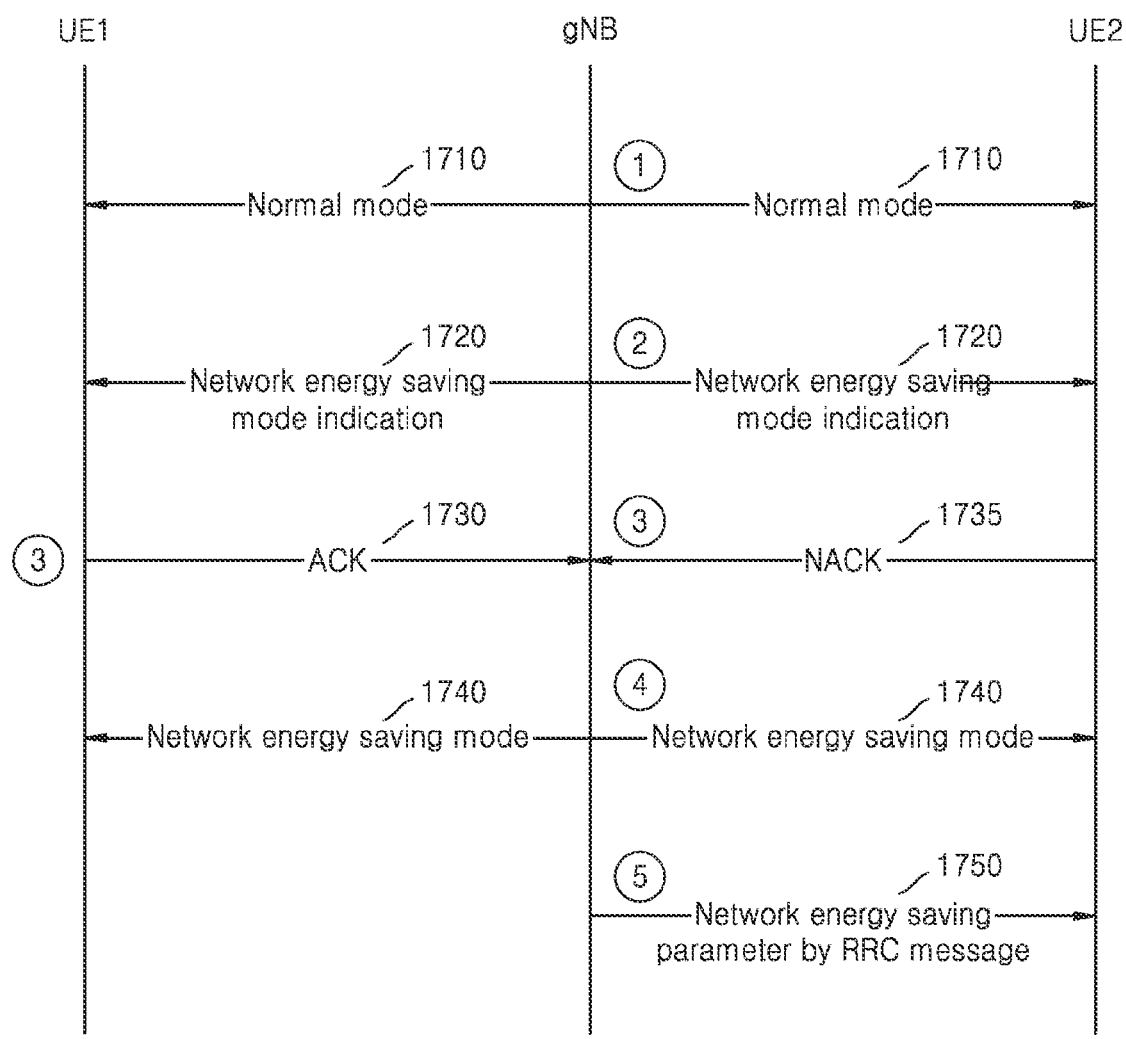
FIG. 17 illustrates a signaling method by which, when a BS indicates a BS energy saving mode to a UE by DCI for BS energy saving, the BS performs signaling on UEs that do not correctly receive the DCI according to an embodiment.

FIG. 17 illustrates a signaling method by which, when a gNB indicates a BS energy saving mode to a UE by DCI for BS energy saving, the gNB performs signaling on UEs that do not correctly receive the DCI according to an embodiment.

Referring to FIG. 17, when the amount of traffic in the gNB is high and thus enough transmission capacity (transmission power, the number of antennas) is requested, the gNB services the UE in a normal mode 1710. The UE may obtain SI of the gNB via an SIB, and thus, is aware of information such as a frequency band, the number of antenna ports, etc.

When the amount of traffic in the gNB decreases, if transmission and reception are performed in the same normal mode, excessive power consumption occurs in the gNB. In order to prevent this, the gNB performs a procedure for a BS energy saving mode. With respect to the three BS energy saving modes associated with a frequency, a space, and a time, each gNB considers fine adjustment of parameters for BS energy saving while not highly decreasing performance of UEs serviced in each gNB, and notifies that to each UE by signaling 1720. Both 'bit-based BS energy saving mode indication' and 'parameter-based BS energy saving mode indication' which are described above may be all used.

When BS energy saving mode indication is signaled to a UE, a UE transmits, to the gNB, ACK 1730/NACK 1735 as to whether the BS energy saving mode indication is correctly received. Regardless of reception of ACK/NACK from the UE, the gNB switches to a BS energy saving mode 1740 after a specific time (K3) and performs servicing. If UEs transmit ACK, parameters associated with a BS energy saving mode are successfully updated, and the gNB may operate according to the BS energy saving mode without a problem. However, as UEs that transmit NACK or do not transmit anything (in a case of ACK only) do not update parameters associated with BS energy saving, it is requested to additionally update the parameters. Therefore, the gNB notifies the parameters associated with BS energy saving to the UEs by an RRC message (1750) so as to allow them to update the parameters.

In NR, a UE may transmit UL control information (UCI) on a PUCCH to a BS. As DCI is transmitted by a PDCCH, the UCI is transmitted by the PUCCH. A difference between DCI and UCI is that the UCI can be delivered by a PUCCH or a PUSCH depending on situations, whereas the DCI can be delivered only by a PDCCH (it cannot be delivered by a PDSCH). The UCI may include at least one of HARQ-ACK by which a UE indicates success or fail of modulation/decoding of a TB received on a PDSCH, a scheduling request (SR) from the UE, by a PUSCH, a BS for resource allocation for UL data transmission, or CSI that is information by which the UE states its channel state.

The UE generates d(0) by binary phase-shift keying (BPSK) modulating 1-bit control information and quadrature phase-shift keying (QPSK) modulating 2-bit control information, and performs scrambling by multiplying d(0) by a sequence corresponding to a length of 1 RB on a frequency axis. The scrambled sequence is spread by using an orthogonal code (or an orthogonal sequence or spreading code) on a time axis, inverse fast Fourier transform (IFFT) is performed thereon, and then is transmitted. In order to indicate UCI bitwidth, in a case of HARQ-ACK, when a code block group (CBG) is not configured, one bit is allocated for one codeword for each carrier, and when a CBG is configured, one bit is allocated for one CB for each carrier. In a case of SR, only 1 bit is allocated.

In a case of CSI, it depends on CSI types (e.g., PMI or RI/LI/COI/CRI or CRI/SSBRI/RSRP). In particular, MIMO-associated parameters such as RI/LI/COI/CRI may have different bitwidths according to some additional factors such as a codebook type of a single panel or multi-panels. For example, as in Table 48, $n_{RI}, v$ and $K_S^{CSI-RS}$ are about UCI bitwidth calculations for RI/LI/COI/CRI in a single panel, and are an allowed number of rank indicators, the number of ranks, and the number of CSI-RS resources of a corresponding resource set. Here, $K_S^{CSI-RS}$ is transmitted to a UE by an RRC message about CSI-ResourceConfigId.

The UL transmission processor 1801 may perform processes including channel coding, modulation, etc., thereby generating a signal to be transmitted. The signal generated in the UL transmission processor 1801 may be multiplexed with another UL signal by the multiplexer 1802, may be signal processed by the RF transmitter 1803, and then may be transmitted to the BS.

The receiver 1808 of the UE demultiplexes a signal received from the BS and distributes it to each DL reception element. The DL reception processor 1805 may perform processes including demodulation, channel decoding, etc., on a DL signal from the BS, thereby obtaining control information or data transmitted from the BS. The receiver 1808 of the UE may apply an output result of the DL reception processor 1805 to the controller 1809 so as to support an operation of the controller 1809.

TABLE 48

| | Bitwidth | | | | |
| --- | --- | --- | --- | --- | --- |
| | | | | >4 antenna ports | |
| Field | 1 antenna port | 2 antenna ports | 4 antenna ports | Rank1~4 | Rank5~8 |
| Rank indicator | 0 | $\min(1, \lceil \log_2 n_{RI} \rceil)$ | $\min(2, \lceil \log_2 n_{RI} \rceil)$ | $\lceil \log_2 n_{RI} \rceil$ | $\lceil \log_2 n_{RI} \rceil$ |
| Layer indicator | 0 | $\lceil \log_2 v \rceil$ | $\min(2, \lceil \log_2 v \rceil)$ | $\min(2, \lceil \log_2 v \rceil)$ | $\min(2, \lceil \log_2 v \rceil)$ |
| Wide-band CQI | 4 | 4 | 4 | 4 | 8 |
| Subband differential CQI | 2 | 2 | 2 | 2 | 4 |
| CRI | $\lceil \log_2(K_S^{CSI-RS}) \rceil$ | $\lceil \log_2(K_S^{CSI-RS}) \rceil$ | $\lceil \log_2(K_S^{CSI-RS}) \rceil$ | $\lceil \log_2(K_S^{CSI-RS}) \rceil$ | $\lceil \log_2(K_S^{CSI-RS}) \rceil$ |

Similarly, Table 49 is about UCI bitwidth for CRI/SSBRI/RSRP. Here, $K_S^{SSB}$ indicates the number of SSBs of a corresponding resource configured to report 'ssb-Index-RSRP' and is also signaled by an RRC message.

Therefore, assuming an operation in a legacy normal mode, a UCI bitwidth determination is transmitted in a manner that a gNB transmits a message to a UE by RRC. However, when an operation to a BS energy saving mode is notified, not by RRC, but by MAC CE or L1 signaling, information corresponding thereto should be RRC signaled after BS energy saving mode indication. However, UCI transmission is limited until RRC signaling is received after switching to an energy saving mode. Therefore, a BS may transmit a changed energy saving mode-associated parameter (e.g., $K_S^{CSI-RS}$ or $K_S^{SSB}$) by using DCI/MAC CE. However, additional definition and an available number of bits have to be defined in a field of DCI format. If, as described above, a BS energy saving mode is indicated by 00 bit of 'Short Message Indicator' via DCI format 1_0 scrambled by P-RNTI and there is no other available bit, $K_S^{CSI-RS}$ or $K_S^{SSB}$ should be signaled by additional DCI, MAC/CE, or RRC.

As an alternative scheme, there is a method of receiving, by DCI/MAC CE, and applying a parameter corresponding to UL power control while changelessly using a value pre-signaled by RRC.

Figure 18:
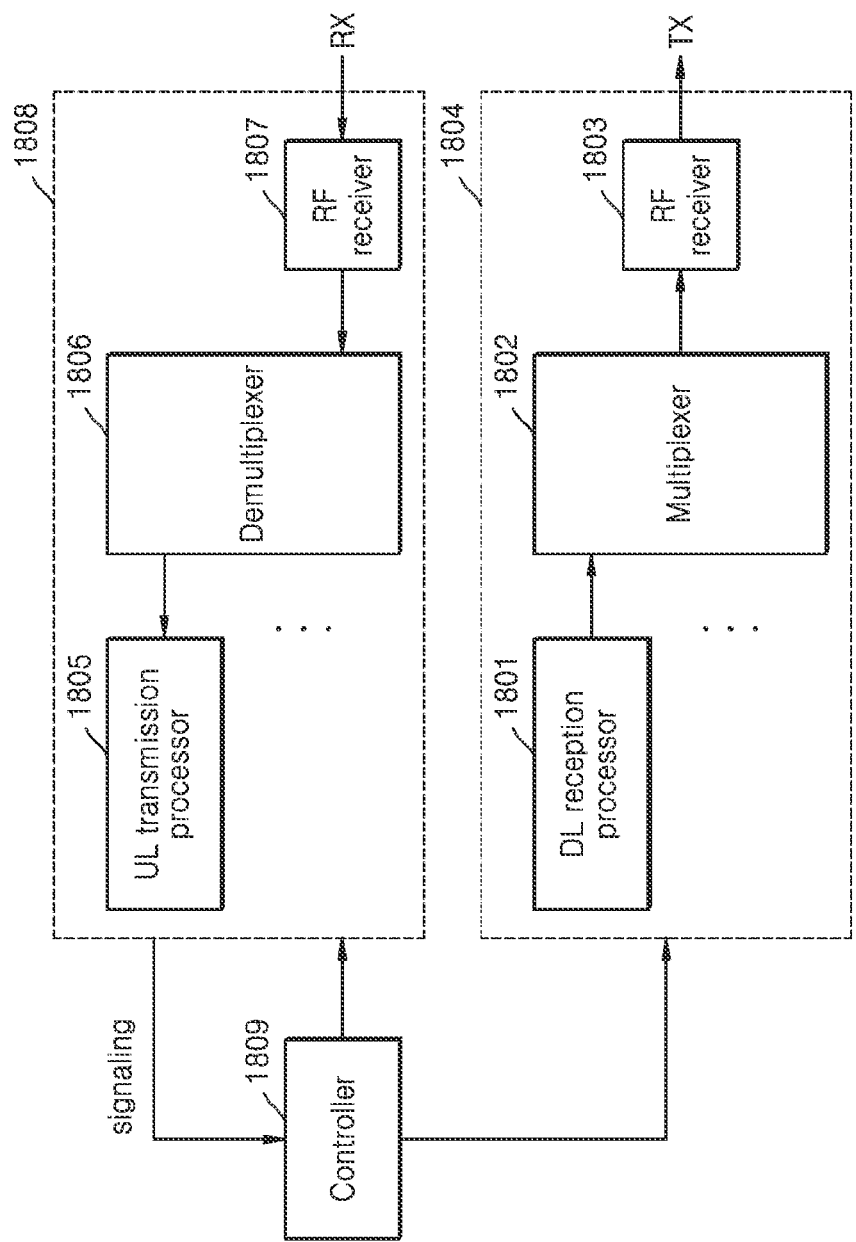
FIG. 18 illustrates a UE according to an embodiment.

FIG. 18 illustrates a UE in a wireless communication system according to an embodiment.

Referring to FIG. 18, a UE includes a transmitter 1804 including a UL transmission processor 1801, a multiplexer 1802, and an RF transmitter 1803, a receiver 1808 including a DL reception processor 1805, a demultiplexer 1806, and an RF receiver 1807, and a controller 1809. The controller 1809 may control each element of the receiver 1808 for receiving a data channel or a control channel transmitted from a BS, and each element of the transmitter 1804 for transmitting a UL signal.

Figure 19:
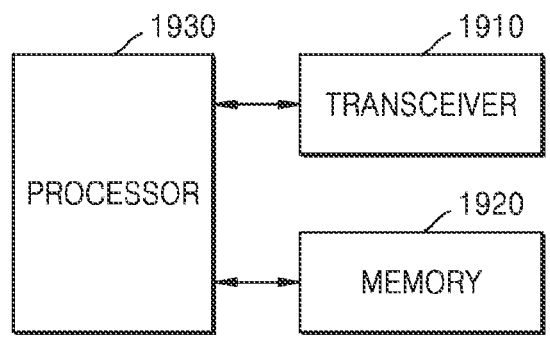
FIG. 19 illustrates a UE according to an embodiment.

FIG. 19 illustrates a UE according to an embodiment.

Referring to FIG. 19, the UE includes a processor 1930, a transceiver 1910, and a memory 1920. However, elements of the UE are not limited to the example above. For example, the UE may include more elements than those described above or may include fewer elements than those described above. In addition, the processor 1930, the transceiver 1910, and the memory 1920 may be implemented as one chip. For example, the transceiver 1910 may include the transceiver 1804 and the receiver 1808 of FIG. 18. Also, the processor 1930 may include the controller 1809 of FIG. 18.

The processor 1930 may control a series of processes to allow the UE to operate according to the above-described embodiments of the disclosure. For example, elements of the UE may be controlled to perform a transmission and reception method of the UE according to whether a BS mode is a BS energy saving mode or a BS normal mode according to an embodiment of the disclosure. The processor 1930 may include one or more processors, and may execute a program stored in the memory 1920 to perform transmission and reception operations of the UE in a wireless communication system to which carrier aggregation of the disclosure is applied.

The transceiver 1910 may transmit or receive signals to or from the BS. The signals being transmitted or received to or from the BS may include control information and data. The transceiver 1910 may include an RF transmitter for up-converting and amplifying a frequency of signals to be transmitted, and an RF receiver for low-noise-amplifying and down-converting a frequency of received signals. However, this is merely an example of the transceiver 1910, and elements of the transceiver 1910 are not limited to the RF transmitter and the RF receiver. Also, the transceiver 1910 may receive signals via wireless channels and output the signals to the processor 1930, and may transmit signals output from the processor 1930, via wireless channels.

The memory 1920 may store programs and data required for the UE to operate. The memory 1920 may store control information or data included in a signal obtained by the UE. The memory 1920 may include any or a combination of storage media such as read only memory (ROM), random access memory (RAM), a hard disk, a compact disc (CD)-ROM, a digital versatile disc (DVD), etc. The memory 1920 may include a plurality of memories. The memory 1920 may store a program for performing transmission and reception operations of the UE according to whether a BS mode is a BS energy saving mode or a BS normal mode according to the embodiments of the disclosure.

Figure 20:
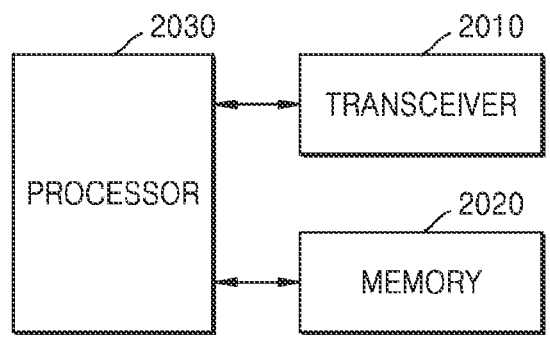
FIG. 20 illustrates a BS according to an embodiment.

FIG. 20 illustrates a BS according to an embodiment.

Referring to FIG. 20, the BS includes a processor 2030, a transceiver 2010, and a memory 2020. However, elements of the BS are not limited to the example above. For example, the BS may include more elements than those described above or may include fewer elements than those described above. In addition, the processor 2030, the transceiver 2010, and the memory 2020 may be implemented as one chip.

The processor 2030 may control a series of processes to allow the BS to operate according to the above-described embodiments of the disclosure. For example, elements of the BS may be controlled to perform a method of scheduling a UE according to whether a BS mode is a BS energy saving mode or a BS normal mode according to an embodiment of the disclosure. The processor 2030 may include one or more processors, and may execute a program stored in the memory 2020 to perform the method of scheduling a UE according to whether a BS mode is a BS energy saving mode or a BS normal mode according to the embodiment of the disclosure.

The transceiver 2010 may transmit or receive signals to or from the UE. The signals being transmitted or received to or from the UE may include control information and data. The transceiver 2010 may include an RF transmitter for up-converting and amplifying a frequency of signals to be transmitted, and an RF receiver for low-noise-amplifying and down-converting a frequency of received signals. However, this is merely an example of the transceiver 2010, and elements of the transceiver 2010 are not limited to the RF transmitter and the RF receiver. Also, the transceiver 2010 may receive signals via wireless channels and output the signals to the processor 2030, and may transmit signals output from the processor 2030, via wireless channels.

The memory 2020 may store programs and data required for the BS to operate. The memory 2020 may store control information or data included in a signal obtained by the UE. The memory 2020 may include any or a combination of storage media such as ROM, RAM, a hard disk, a CD-ROM, a DVD, etc. The memory 2020 may include a plurality of memories. The memory 2020 may store a program for performing the method of scheduling a UE according to whether a BS mode is a BS energy saving mode or a BS normal mode according to the embodiment of the disclosure.

A signal transmission method of the BS in a wireless communication system is defined, so that an excessive energy consumption problem may be solved and a high energy efficiency may be achieved.

In the above-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

While one or more embodiments have been described above with reference to the drawings, the embodiments are for the purpose of promoting an understanding of the disclosure only and are not intended to be limiting of the disclosure. That is, it will be understood by one of ordinary skill in the art that various changes in form and details may be made therein without departing from the spirit and scope as defined by the following claims. Also, the embodiments of the disclosure may be combined to be implemented, when required.

Specific embodiments of the disclosure have been described in the descriptions of the disclosure, but it will be understood that various modifications can be made without departing the scope of the disclosure. Thus, it will be apparent to one of ordinary skill in the art that the scope of the disclosure is not limited to the embodiments described herein and should be defined by the appended claims and their equivalents.

What is claimed is:

1. A method performed by a user equipment (UE) in a wireless communication system, the method comprising:
   receiving, from a base station (BS), a downlink control information (DCI) format with a cyclic redundancy check (CRC) scrambled by a radio network temporary identifier (RNTI) configured for discontinuous transmission and reception (DTRX);
   identifying a network saving mode indicator field in the DCI format; and
   activating or deactivating at least one of a discontinuous transmission (DTX) operation or a discontinuous reception (DRX) operation based on the network saving mode indicator field.

2. The method of claim 1, wherein in case that a value of a bit in the network saving mode indicator field is 0, the DTX operation or the DRX operation is deactivated, and
   wherein in case that the value of the bit in the network saving mode indicator field is 1, the DTX operation or the DRX operation is activated.

3. The method of claim 1, wherein the network saving mode indicator field includes a first bit for indicating activation or deactivation of the DTX operation and a second bit for indicating activation or deactivation of the DRX operation.

4. The method of claim 1, wherein the DCI format is received in a slot m, and a time offset K3 is configured, and
   wherein in case of activating, the DTX operation or the DRX operation is not started before a beginning of a slot m+K3.

5. The method of claim 1, further comprising receiving a parameter indicating a size of the DCI format via higher layer signaling.

6. A method performed by a base station (BS) in a wireless communication system, the method comprising:
   transmitting, to a user equipment (UE), a downlink control information (DCI) format with a cyclic redundancy check (CRC) scrambled by a radio network temporary identifier (RNTI) configured for discontinuous transmission and reception (DTRX); and
   activating or deactivating at least one of a discontinuous transmission (DTX) operation or a discontinuous reception (DRX) operation based on a network saving mode indicator field.

7. The method of claim 6, wherein in case that a value of a bit in the network saving mode indicator field is 0, the DTX operation or the DRX operation is deactivated, and wherein in case that the value of the bit in the network saving mode indicator field is 1, the DTX operation or the DRX operation is activated.

8. The method of claim 6, wherein the network saving mode indicator field includes a first bit for indicating activation or deactivation of the DTX operation and a second bit for indicating activation or deactivation of the DRX operation.

9. The method of claim 6, wherein the DCI format is received at the UE in a slot m, and a time offset K3 is configured, and
wherein in case of activating, the DTX operation or the DRX operation is not started before a beginning of a slot m+K3.

10. The method of claim 6, further comprising transmitting a parameter indicating a size of the DCI format via higher layer signaling.

11. A user equipment (UE) in a wireless communication system, the UE comprising:
a transceiver; and
at least one processor coupled with the transceiver and configured to:
receive, from a base station (BS), a downlink control information (DCI) format with a cyclic redundancy check (CRC) scrambled by a radio network temporary identifier (RNTI) configured for discontinuous transmission and reception (DTRX),
identify a network saving mode indicator field in the DCI format, and
activate or deactivate at least one of a discontinuous transmission (DTX) operation or a discontinuous reception (DRX) operation based on the network saving mode indicator field.

12. The UE of claim 11, wherein in case that a value of a bit in the network saving mode indicator field is 0, the DTX operation or the DRX operation is deactivated, and
wherein in case that the value of the bit in the network saving mode indicator field is 1, the DTX operation or the DRX operation is activated.

13. The UE of claim 11, wherein the network saving mode indicator field includes a first bit for indicating activation or deactivation of the DTX operation and a second bit for indicating activation or deactivation of the DRX operation.

14. The UE of claim 11, wherein the DCI format is received in a slot m, and a time offset K3 is configured, and
wherein in case of activating, the DTX operation or the DRX operation is not started before a beginning of a slot m+K3.

15. The UE of claim 11, wherein the at least one processor is further configured to receive a parameter indicating a size of the DCI format via higher layer signaling.

16. A base station (BS) in a wireless communication system, the BS comprising:
a transceiver; and
at least one processor coupled with the transceiver and configured to:
transmit, to a user equipment (UE), a downlink control information (DCI) format with a cyclic redundancy check (CRC) scrambled by a radio network temporary identifier (RNTI) configured for discontinuous transmission and reception (DTRX), and
activate or deactivate at least one of a discontinuous transmission (DTX) operation or a discontinuous reception (DRX) operation based on a network saving mode indicator field.

17. The BS of claim 16, wherein in case that a value of a bit in the network saving mode indicator field is 0, the DTX operation or the DRX operation is deactivated and
wherein in case that the value of the bit in the network saving mode indicator field is 1, the DTX operation or the DRX operation is activated.

18. The BS of claim 16, wherein the network saving mode indicator field includes a first bit for indicating activation or deactivation of the DTX operation and a second bit for indicating activation or deactivation of the DRX operation.

19. The BS of claim 16, wherein the DCI format is received at the UE in a slot m, and a time offset K3 is configured, and
wherein in case of activating, the DTX operation or the DRX operation is not started before a beginning of a slot m+K3.

20. The BS of claim 16, wherein the at least one processor is further configured to transmit a parameter indicating a size of the DCI format via higher layer signaling.

* * * * *